(12) United States Patent
Jung

(10) Patent No.: US 7,547,173 B2
(45) Date of Patent: Jun. 16, 2009

(54) METHOD AND APPARATUS FOR STORING AND TRANSFERRING CONTAINERS

(76) Inventor: Kyong-Ja Jung, 3427, Sangdaewon-Dong, Jungwon-Gu, Seongnam-Si, Kyonggi-Do (KR)

( * ) Notice: Subject to any disclaimer, the term of this patent is extended or adjusted under 35 U.S.C. 154(b) by 488 days.

(21) Appl. No.: 10/563,142

(22) PCT Filed: Jun. 15, 2004

(86) PCT No.: PCT/KR2004/001430
§ 371 (c)(1),
(2), (4) Date: Dec. 30, 2005

(87) PCT Pub. No.: WO2005/001737
PCT Pub. Date: Jan. 6, 2005

(65) Prior Publication Data
US 2008/0107504 A1 May 8, 2008

(30) Foreign Application Priority Data

| Jun. 30, 2003 | (KR) | .................. 10-2003-0043552 |
| Dec. 29, 2003 | (KR) | .................. 10-2003-0098911 |
| Dec. 29, 2003 | (KR) | .................. 10-2003-0098915 |
| Mar. 12, 2004 | (KR) | .................. 10-2004-0016977 |
| Mar. 12, 2004 | (KR) | .................. 10-2004-0016979 |
| May 21, 2004 | (KR) | .................. 10-2004-0036549 |

(51) Int. Cl.
*B63B 27/00* (2006.01)
*B65G 67/60* (2006.01)
*B65G 1/00* (2006.01)
*B66B 5/26* (2006.01)

(52) U.S. Cl. .................. 414/139.9; 414/284; 187/360

(58) Field of Classification Search ............. 104/34–35, 104/46; 187/360; 294/68.3; 414/139.9, 414/140.3, 264, 274, 277, 279, 280, 281, 414/282, 284, 392, 396
See application file for complete search history.

(56) References Cited

U.S. PATENT DOCUMENTS 1,703,978 A * 3/1929 Woodruff et al. ............. 104/35
(Continued)

FOREIGN PATENT DOCUMENTS

JP 2001-240248 9/2001

OTHER PUBLICATIONS

International Preliminary Report on Patentability; PCT/KR2004/001430; Dated: Oct. 24, 2005.

*Primary Examiner*—Gregory W Adams
(74) *Attorney, Agent, or Firm*—Cantor Colburn LLP

(57) ABSTRACT

A method for storing and transferring containers comprises the steps of a container information-receiving step for receiving information of the containers transmitted from a loading/unloading unit while the containers stacked in the container ship are unloaded by means of the loading/unloading unit, a transferring unit-moving step for moving a transferring unit to the loading/unloading unit having transmitted the information of the containers so that the containers are loaded onto the transferring unit, a storage-determining step for analyzing the received information of the containers to determine whether the containers placed on the transferring unit are to be moved to a stacking unit so that the containers can be stored or are to be moved to a taking-in/taking-out unit so that the containers can be removed from a container terminal, and a container-transferring step for moving the transferring unit to a position selected on the basis of the determination as to whether the containers are to be stored or not so that the containers can be transferred.

42 Claims, 45 Drawing Sheets

U.S. PATENT DOCUMENTS

| | | | | |
|---|---|---|---|---|
| 2,316,976 | A | * | 4/1943 | Sahlin ......................... 187/360 |
| 2,848,069 | A | * | 8/1958 | Sanders ....................... 187/360 |
| 3,543,952 | A | * | 12/1970 | Young ...................... 414/140.3 |
| 3,552,794 | A | * | 1/1971 | Wright ....................... 294/81.2 |
| 3,754,669 | A | * | 8/1973 | Alsen ...................... 414/140.8 |
| 4,955,489 | A | * | 9/1990 | Allen .......................... 211/151 |
| 4,973,219 | A | * | 11/1990 | Brickner et al. .......... 414/792.9 |
| 5,540,532 | A | | 7/1996 | Carder et al. ................ 414/284 |
| 5,951,226 | A | * | 9/1999 | Fantuzzi ................... 414/141.3 |
| 6,698,990 | B1 | * | 3/2004 | Dobner et al. ............ 414/139.9 |

\* cited by examiner

METHOD AND APPARATUS FOR STORING AND TRANSFERRING CONTAINERS

TECHNICAL FIELD

The present invention relates to a method and apparatus for storing and transferring containers that allows quick handling of containers loaded onto or unloaded from a container ship, thereby more smoothly storing and transferring the containers.

BACKGROUND ART

Generally, containers are box-shaped receptacles used to efficiently and economically transport cargos. The containers have different lengths and heights, although containers each having a length of 20 ft or 40 ft are commonly used.

Such containers are stacked on a specific facility, such as a container terminal. The container terminal is normally located in front of a harbor. A great number of containers are stacked on the container terminal, and are then loaded onto a container ship.

The containers may have different heights although they have the same length. For example, the containers may be classified into dry containers each having a length of 40 ft and a height of 2.4 m and high-cubic dry containers each having a length of 40 ft and a height of 2.7 m. Consequently, the difference in height between each dry container and each high-cubic dry container is 0.3 m.

FIG. 49 is a perspective view schematically showing a conventional container terminal.

As shown in FIG. 49, a container terminal 100 is located in front of a harbor, in which a container ship 200 is at anchor. Containers 300 are unloaded from the container ship 200 by means of gantry cranes 400, and are then transferred to a field container storage space 500 by means of trailers, where the containers 300 are stacked.

On the other hand, the containers 300 stacked on the field container storage space 500 or other containers 300 taken to the field container storage space 500 by means of trailers are moved to the gantry cranes 400, by means of which the containers 300 are loaded onto the container ship 200.

However, a great number of containers are transferred by means of the gantry cranes and the trailers so that the containers are loaded onto or unloaded from the container ship. As a result, the containers unloaded from the container ship or the containers loaded onto the container ship from the field container storage space may not be quickly handled.

Also, the containers are stacked on the field container storage space while the containers are not classified. As a result, the containers are not reasonably handled on the basis of the lengths of the containers and variance in time elapsed until containers are removed from the container terminal, whereby storage and removal of the containers are not smoothly achieved.

The trailers used to transfer the containers to the gantry cranes are ordinary transporting means, each of which is operated by an operator. However, the transporting means are not reasonably controlled nor smoothly managed. As a result, the containers are not smoothly loaded onto or unloaded from the container ship.

Also, the containers are not smoothly stored or transferred due to the above-mentioned problems. As a result, human and material resources are wasted while the container terminal is operated.

It is required that the container terminal have a large area sufficient to stack a great number of containers thereon. However, it is very difficult to obtain a site for the container terminal. Although a large-scale container terminal is provided, the containers are not efficiently stacked on the field container storage space of the container terminal.

Furthermore, the containers are stacked on the large-area field container storage space of the container terminal while being scattered, and the stored containers are kept away from the container ship. As a result, a great number of transport equipments and much manpower is necessary to transfer the containers to the container ship.

DISCLOSURE OF THE INVENTION

Therefore, the present invention has been made in view of the above problems.

It is an object of the present invention to provide a method and apparatus for storing and transferring containers that allows quick handling of containers unloaded from a container ship, thereby more smoothly storing and transferring the containers.

It is another object of the present invention to provide a method and apparatus for storing and transferring containers that allows reasonable handling of containers on the basis of the lengths of the containers and variance in time elapsed until containers are removed from the container terminal, thereby smoothly achieving storage and removal of the containers.

It is another object of the present invention to provide a method and apparatus for storing and transferring containers that allows smooth control of a container-transferring unit, whereby the containers are quickly transferred.

It is another object of the present invention to provide a method and apparatus for storing and transferring containers that allows stable and smooth transfer of containers, whereby the containers are easily brought into a container terminal for loading onto a container ship, and unloaded from a container ship and removed from the container terminal.

It is another object of the present invention to provide a method and apparatus for storing and transferring containers that allows smooth loading of containers having different lengths onto automatic bogies and easy supply of electric energy to the automatic bogies.

It is another object of the present invention to provide a method and apparatus for storing and transferring containers that allows simple and easy stacking of a great number of containers on a small area and smooth attachment, detachment and transfer of the containers.

It is another object of the present invention to provide a method and apparatus for storing and transferring containers that prevents inclination and unsteadiness caused according to the change of the center of gravity of containers when the containers are moved horizontally.

It is another object of the present invention to provide a method and apparatus for storing and transferring containers that allows accurate control of upward/downward movement of containers so that the containers can be moved upward or downward more precisely by means of hydraulic pressure.

It is another object of the present invention to provide a method and apparatus for storing and transferring containers that allows moving of piping for supplying fluid to hydraulics which move containers upward and downward, along with hydraulic cylinders in a double-acting fashion, whereby leakage of oil due to repetitive use is prevented, necessity of an additional installation space for the piping is eliminated, the apparatus can be easily manufactured, expansion and contraction of the apparatus is accurately achieved, and thus performance and reliability of the apparatus is improved.

It is another object of the present invention to provide a method and apparatus for storing and transferring containers that allows precise fixing of a cage for moving containers upward and downward at a predetermined position with a simple structure.

It is another object of the present invention to provide a method and apparatus for storing and transferring containers that allows adjustment of the height of a holder part for holding containers, whereby various containers having different heights can be easily held.

It is another object of the present invention to provide a method and apparatus for storing and transferring containers that allows quick stacking and discharging of containers onto and from a stacking unit, thereby preventing stacking chambers of the stacking unit from being empty.

It is another object of the present invention to provide a method and apparatus for storing and transferring containers that prevents a traveler provided at one of lifting channels from passing through stacking chambers and thus being introduced into the other lifting channel and allows smooth stacking of various containers having different sizes.

It is yet another object of the present invention to provide a method and apparatus for storing and transferring containers that allows smooth introduction of containers having different sizes into the interior of a steel-frame stacking facility.

In accordance with one aspect of the present invention, the above and other objects can be accomplished by the provision of a method for storing and transferring containers, comprising the steps of: a container information-receiving step for receiving information of the containers transmitted from a loading/unloading unit while the containers stacked in the container ship are unloaded by means of the loading/unloading unit; a transferring unit-moving step for moving a transferring unit to the loading/unloading unit having transmitted the information of the containers so that the containers are loaded onto the transferring unit; a storage-determining step for analyzing the received information of the containers to determine whether the containers placed on the transferring unit are to be moved to a stacking unit so that the containers can be stored or are to be moved to a taking-in/taking-out unit so that the containers can be removed from a container terminal; and a container-transferring step for moving the transferring unit to a position selected on the basis of the determination as to whether the containers are to be stored or not so that the containers can be transferred.

Preferably, the method for storing and transferring containers further comprises the steps of: a stacking position-selecting step for selecting a position on the stacking unit where the containers are to be stacked after storage of the containers is selected at the storage-determining step.

Preferably, the method for storing and transferring containers further comprises the steps of: a shortest route-selecting step for analyzing and selecting the shortest route among various routes along which the loading/unloading unit can be moved to the selected position on the basis of the determination as to whether the containers are to be stored or not at the storage-determining step, and the shortest route-selecting step is carried out after the storage-determining step.

Preferably, the transferring unit placed at the shortest distance from the loading/unloading unit is selected in the transferring unit-moving step.

Preferably, the position on the stacking unit is selected on the basis of the lengths of the unloaded containers and depending upon when the containers are removed in the stacking position-selecting step.

Preferably, the containers are stacked on different stacking units on the basis of the lengths of the containers, and containers necessary to be removed first are stacked such that the containers are closer to the taking-in/taking-out unit than containers necessary to be removed later.

Preferably, the control of the transferring unit is achieved in a wireless transmitting and receiving fashion.

In accordance with another aspect of the present invention, there is provided a method for storing and transferring containers, comprising the steps of: a container information-receiving step for receiving information of containers to be loaded onto a container ship from a loading/unloading unit; a container position-identifying step for identifying the position of the containers on the basis of the received information of the containers; a transferring unit-moving step for moving a transferring unit to the identified position so that the containers can be loaded onto the transferring unit; and a container-loading step for moving the transferring unit having the containers placed thereon to the loading/unloading unit so that the containers can be loaded onto the container ship.

Preferably, the transferring unit placed at the shortest distance from the place corresponding to the position of the containers is selected in the transferring unit-moving step.

Preferably, the method for storing and transferring containers further comprises the steps of: a shortest route-selecting step for analyzing and selecting the shortest route among various routes along which the transferring unit can be moved from the place corresponding to the position of the containers to the loading/unloading unit, and the shortest route-selecting step is carried out after the transferring unit-moving step.

In accordance with yet another aspect of the present invention, there is provided an apparatus for storing and transferring containers, comprising: a loading/unloading unit for loading or unloading containers onto or from a container ship; a stacking unit for stacking the containers unloaded from the container ship by means of the loading/unloading unit and containers taken to a container terminal; a transferring unit for transferring the containers between the loading/unloading unit and the stacking unit; and a central controlling unit for receiving information of the containers to be loaded onto or unloaded from the container ship from the loading/unloading unit to determine whether the containers are stacked or not and to identify the position of the containers and controlling the movement of the transferring unit so that the containers can be handled.

Preferably, the apparatus for storing and transferring containers further comprises: a taking-in/taking-out unit for taking the containers to the container terminal or removing the container out of the container terminal, and the transferring unit is moved to the taking-in/taking-out unit through the stacking unit.

Preferably, the transferring unit comprises: a railroad line connected between the lower part of the loading/unloading unit and the taking-in/taking-out unit via the stacking unit; and a plurality of automatic bogies movable automatically along the railroad line.

Preferably, the railroad line comprises: a plurality of transverse railroad line parts disposed at the lower part of the loading/unloading unit while being perpendicular to the loading/unloading unit; cross railroad line parts crossing each other, the cross railroad line parts being connected to the transverse railroad line parts in pairs and arranged from the transverse railroad line parts to the stacking unit; and convergent railroad parts extending from the ends of the cross railroad line parts such that the convergent railroad parts are convergent to at least one position through the stacking unit.

Preferably, the apparatus for storing and transferring containers further comprises: railroad line-rotating parts disposed at the section where the cross railroad line parts cross each other and at the section where the convergent railroad parts are convergent.

Preferably, each of the railroad line-rotating parts comprises: a circular table disposed at the section where the cross railroad line parts cross each other and at the section where the convergent railroad parts are convergent, the circular table having connection railroad line parts disposed on the upper surface thereof, the connection railroad line parts being connected to the cross railroad line parts and the convergent railroad parts; a rotary shaft mounted to the center of the lower surface of the circular table; a base for rotatably supporting the lower end of the rotary shaft; and a rotary driving part electrically connected to the central controlling unit for rotating the circular table.

Preferably, an annular supporting protrusion is attached to the lower surface of the circular table such that the supporting protrusion is disposed around the rotary shaft while being spaced apart from the rotary shaft, and a plurality of supporting rollers are rotatably attached to the lower surface of the supporting protrusions.

Preferably, the taking-in/taking-out unit comprises: a loader for loading the container moved by means of the automatic bogie above the section where the convergent railroad parts are convergent according to the control of the central controlling unit onto a trailer.

Preferably, the loader comprises: a loader frame mounted above the convergent ends of the convergent railroad parts; a moving bogie movable along the loader frame; a plurality of holder parts attached to the moving bogie for holding the container; and a loader driving part electrically connected to the central controlling unit for driving the moving bogie.

Preferably, the automatic bogie comprises: a rectangular frame-shaped bogie body; a plurality of bogie shafts rotatably mounted to the lower part of the bogie body; bogie wheels securely fixed to both ends of each of the bogie shafts; bogie driving parts for driving the bogie shafts; a bogie control part for controlling one of the bogie driving parts; and a wireless transceiver electrically connected to the bogie control part for performing a wireless transmitting and receiving operation with the central controlling unit.

Preferably, the bogie body is provided at the upper surface thereof with a plurality of fixing protrusions such that the fixing protrusions can be securely inserted into the corner areas of a large-sized container placed on the upper surface of the automatic bogie.

Preferably, the bogie body is provided with rechargeable batteries for supplying electric current to the bogie driving parts, respectively.

Preferably, the bogie body is provided at the upper surface thereof between the fixing protrusions with a plurality of insertion protrusions, which have heights relatively smaller than heights of the fixing protrusions, such that the insertion protrusions can be securely inserted into the corner areas of a small-sized container placed on the upper surface of the automatic bogie.

Preferably, the stacking unit comprises: a steel-frame body constructed in a vertical multi-storied structure such that the steel-frame body has a plurality of stacking chambers defined therein, the steel-frame body having horizontal rails disposed at both sides in each stacking chamber and a lifting channel defined vertically in the steel-frame body; a cage disposed in the lifting channel, the cage having horizontal rails corresponding to the horizontal rails of the stacking chamber; a traveler mounted in the cage such that the traveler can be attached to or detached from the upper part of the container, the traveler being movable horizontally along the horizontal rails of the stacking chamber and the horizontal rails of the cage; and lifting parts attached to the upper end of the steel-frame body for moving the cage upward or downward along the lifting channel.

Preferably, the traveler comprises: a horizontal driving part including a main body disposed at the cage, and a plurality of driving rollers rotatably disposed at both sides of the main body such that the driving rollers are moved along the horizontal rails of the cage while being in rolling contact with the horizontal rails of the cage by means of a driving motor fixed to the main body; and holder parts formed at the lower surface of the main body such that the holder parts can be engaged in or disengaged from holes formed at the upper surface of the container.

Preferably, the stacking unit further comprises: locking parts for locking the cage to the steel-frame body at the position where the horizontal rails of the stacking chamber are level with the horizontal rails of the cage.

Preferably, each of the lifting parts comprises: a hydraulic motor mounted to the upper end of the steel-frame body; a driving pulley that can be operated by means of the hydraulic motor; and wire ropes connected to the cage such that the wire ropes can be wound by means of the driving pulley.

Preferably, a plurality of guide rails are vertically disposed along the lifting channel, and a plurality of rollers are rotatably attached to the outside of the cage such that the rollers can be in contact with the guide rails.

Preferably, each of the lifting parts comprises: a lower fixed cylinder having an open lower end, the lower fixed cylinder being provided at the upper part thereof with a first upper inlet; a lower actuating rod inserted in the lower fixed cylinder through the upper part of the lower fixed cylinder, the lower actuating rod having a first central channel and a first internal channel defined therein, the first central channel having open upper and lower ends and the first internal channel having upper and lower ends closed by means of a first upper flange and a first piston, the lower actuating rod having a first lower inlet and a first upper outlet formed at the upper and lower parts of the first internal channel, respectively; a first external channel defined between the lower actuating rod and the lower fixed cylinder for communicating with the first upper inlet of the lower fixed cylinder and the first lower inlet of the lower actuating rod; an upper moving cylinder formed integrally to the upper part of the first upper flange, the upper moving cylinder having an open lower end for communicating with the lower actuating rod, the upper moving cylinder having a second upper inlet formed at the upper part thereof; an upper actuating rod inserted in the upper moving cylinder through the upper part of the upper moving cylinder, the upper actuating rod having a second central channel and a second internal channel defined therein, the second central channel having an open lower end and an upper end closed by means of a second upper flange and the second internal channel having upper and lower ends closed by means of the second upper flange and a second piston, the upper actuating rod having a second lower inlet and a second closed upper outlet formed at the upper and lower parts of the second internal channel, respectively, the upper actuating rod being connected to the cage; a second external channel defined between the upper actuating rod and the upper moving cylinder for communicating with the second upper inlet of the upper moving cylinder and the second lower inlet of the upper actuating rod; a first supply pipe having one end connected to the first upper inlet of the lower fixed cylinder and the other end connected to an external fluid tank including a hydraulic pump; and a second supply pipe having one end connected to the first upper outlet of the lower actuating rod and the other end connected to the second upper inlet of the upper moving cylinder.

Preferably, the first supply pipe, the second supply pipe, the first internal channel of the lower actuating rod, and the second internal channel of the upper actuating rod are constructed such that the amount of fluid supplied through the first supply pipe and the second supply pipe is equal to the amount of fluid supplied through the first internal channel of the lower actuating rod and the second internal channel of the upper actuating rod.

Preferably, the end of a first upper stopper of the lower fixed cylinder extends downward such that the end of the first upper stopper of the lower fixed cylinder blocks approximately the upper half of the first upper inlet of the lower fixed cylinder, the end of a second upper stopper of the upper moving cylinder extends downward such that the end of the second upper stopper of the upper moving cylinder blocks approximately the upper half of the second upper inlet of the upper moving cylinder, the first piston of the lower actuating rod is spaced from the lower end of the lower fixed cylinder by a distance corresponding to approximately the lower half of the first upper inlet of the lower fixed cylinder, and the second piston of the upper actuating rod is spaced from the lower end of the upper moving cylinder by a distance corresponding to approximately the lower half of the second upper inlet of the upper moving cylinder.

Preferably, a driving pulley is attached to the upper surface of the second upper flange, a wire rope wound on the driving pulley is connected to the cage, and guide rollers are mounted to one side of the driving pulley such that the guide rollers can be moved along the guide rails vertically disposed at the lifting channel while being in rolling contact with the guide rails, the guide rollers being arranged in pairs in an upper and lower arrangement.

Preferably, each of the locking parts comprises: a movable locking part including an actuating cylinder mounted to the cage and an insertion rod integrally attached to the end of a piston rod of the actuating cylinder such that the insertion rod can be moved forward from or backward to the cage by means of the actuating cylinder; and a locking insertion part formed at the steel-frame body corresponding to the stacking chamber for securely locking the insertion rod.

Preferably, the locking insertion part comprises: a locking member attached to the upper end of the stacking chamber corresponding to the lifting channel; and an insertion hole formed at the locking member for allowing the insertion rod to be inserted therethrough.

Preferably, the locking insertion part comprises: a guide locking member attached to the upper end of the stacking chamber corresponding to the lifting channel; and a wedge-shaped groove formed at the guide locking member such that the insertion rod can be inserted into the wedge-shaped groove while being guided along the wedge-shaped groove.

Preferably, the insertion hole is a vertically extending elongated hole, the width of the insertion hole being gradually increased from the lower end to the upper end of the insertion hole such that the width of the hole at the upper end of the insertion hole is larger than the diameter of the insertion rod.

Preferably, a roller is rotatably attached to the end of the insertion rod such that the insertion rod can be smoothly guided along the wedge-shaped groove while being in rolling contact with the wedge-shaped groove by means of the roller.

Preferably, the movable locking part further comprises: a sliding tube surrounding the insertion rod such that the insertion rod can be slid through the sliding tube; and a supporting bar attached between the sliding tube and the cage.

Preferably, the stacking unit further comprises: height-adjusting parts, each of the height-adjusting parts comprising: a hydraulic cylinder mounted downward at a corresponding corner of the traveler; and a spreader, having a corresponding holder part, mounted to the end of the piston rod of the hydraulic cylinder such that the spreader is moved upward or downward by means of the hydraulic cylinder and the height of the holder part is adjusted according to the movement of the spreader.

Preferably, each of the height-adjusting parts comprises: a guide rod disposed at one side of the hydraulic cylinder, the guide rod being attached to the spreader through the traveler.

Preferably, each of the height-adjusting parts comprises: a stopper attached to the traveler such that the stopper can be caught in a catching groove formed at the upper end of the guide rod for holding the guide rod.

Preferably, the stopper comprises: a stopper plate disposed at the upper surface of the traveler, the stopper plate having engaging grooves formed at both ends thereof such that the engaging grooves can be simultaneously engaged with the corresponding catching grooves of a pair of guide rods; and a stopper hydraulic cylinder disposed below the stopper plate for moving the stopper plate to one side.

Preferably, the stopper further comprises: a pair of distance-adjusting holes formed at the stopper plate while being spaced apart from each other; and a pair of adjusting bars mounted to the upper surface of the traveler such that the adjusting bars are inserted in the distance-adjusting holes, respectively, for adjusting the movable distance of the stopper plate.

Preferably, the traveler is provided with a guide tube surrounding the guide rod.

Preferably, the stacking unit comprises: a steel-frame stacking facility including a plurality of steel-frame bodies connected to each other such that floors of one of the steel-frame bodies communicate with floors of the other steel-frame body, respectively, each of steel-frame bodies having at least two stacking chambers disposed along both sides of the lifting channel, and the traveler is moved horizontally from one of the lifting channels to the other lifting channel in the steel-frame stacking facility.

Preferably, the stacking unit further comprises: an introduction-preventing part for preventing the traveler provided at one of the lifting channels from being introduced into the other lifting channel.

Preferably, the steel-frame stacking facility includes various steel-frame bodies having different sizes so that various containers having different sizes and heights can be stacked.

Preferably, the introduction-preventing part comprises: safety protrusions attached, in pairs, to the insides of the opposite stacking chambers communicating with each other; and stop brackets attached, in pairs, to the traveler such that the stop brackets pass by one pair of safety protrusions placed near the traveler and collide against the other pair of safety protrusions placed away from the traveler.

Preferably, each of the safety protrusions is made of rubber so that shocks can be absorbed by means of the safety protrusions.

Preferably, the apparatus for storing and transferring containers further comprises: container-introducing parts disposed at both sides of the steel-frame stacking facility for introducing containers into the lifting channels.

Preferably, each of the container-introducing parts comprises: introducing rails mounted at the outside of the lower end of each lifting channel; bogies disposed on the introducing rails such that the bogies can be moved along the introducing rails; upper rails disposed above the introducing rails while being perpendicular to the introducing rails; and stacking loaders disposed on the upper rails such that the stacking loaders can be moved along the upper rails for loading containers onto the bogies.

Preferably, each of the stacking loaders comprises: a moving bogie movable along the upper rails; a fixing frame disposed below the moving bogie; and a plurality of holder parts attached to the fixing frame for holding containers having different sizes.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, preferred embodiments of the present invention will be described in detail with reference to the accompanying drawings.

Figure 1:
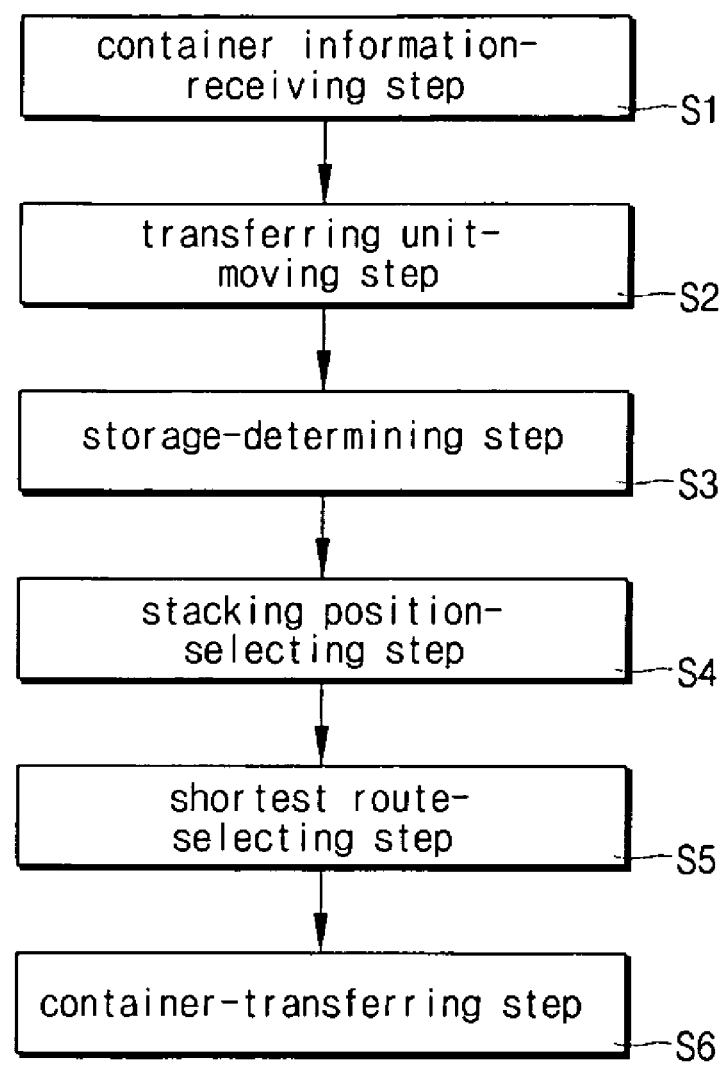
FIG. 1 is a flowchart showing a method for storing and transferring containers according to a preferred embodiment of the present invention.
Figure 2:
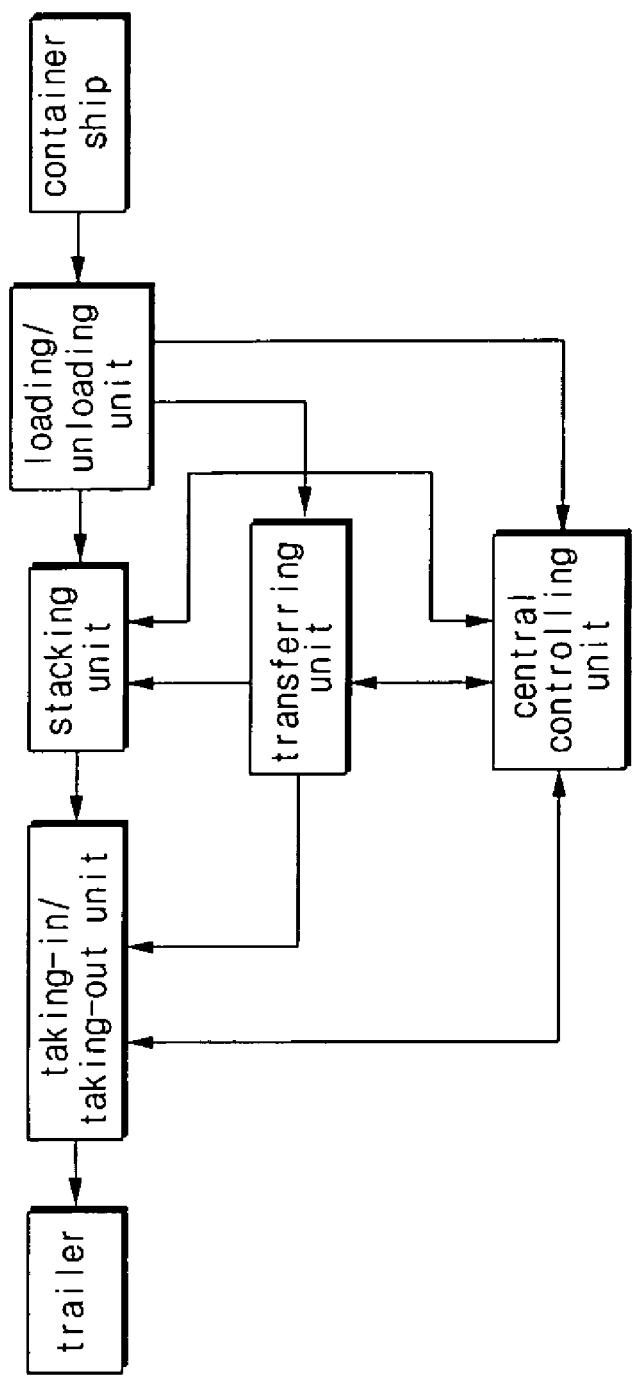
FIG. 2 is a block diagram showing procedures carried out according to the method for storing and transferring containers shown in FIG. 1.

FIG. 1 is a flowchart showing a method for storing and transferring containers according to a preferred embodiment of the present invention, and FIG. 2 is a block diagram showing procedures carried out according to the method for storing and transferring containers shown in FIG. 1.

As shown in FIGS. 1 and 2, the method for storing and transferring containers comprises: a container information-receiving step (S1) for receiving information of containers unloaded from a container ship from a loading/unloading unit; a transferring unit-moving step (S2) for moving a transferring unit to the loading/unloading unit; a storage-determining step (S3) for determining whether the containers are to be stored or not; a stacking position-selecting step (S4) for selecting a position on a stacking unit where the containers are to be stacked; a shortest route-selecting step (S5) for selecting the shortest route between the stacking position and the loading/unloading unit; and a container-transferring step (S6) for transferring the containers along the selected route.

The container information-receiving step (S1) is a step for receiving information of the containers transmitted from the loading/unloading unit while the containers stacked in the container ship are unloaded by means of the loading/unloading unit.

In this step, a crane operator in the loading/unloading unit, such as a gantry crane, transmits information of the containers unloaded from the container ship, and then a central controlling unit receives the information.

The transferring unit-moving step (S2) is a step for moving the transferring unit to the loading/unloading unit that transmitted the information of the containers unloaded from the container ship to place the containers onto the transferring unit by means of the loading/unloading unit.

In this step, the central controlling unit controls the transferring unit so that the transferring unit can be moved adjacent to the loading/unloading unit, and then the containers can be loaded onto the transferring unit.

The storage-determining step (S3) is a step for analyzing the received information of the containers to determine whether the containers placed on the transferring unit are to be moved to the stacking unit so that the containers can be stored or are to be moved to a taking-in/taking-out unit so that the containers can be removed from a container terminal.

In this step, the central controlling unit determines whether the containers are to be stored or immediately removed from the container terminal to select a transferring position of the transferring unit, on which the containers are placed by means of the loading/unloading unit.

The stacking position-selecting step (S4) is a step for selecting a position on the stacking unit where the containers are to be stacked after storage of the containers is selected at the storage-determining step (S3).

When storage of the containers is selected on the basis of the received information of the containers received by the central controlling unit, the information of the stacking unit is inputted to the central controlling unit to select a position on the stacking unit where the containers are to be stacked.

The shortest route-selecting step (S5) is a step for analyzing and selecting the shortest route among various routes along which the loading/unloading unit can be moved to the selected position on the basis of the determination as to whether the containers are to be stored or not at the storage-determining step (S3).

In this step, the shortest route between the loading/unloading unit, by which the containers are unloaded from the container ship and placed on the transferring unit, and the stacking unit so that the distance of the containers transferred by means of the transferring unit can be minimized, and thus the containers can be quickly stacked onto the stacking unit.

The container-transferring step (S6) is a step for moving the transferring unit, on which the containers are placed, to a position selected on the basis of the determination as to whether the containers are to be stored or not so that the containers can be transferred.

When storage of the container is selected on the basis of the determination as to whether the containers are to be stored or not, the containers are transferred to the stacking unit. When storage of the container is not selected on the basis of the determination as to whether the containers are to be stored or not, the containers are transferred to the taking-in/taking-out unit so that the containers can be loaded onto trailers by means of the taking-in/taking-out unit, and then removed from the container terminal.

In the transferring unit-moving step (S2), the transferring unit placed at the shortest distance from the loading/unloading unit is selected so that the transferring unit can be more quickly moved to the loading/unloading unit.

In the stacking position-selecting step (S4), the position on the stacking unit is selected on the basis of the lengths of the unloaded containers and depending upon when the containers are removed. For example, the containers are stacked while containers each having a length of 20 ft are separated from containers each having a length of 40 ft, or the containers are stacked such that containers necessary to be removed first are easily discharged from the stacking unit earliest.

Also, the containers are stacked on different stacking units on the basis of the lengths of the containers, and containers necessary to be removed first are stacked such that the containers are closer to the taking-in/taking-out unit than containers necessary to be removed later. In this way, various kinds of containers can be stacked while being classified. Consequently, handling and management of the containers are easy. Also, containers necessary to be removed first are stacked near the taking-in/taking-out unit, and thus the containers can be more quickly removed.

The control of the transferring unit is achieved in a wireless transmitting and receiving fashion. Consequently, the control of the transferring unit, which is moved from the loading/unloading unit to the stacking unit and the taking-in/taking-out unit, is smoothly achieved.

As can be seen from the above description, the method for storing and transferring containers is very useful for quickly, accurately and reasonably handling containers unloaded from the container ship.

Figure 3:
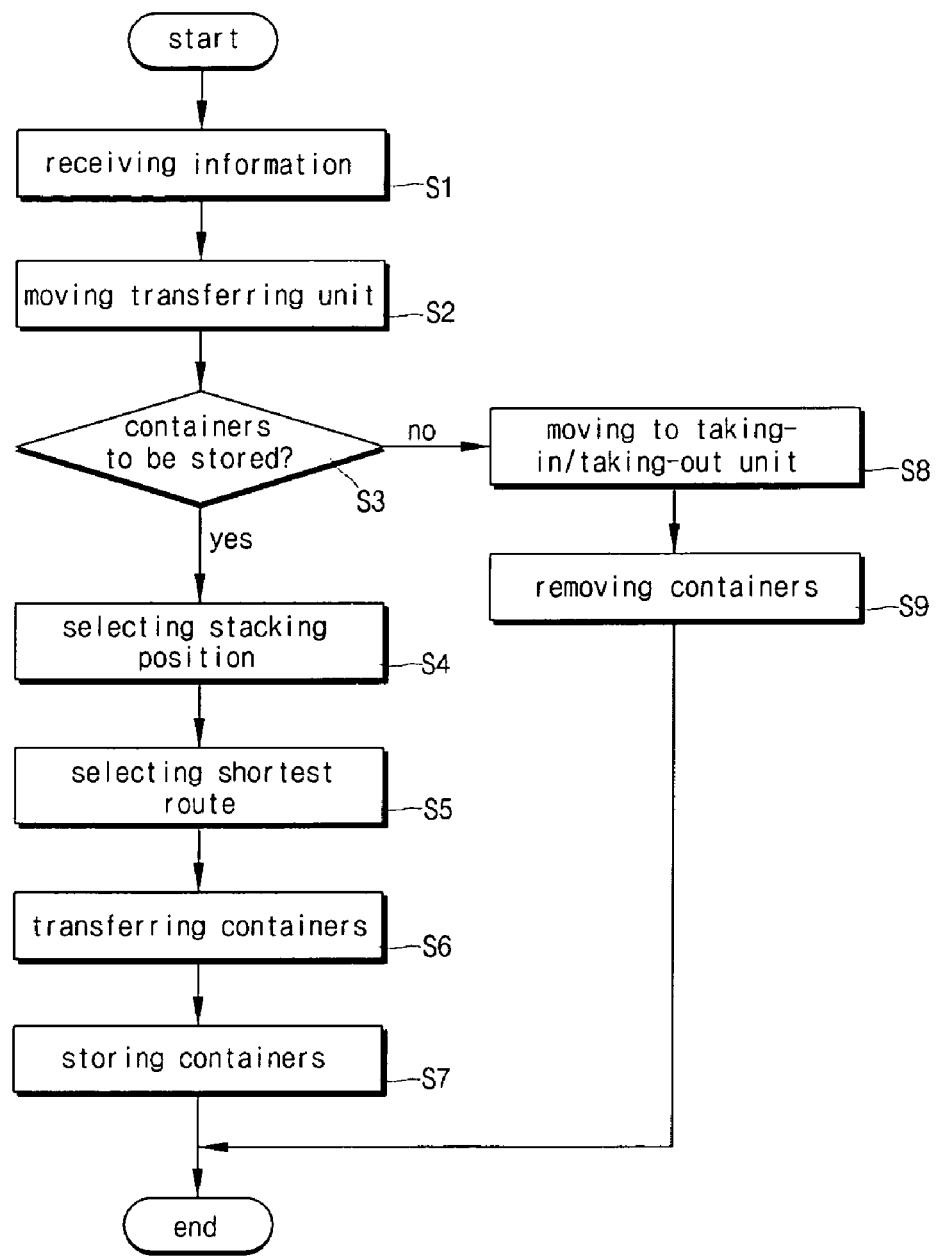
FIG. 3 is a flowchart showing procedures carried out according to the method for storing and transferring containers shown in FIG. 1.

FIG. 3 is a flowchart showing procedures carried out according to the method for storing and transferring containers shown in FIG. 1.

As shown in FIG. 3, information of the containers is transmitted while the containers are unloaded from the container ship to a harbor by means of the loading/unloading unit installed at the harbor, such as the gantry crane, and the transmitted information of the containers is received by the central controlling unit (S1).

The central controlling unit, having received the information of the unloaded containers, selects the transferring unit placed at the shortest distance from the loading/unloading unit, which transmitted the information of the containers, and moves the transferring unit to the loading/unloading unit so that the containers can be loaded onto the transferring unit (S2).

After the containers are loaded onto the transferring unit, the central controlling unit determines, on the basis of the information of the containers, whether the containers are to be stacked onto the stacking unit or removed from the harbor (S3).

When removal of the containers is selected on the basis of the determination of the central controlling unit, the transferring unit, on which the containers are placed, is moved to the taking-in/taking-out unit (S8), and the containers are loaded onto the trailers and removed from the harbor by means of the taking-in/taking-out unit (S9).

When storage of the containers is selected on the basis of the determination of the central controlling unit, stacking information is inputted to the central controlling unit from the staking unit. The central controlling unit analyzes the stacking information to select a stacking position of the containers placed on the transferring unit (S4).

When the staking position of the containers is selected by means of the central controlling unit, the central controlling unit selects the shortest route among various routes from the loading/unloading unit where the transferring unit having the containers placed thereon is positioned to the stacking unit with the stacking position selected (S5).

The central controlling unit moves the transferring unit, on which the containers are placed, along the shortest route selected by the central controlling unit so that the containers can be transferred to the stacking unit (S6).

When the containers are transferred to the stacking unit by means of the transferring unit, the central controlling unit controls the stacking unit so that the containers are stacked and stored on the predetermined stacking position of the stacking unit (S7).

Figure 4:
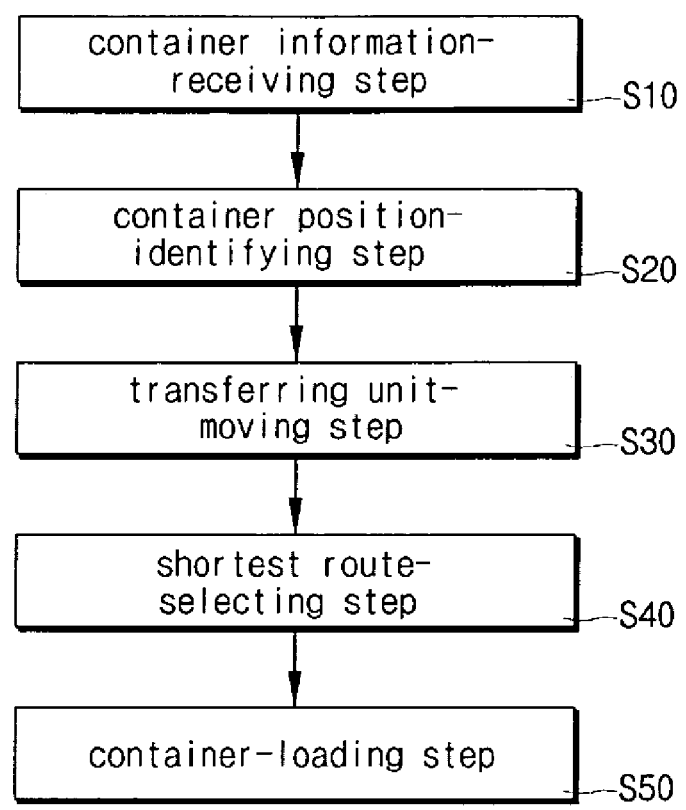
FIG. 4 is a flowchart showing a method for storing and transferring containers according to another preferred embodiment of the present invention.
Figure 5:
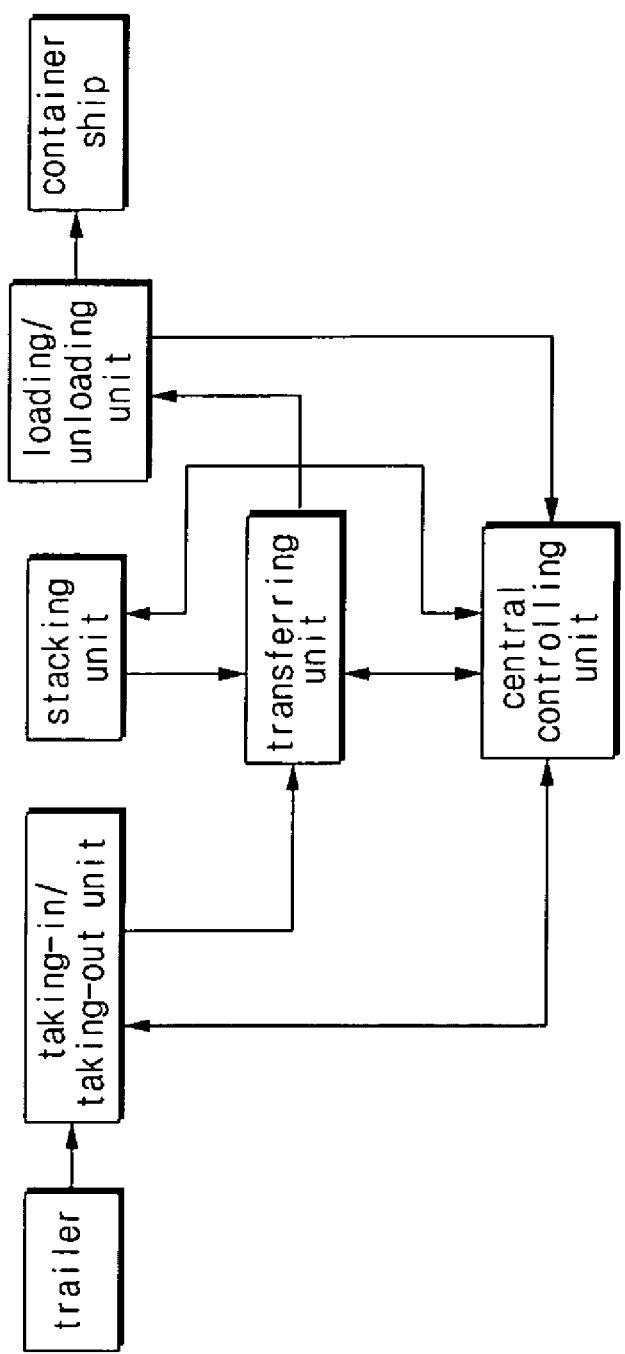
FIG. 5 is a block diagram showing procedures carried out according to the method for storing and transferring containers shown in FIG. 4.

FIG. 4 is a flowchart showing a method for storing and transferring containers according to another preferred embodiment of the present invention, and FIG. 5 is a block diagram showing procedures carried out according to the method for storing and transferring containers shown in FIG.

As shown in FIGS. 4 and 5, the method for storing and transferring containers comprises: a container information-receiving step (S10) for receiving information of containers to be loaded onto a container ship; a container position-identifying step (S20) for analyzing the received information of the containers to identify the position of the containers; a transferring unit-moving step (S30) for moving a transferring unit to the identified position so that the containers can be loaded onto the transferring unit; a shortest route-selecting step (S40) for selecting the shortest route along which the transferring unit can be moved; and a container-loading step (S50) for moving the transferring unit along the shortest route to load the containers onto the container ship.

The container information-receiving step (S10) is a step for transmitting the information of the containers to be loaded onto the container ship from a loading/unloading unit to a central controlling unit so that the central controlling unit can receive the information of the containers to be loaded onto the container ship.

In this step, the loading/unloading unit transmits the information of the containers to be loaded onto the container ship to the central controlling unit, and the central controlling unit receives the information of the containers to be loaded onto the container ship.

The container position-identifying step (S20) is a step for analyzing the received information of the containers by means of the central controlling unit to identify the position of the corresponding containers.

In this step, the central controlling unit analyzes the received information of the containers to identify whether the containers are stacked on the stacking unit or taken to the stacking unit by means of a taking-in/taking-out unit and to identify the stacking position of the containers in the case that the containers are stacked on the stacking unit.

The transferring unit-moving step (S30) is a step for moving the transferring unit to a place corresponding to the identified position of the containers after the position of the containers is identified by means of the central controlling unit so that the containers can be loaded onto the transferring unit.

In this step, the central controlling unit moves the transferring unit to the position where the containers are stacked so that the containers can be loaded onto the transferring unit.

At this time, the transferring unit placed at the shortest distance from the place corresponding to the position of the containers is selected so that the containers can be more quickly loaded onto the transferring unit.

The shortest route-selecting step (S40) is a step for analyzing and selecting, by means of the central controlling unit, the shortest route among various routes along which the transferring unit can be moved from the place corresponding to the position of the containers to the loading/unloading unit.

In this step, the shortest route from the position where the containers are placed to the loading/unloading unit is analyzed by means of the central controlling unit so that the containers can more quickly reach the loading/unloading unit.

The container-loading step (S50) is a step for moving the transferring unit, on which the containers are placed, from the position where the containers are placed to the loading/unloading unit to load the containers onto the container ship by means of the loading/unloading unit.

As can be seen from the above description, the method for storing and transferring containers is very useful to quickly, accurately and reasonably handle containers to be loaded onto the container ship.

Figure 6:
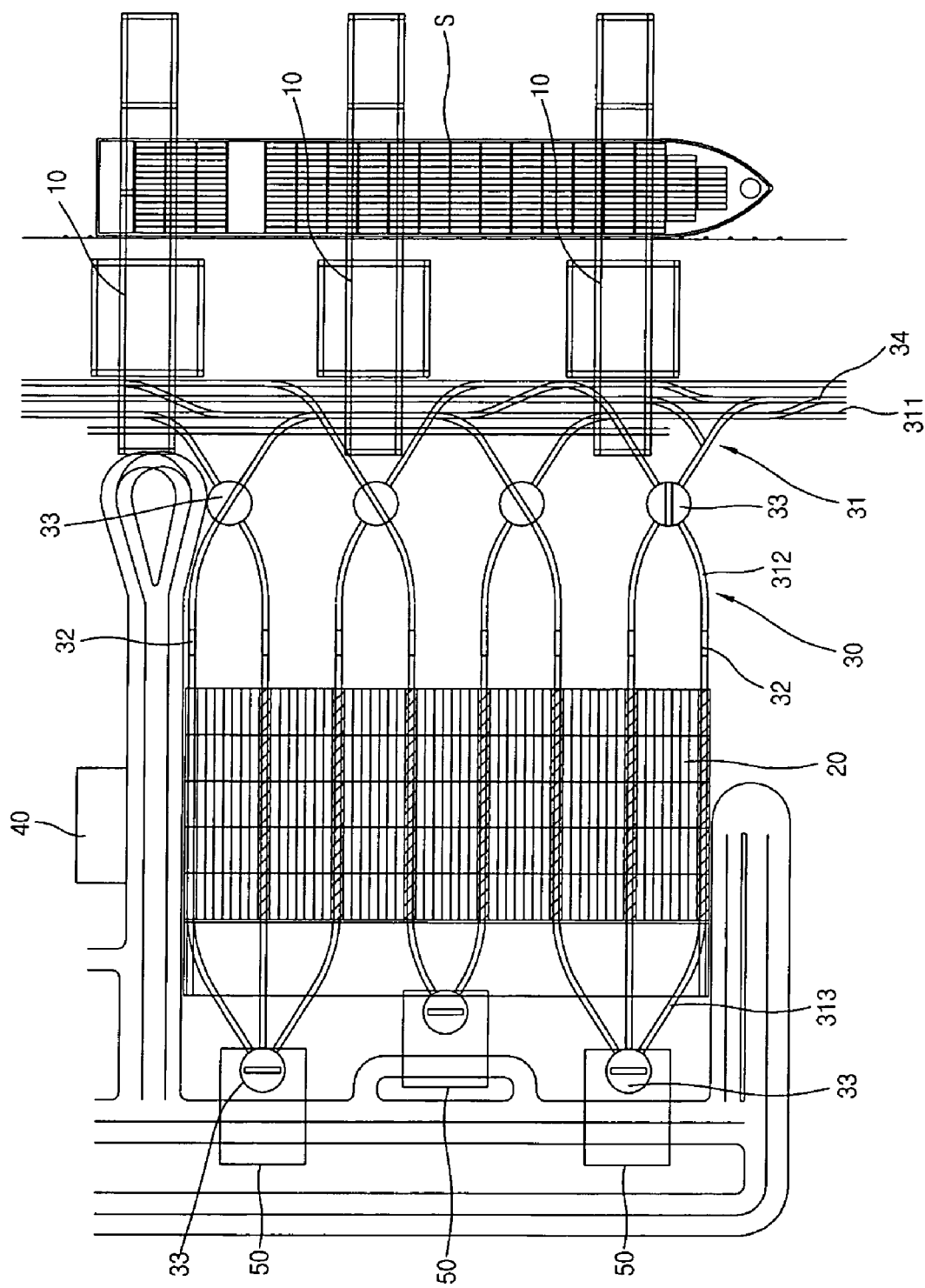
FIG. 6 is a plan view schematically showing an apparatus for storing and transferring containers according to the present invention.
Figure 7:
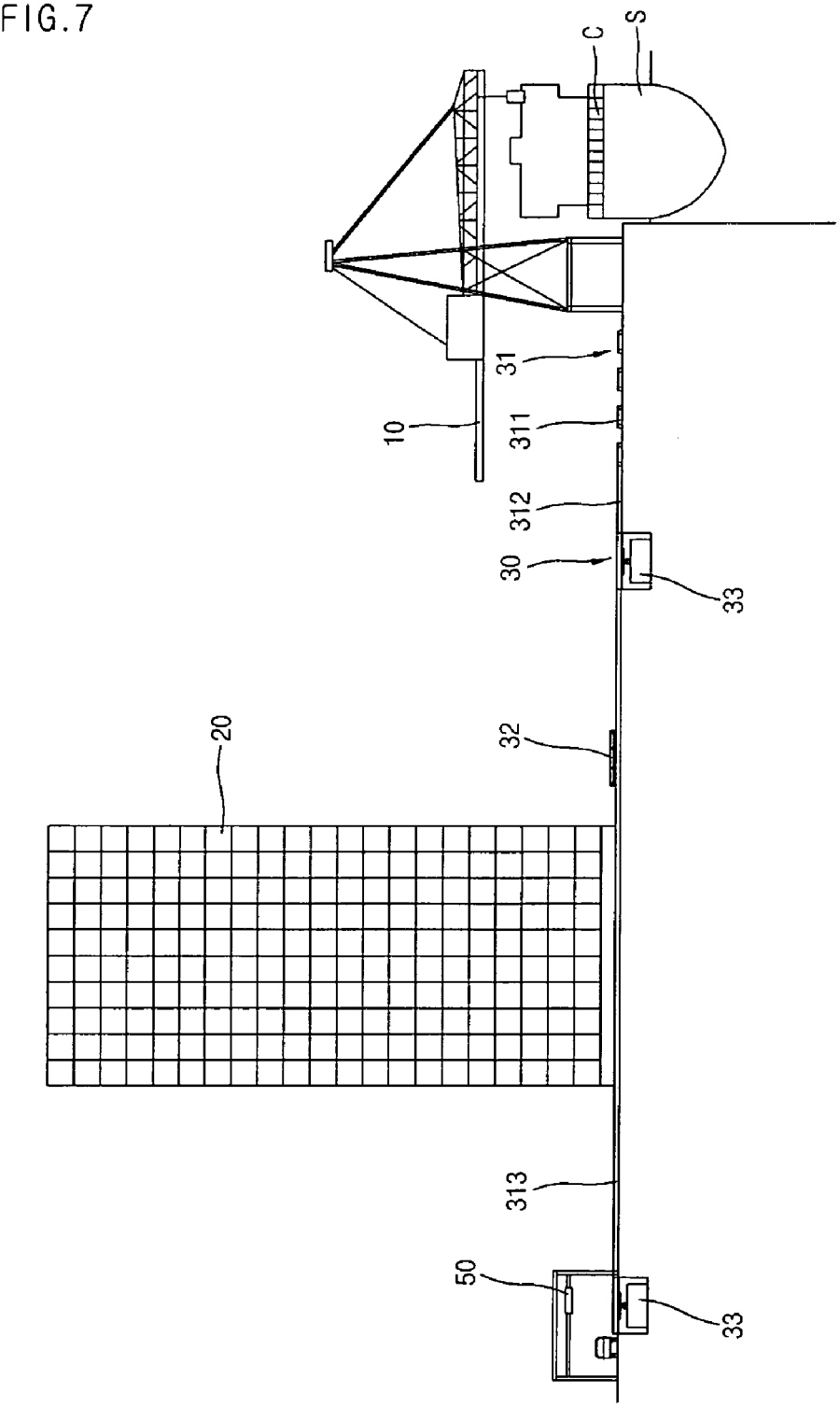
FIG. 7 is a longitudinal sectional view schematically showing an apparatus for storing and transferring containers according to the present invention.

FIG. 6 is a plan view schematically showing an apparatus for storing and transferring containers according to the present invention, and FIG. 7 is a longitudinal sectional view schematically showing an apparatus for storing and transferring containers according to the present invention.

As shown in FIGS. 6 and 7, the apparatus for storing and transferring containers comprises: at least one loading/unloading unit 10 for loading or unloading containers onto or from a container ship S; a stacking unit 20 disposed at a harbor in front of the loading/unloading unit 10; a transferring unit 30 disposed between the loading/unloading unit 10 and the stacking unit 20; a central controlling unit 40 for controlling the transferring unit 30; and at least one taking-in/taking-out unit 50 mounted to the end of the transferring unit 30 at one side of the stacking unit 20 far away from the loading/unloading unit 10.

The loading/unloading unit 10 is disposed at the harbor for loading or unloading containers onto or from the container ship S. Preferably, the loading/unloading unit 10 is a gantry crane.

The stacking unit 20 is provided with a plurality of stacking chambers. The stacking unit 20 has a stacking device for stacking containers. When the containers are introduced into the stacking unit through the lower part of the stacking unit by means of the transferring unit 30, the containers are held by means of the stacking device so that the containers are stored in the stacking chambers.

The operation of the stacking device mounted in the stacking unit 20 is controlled by means of the central controlling unit 40.

The transferring unit 30 comprises: a railroad line 31 connected between the lower part of the loading/unloading unit 10 and the taking-in/taking-out unit 50 via the stacking unit 20; and automatic bogies 32 movable automatically along the railroad line 31 according to the control of the central controlling unit 40.

The railroad line 31 comprises: a plurality of transverse railroad line parts 311 disposed at the lower part of the loading/unloading unit 10 while being perpendicular to the loading/unloading unit 10; a plurality of cross railroad line parts 312 crossing each other while being perpendicular to the transverse railroad line parts 311, the cross railroad line parts 312 being arranged from the transverse railroad line parts 311 to the stacking unit 20; and convergent railroad parts 313 extending from the ends of the cross railroad line parts 312 such that the convergent railroad parts 313 are convergent to the taking-in/taking-out unit 50.

At the sections where the cross railroad line parts 312 cross each other and at the sections where the convergent railroad parts 313 are convergent are disposed railroad line-rotating parts 33, respectively. At the sections where the cross railroad line parts 312 are connected to the transverse railroad line parts 311 are disposed railroad line-switching parts 34, respectively.

Containers unloaded from the container ship by means of the loading/unloading unit 10, containers introduced from the outside of the harbor by means of the taking-in/taking-out unit 50, or containers stored in the stacking unit 20 are loaded onto the transferring unit 30. And then, the transferring unit 30 is moved to a predetermined position according to the control of the central controlling unit 40.

Specifically, the automatic bogies 32 of the transferring unit 30, on which the containers are placed, are moved to the loading/unloading unit 10, the stacking unit 20, and the taking-in/taking-out unit 50 along the railroad line 31 so that the containers can be transferred.

The transverse railroad line parts 311 are disposed perpendicularly to the loading/unloading unit 10 such that the automatic bogies 32 can be moved on the transverse railroad line parts 311. The cross railroad line parts 312, which are connected to the transverse railroad line parts 311, are disposed such that the automatic bogies 32 can be moved from the transverse railroad line parts 311 to predetermined positions of the stacking unit 20.

The convergent railroad parts 313 are disposed such that the automatic bogies 32, on which the containers to be removed from the harbor are placed, are moved to the taking-in/taking-out unit 50.

The automatic bogies 32, on which the containers are placed, are automatically moved along the railroad line 31 according to the control of the central controlling unit 40 while the automatic bogies 32 perform a wireless transmission and reception with the central controlling unit 40 so that the containers can be transferred to the predetermined position.

The railroad line-rotating parts 33 are disposed on the cross railroad line parts 312 such that the railroad line-rotating parts 33 can be rotated while the automatic bogies 32 are placed on the railroad line-rotating parts 33. As the railroad line-rotating parts 33 are rotated, the line connections of the cross railroad line parts 312 are changed. Consequently, the routes along which the automatic bogies 32 are moved are smoothly changed.

Also, the railroad line-rotating parts 33 are disposed at the convergent ends of the convergent railroad parts 313. The containers transferred along the convergent railroad parts 313 are rotated together with the automatic bogies 32 by means of the railroad line-rotating parts 33 so that the containers can be smoothly loaded onto the trailers by means of the taking-in/taking-out unit 50. On the other hand, containers taken to the container terminal by means of the trailer are loaded onto the automatic bogies 32 by means of the taking-in/taking-out unit 50, and are then rotated together with the automatic bogies 32 so that the containers can be smoothly moved along the convergent railroad parts 313.

The railroad line-switching parts 34 are disposed at the sections where the cross railroad line parts 312 and the transverse railroad line parts 311 are connected to each other. Specifically, the above-mentioned connection sections are connected between the transverse railroad line parts 311 so that the railroad line parts can be smoothly switched. The railroad line-switching parts 34 are well known.

The operation of the apparatus for storing and transferring containers according to the present invention when the containers are unloaded from the container ship S will now be described in detail.

When the containers are to be unloaded from the container ship S by means of the loading/unloading unit 10, the loading/unloading unit 10 transmits information of the containers to the central controlling unit 40.

When the information of the containers is transmitted to the central controlling unit 40, one of the automatic bogies 32 positioned nearest to the loading/unloading unit 10 having transmitted the information of the containers to the central controlling unit 40 is moved to the loading/unloading unit 10 according to the control of the central controlling unit 40. When the automatic bogie 32 reaches the loading/unloading unit 10, the containers are loaded onto the automatic bogie 32 by means of the loading/unloading unit 10.

After the containers are loaded onto the automatic bogie 32, the central controlling unit 40 analyzes the information of the containers and information of the stacking unit 20 to determine whether the containers are to be stacked onto the stacking unit 20 or removed from the container terminal by means of the taking-in/taking-out unit 50.

If it is determined, by the central controlling unit 40, that the containers are to be removed from the container terminal, the automatic bogie 32 is moved to the taking-in/taking-out unit 50 through the stacking unit 20 along the railroad line 31 selected by means of the central controlling unit 40. The containers, which are placed on the automatic bogie 32 and transferred, are loaded onto the trailer by means of the taking-in/taking-out unit 50 according to the control of the central controlling unit 40. In this way, the containers are removed from the container terminal.

If it is determined, by the central controlling unit 40, that the containers are to be stacked on the stacking unit, the central controlling unit 40 analyzes the information of the stacking unit 20 to select a proper stacking position and the shortest route to the stacking position. The automatic bogie 32 is moved along the railroad line 31 corresponding to the shortest route.

When the automatic bogie 32, on which the containers are placed, reaches the stacking unit 20, the stacking device of the stacking unit 20 moved the containers to the predetermined stacking position according to the control of the central controlling unit 40. In this way, the containers are stacked on the stacking unit 20.

On the other hand, the operation of the apparatus for storing and transferring containers according to the present invention when the containers are loaded onto the container ship S is as follows. When the containers are to be loaded onto the container ship S by means of the loading/unloading unit 10, the loading/unloading unit 10 transmits information of the containers to the central controlling unit 40. When the information of the containers is transmitted to the central controlling unit 40, the central controlling unit 40 analyzes the information of the containers to identify the position where the containers are placed.

When the position of the containers is identified by means of the central controlling unit 40, the automatic bogie 32 placed at the shortest distance from the position of the containers is moved to the position of the containers. When the automatic bogie 32 reaches the identified position of the containers, the containers are loaded onto the automatic bogie 32, and then the automatic bogie 32 is moved to the loading/unloading unit 10 along the shortest route of the railroad line 31.

When the automatic bogie 32 reaches the loading/unloading unit 10, the containers placed on the automatic bogie 32 are picked up by means of the loading/unloading unit 10, and are then loaded onto the container ship S.

Consequently, the apparatus for storing and transferring containers according to the present invention is capable of quickly and accurately handling containers loaded onto the container ship S or containers unloaded from the container ship S.

Figure 8:
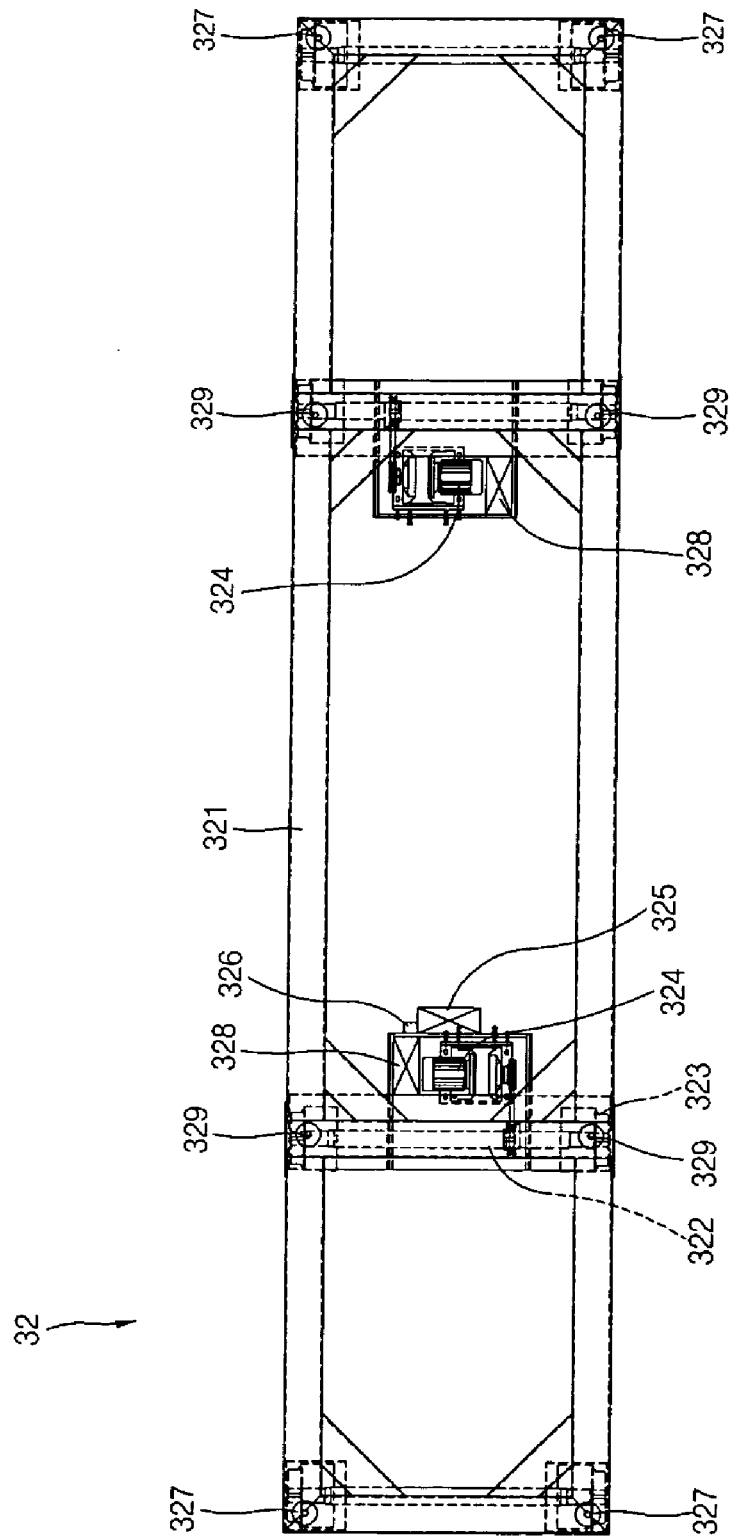
FIG. 8 is a plan view showing an automatic bogie according to the present invention.
Figure 9:
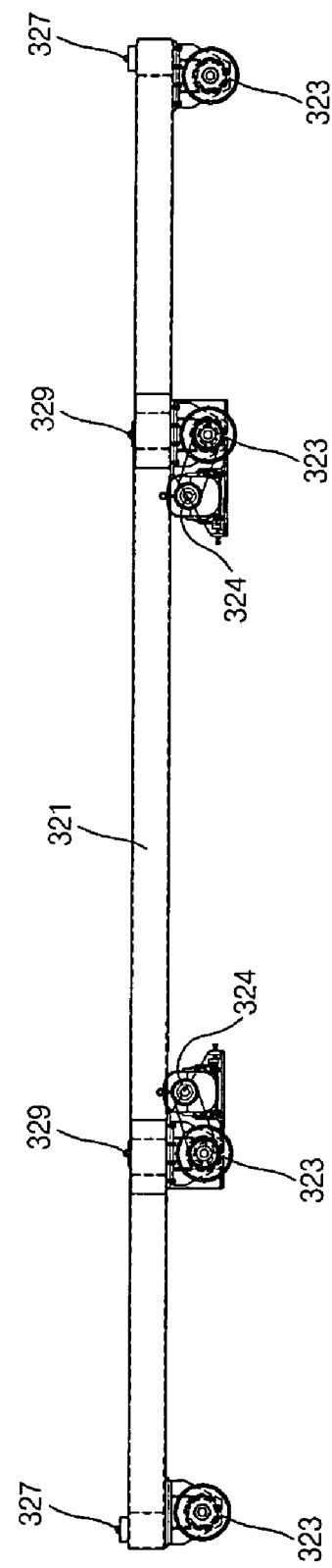
FIG. 9 is a front sectional view schematically showing the automatic bogie of FIG. 8.
Figure 10:
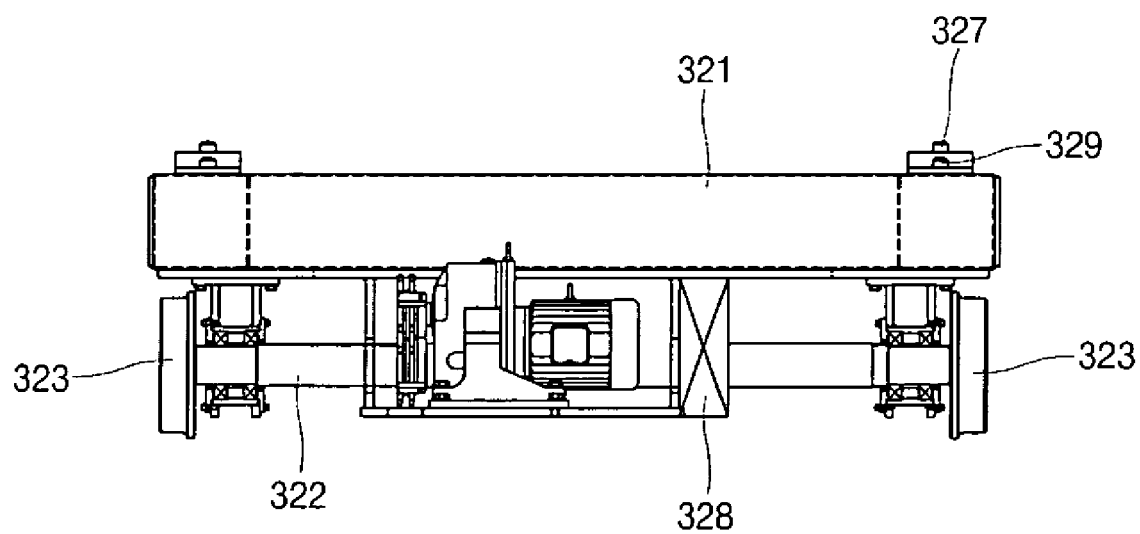
FIG. 10 is a side sectional view schematically showing the automatic bogie of FIG. 8.

FIG. 8 is a plan view showing an automatic bogie according to the present invention, FIG. 9 is a front sectional view schematically showing the automatic bogie of FIG. 8, and FIG. 10 is a side sectional view schematically showing the automatic bogie of FIG. 8.

As shown in FIGS. 8, 9 and 10, the automatic bogie 32, which is provided at the apparatus for storing and transferring containers, comprises: a rectangular frame-shaped bogie body 321 for supporting the lower surface of the container; a plurality of bogie shafts 322 rotatably mounted to the lower surface of the bogie body 321; bogie wheels 323 securely fixed to both ends of each of the bogie shafts 322; and bogie driving parts 324 for driving the bogie wheels 323.

At one side of one of the bogie driving parts 324 is provided a bogie control part 325. To one side of the bogie control part 325 is attached a wireless transceiver 326. To the upper surface of the bogie body 321 are attached fixing protrusions 327 and insertion protrusions 329. Each of the fixing protrusions 327 have a height different from the height of each of the insertion protrusions 329 have so that containers having different lengths can be secured by means of the fixing protrusions 327 or the insertion protrusions 329. At one side of each of the bogie driving parts 324 is disposed a rechargeable battery 328.

The bogie control part 325 analyzes a control signal of the central controlling unit, which is received by means of the wireless transceiver 326, and drives the bogie driving part 324 on the basis of the analyzed control signal. As a result, the bogie shaft 322 is rotated, and thus the wheels 323 are also rotated. In this way, the automatic bogie 32 is moved along the railroad line.

While the automatic bogie 32 is moved along the railroad line, the current position of the automatic bogie 32 is frequently detected by means of the bogie control part 325. The detected positional information is transmitted to the central controlling unit by means of the wireless transceiver 326 so that the current position of the automatic bogie 32 can be precisely recognized by means of the central controlling unit.

The fixing protrusions 327 are disposed at corners of the upper surface of the bogie body such that the fixing protrusions can be securely inserted into the corner areas of a large-sized container, for example, a container having a length of 40 ft.

The insertion protrusions 329 are disposed at the upper surface of the bogie body while being arranged between the fixing protrusions 327 in the longitudinal direction of the automatic bogie such that the insertion protrusions 329 are positioned lower than the fixing protrusions 327. The insertion protrusions 329 are securely inserted into the corner areas of a small-sized container, for example, a container having a length of 20 ft.

As described above, the fixing protrusions 327 each having a predetermined height and the insertion protrusions 329 having another predetermined height different from the height of each of the fixing protrusions 327 are attached to the upper surface of the bogie body 321. Consequently, not only a large-sized container but also a small-sized container can be securely placed on the automatic bogie 32.

The rechargeable battery 328 is provided at one side of each bogie driving part 324 for supplying electric current to the bogie driving part 324. Consequently, the automatic bogie 32 can be freely moved without being connected to an additional power line.

Figure 11:
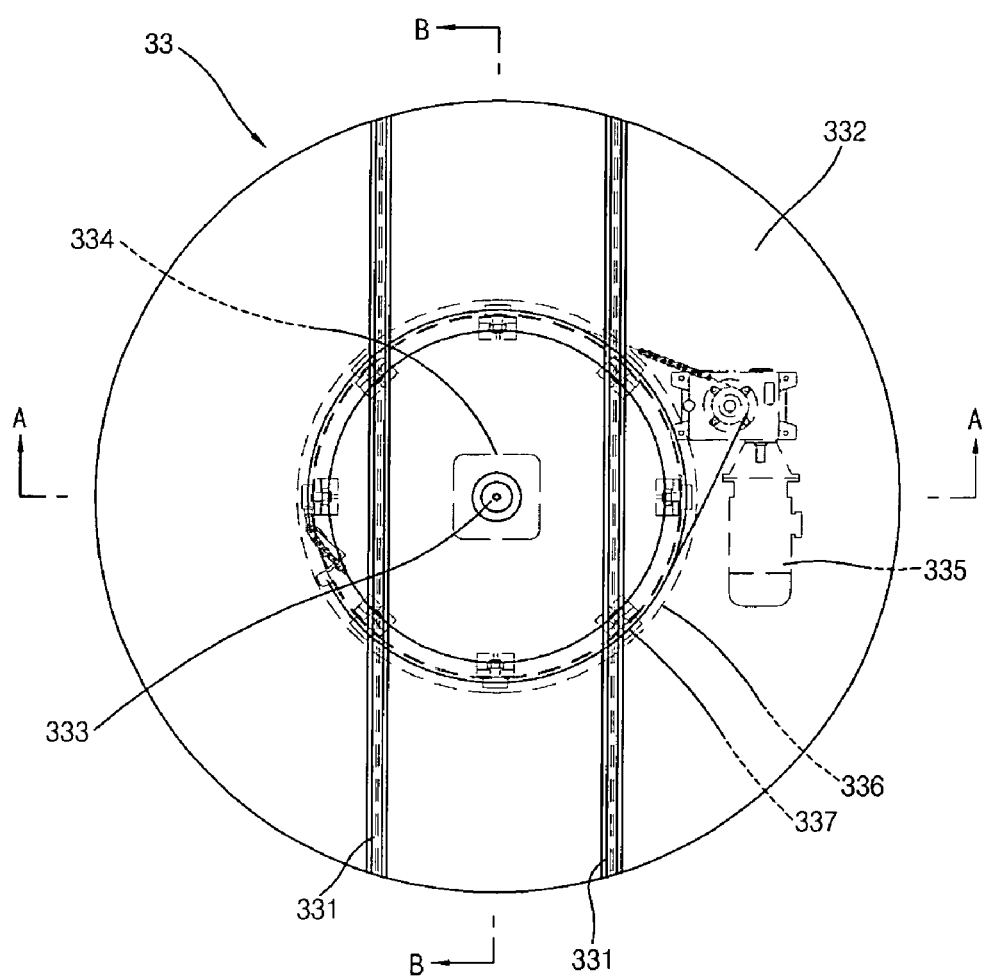
FIG. 11 is a plan view showing a railroad line-rotating part according to the present invention.
Figure 12:
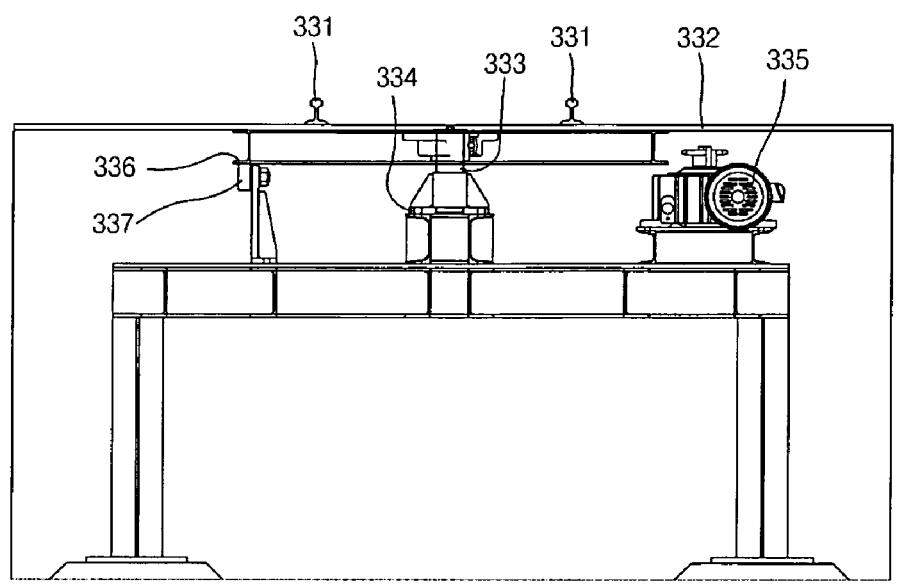
FIG. 12 is a cross-sectional view taken along line A-A of FIG. 11.
Figure 13:
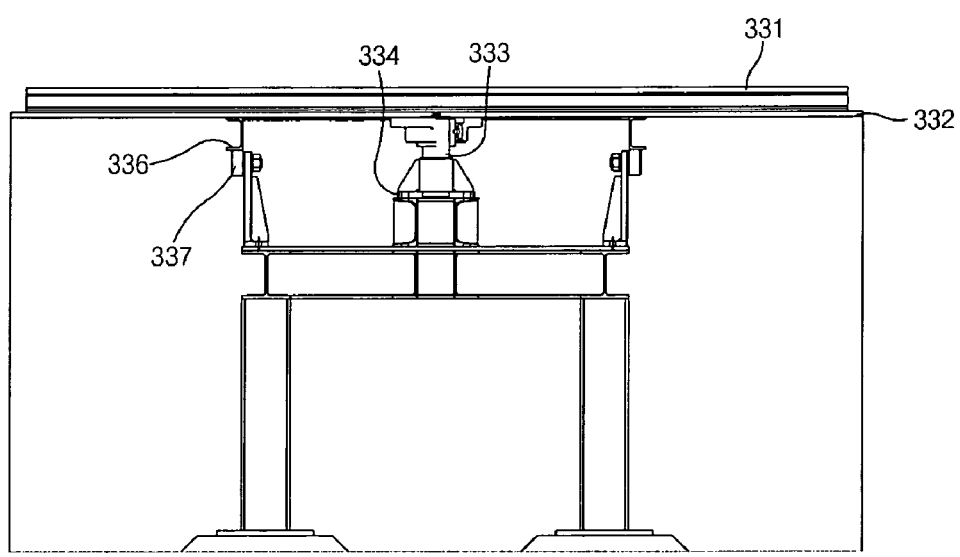
FIG. 13 is a cross-sectional view taken along line B-B of FIG. 11.

FIG. 11 is a plan view showing a railroad line-rotating part according to the present invention, FIG. 12 is a cross-sectional view taken along line A-A of FIG. 11, and FIG. 13 is a cross-sectional view taken along line B-B of FIG. 11.

As shown in FIGS. 11, 12 and 13, the railroad line-rotating part 33, which is provided at the apparatus for storing and transferring containers, comprises: a circular table 332 having connection railroad line parts 331 disposed on the upper surface thereof; a rotary shaft 333 mounted to the center of the lower surface of the circular table 332; a base 334 for rotatably supporting the rotary shaft 333; and a rotary driving part 335 for rotating the circular table 332.

To the lower surface of the circular table 332 is attached an annular supporting protrusion 336 such that the supporting protrusion 336 is disposed around the rotary shaft while being spaced apart from the rotary shaft. To the lower surface of the supporting protrusions 336 are rotatably attached a plurality of supporting rollers 337.

More than one railroad line-rotating part 33 is provided so that the railroad line-rotating parts are disposed at the sections where the cross railroad line parts cross each other and at the sections where the convergent railroad parts are convergent, respectively. When the rotary driving part 335 is rotated according to the control of the central controlling unit, the circular table 332 is also rotated. As the circular table 332 is rotated, the cross railroad line parts and the convergent railroad parts are connected to or disconnected from the connection railroad line parts 331 disposed at the upper surface of the circular table 332. Consequently, the railroad line parts are smoothly switched, and thus the direction of the container placed on the automatic bogie is changed.

The base 334 supports the rotary shaft 333, to which the circular table 332 is securely fixed. The annular supporting protrusion 336 and the supporting rollers disposed at the lower surface of the circular table 332 stably support the circular table 332 when the circular table 332 is rotated.

Figure 14:
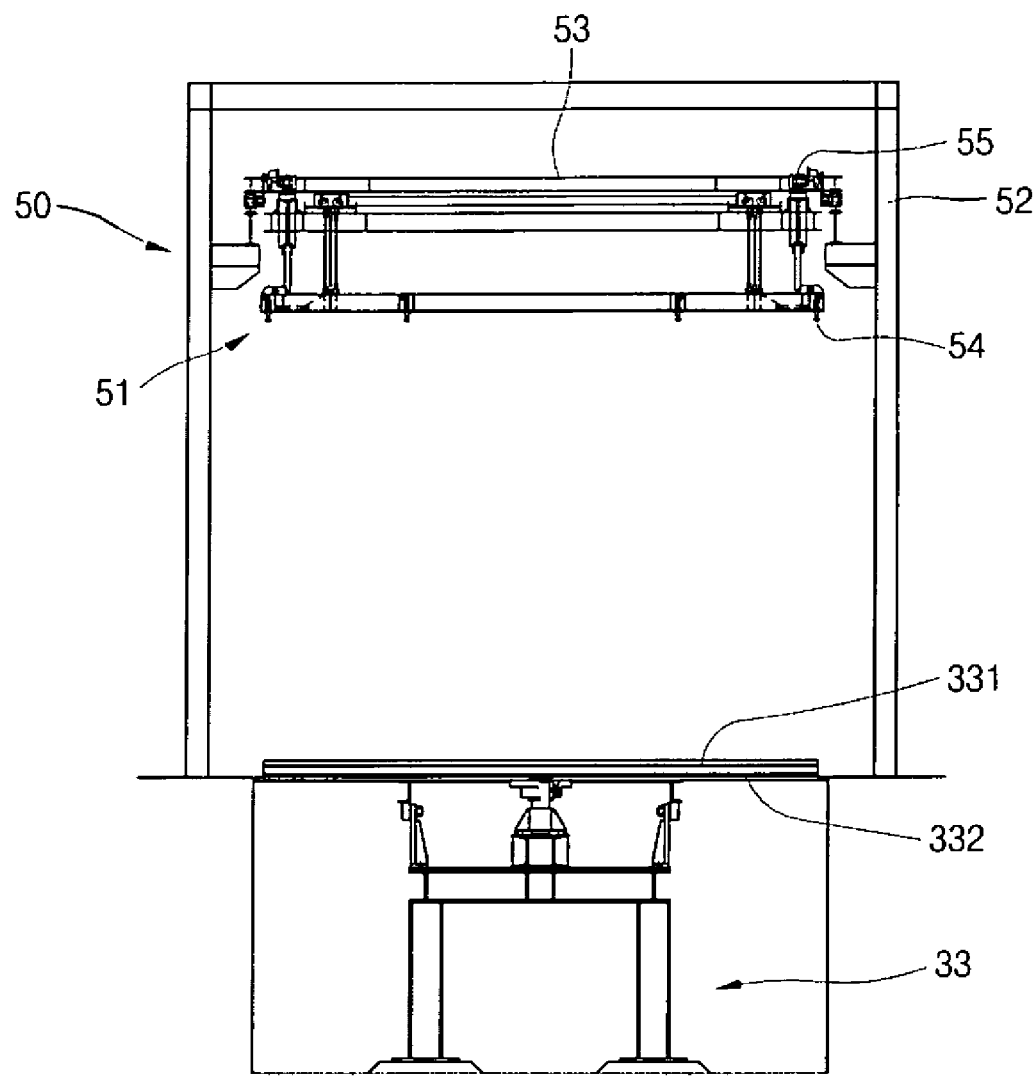
FIG. 14 is a longitudinal sectional view schematically showing a taking-in/taking-out unit according to the present invention.

FIG. 14 is a longitudinal sectional view schematically showing a taking-in/taking-out unit according to the present invention.

As shown in FIG. 14, the taking-in/taking-out unit 50, which is provided at the apparatus for storing and transferring containers, has a loader 51 for picking up the container moved along the convergent railroad line parts by means of the automatic bogie and moving the picked container.

The loader 51 comprises: a loader frame 52 mounted above the railroad line-rotating part 33 disposed at the convergent ends of the convergent railroad parts; a moving bogie 53 movable along the loader frame 52 by means of a loader driving part 55; and a plurality of holder parts 54 attached to the moving bogie 53.

When the automatic bogie, on which the container is placed, arrives at the connection railroad line parts 331 of the railroad line-rotating part 33, the circular table 332 of the railroad line-rotating part 33 is rotated such that the circular table 332 is level with the loader 51. At this time, the loader driving part 55 of the loader 51 is operated according to the control of the central controlling unit. As a result, the moving bogie 53 is moved along the loader frame 52 so that the moving bogie is positioned above the container.

When the moving bogie 53 is positioned above the container, the plurality of holder parts 54 are moved downward so that the container can be held by means of the holder parts 54. Subsequently, the holder parts 54 are moved upward, and are then moved to the trailer so that the container can be loaded onto the trailer.

When the container is taken to the container terminal by means of the trailer, on the other hand, the container on the trailer is held by means of the holder parts, and then the container is loaded onto the automatic bogie.

Figure 15:
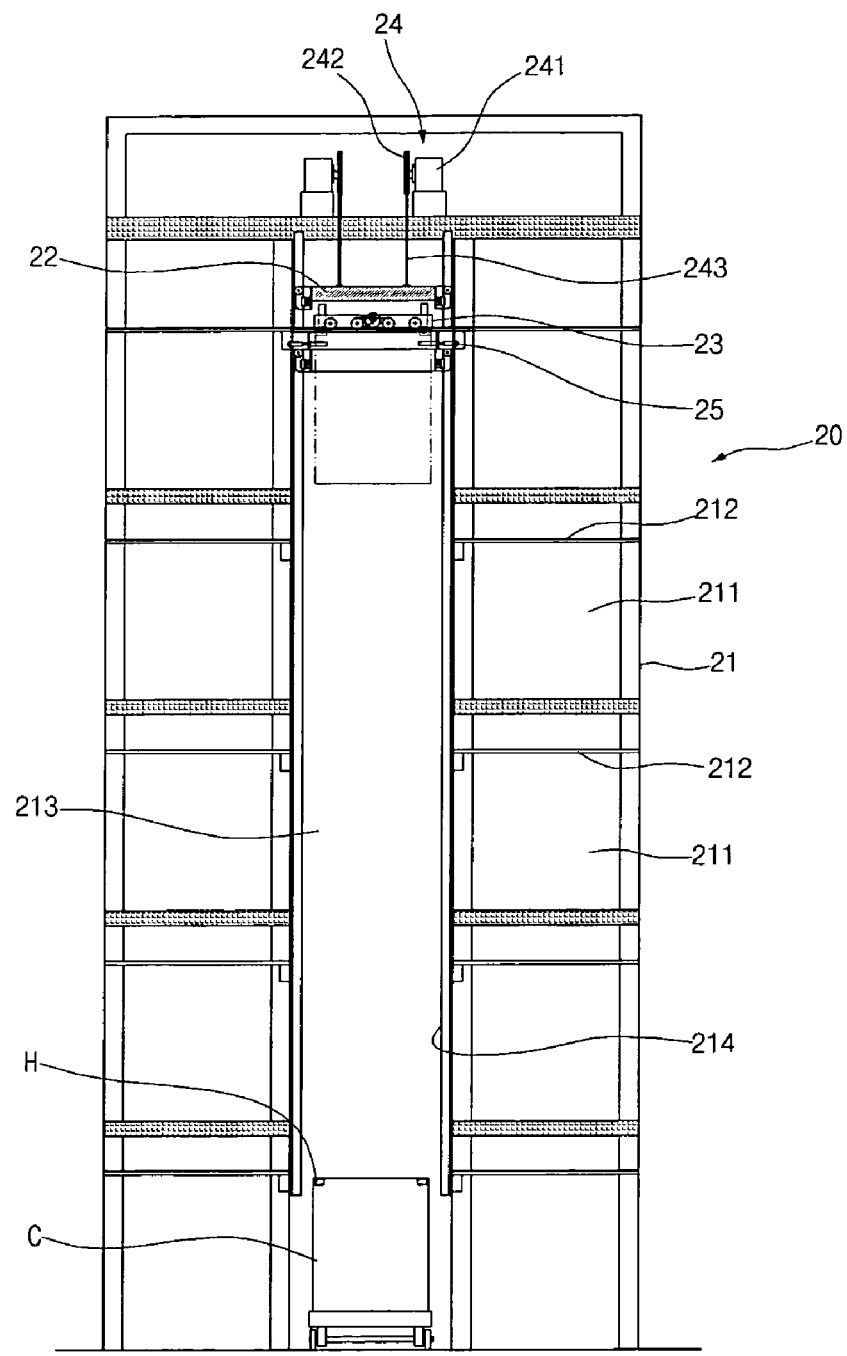
FIG. 15 is a front sectional view schematically showing a stacking unit according to a first preferred embodiment of the present invention.
Figure 16:
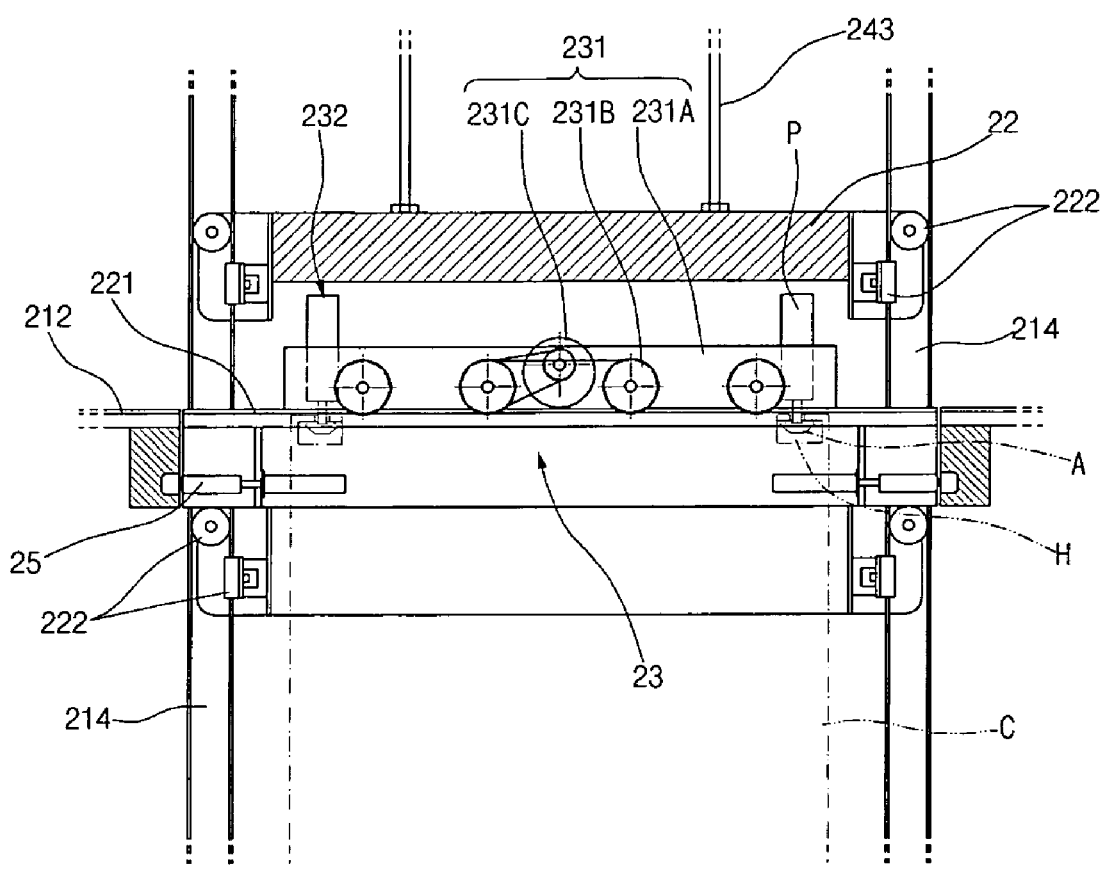
FIG. 16 is an enlarged view, in part, of the stacking unit shown in FIG. 15.

FIG. 15 is a front sectional view schematically showing a stacking unit according to a first preferred embodiment of the present invention, and FIG. 16 is an enlarged view, in part, of the stacking unit shown in FIG. 15.

As shown in FIGS. 15 and 16, the stacking unit 20 comprises: a tower-shaped steel-frame body 21; a cage 22 movable upward and downward in the steel-frame body 21; a traveler 23 attached to the cage 22 such that the traveler can be moved horizontally; lifting parts 24 for moving the cage 22 upward or downward; and locking parts 25 for locking the cage 22 at a predetermined position.

Specifically, the steel-frame body 21 is constructed in a multi-storied structure such that the steel-frame body has a plurality of stacking chambers 211 defined therein. In each stacking chamber 211 are disposed horizontal rails 212. In the center of the steel-frame body 21 is defined a lifting channel 213, which extends vertically between the stacking chambers 211.

A plurality of containers C are moved upward or downward through the lifting channel 213 of the steel-frame body 21 so that the containers can be stacked into the stacking chambers 211, respectively.

The traveler 23 is moved to the stacking chamber 211 along the horizontal rails 212.

Each of the lifting parts 24 comprises a hydraulic motor 241, a driving pulley 242, and wire ropes 243. The cage 22 is connected to the wire ropes 243 so that the cage can be moved upward or downward along the lifting channel 213 by means of the lifting parts 24. The lower part and both side parts of the cage 22 are opened. The cage 22 is provided at both sides of the opened lower part thereof with horizontal rails 221, which correspond to the horizontal rails 212 of the stacking chamber 211.

As the driving pulleys 242 are rotated with the rotation of the hydraulic motors 241, the wire ropes 243 are wound or unwound with the result that the cage 22 is moved upward or downward along the lifting channel 213. Consequently, the traveler 23, which is in rolling contact with the horizontal rails 221 while being disposed below the cage, is also moved upward or downward.

The traveler 23 movably disposed on the upper surface of the horizontal rails 221 is moved horizontally along the horizontal rails 221. Consequently, the traveler 23 is smoothly shifted onto the horizontal rails 212 of the stacking chamber 211.

The cage 22 is stopped at the position where the horizontal rails 212 precisely correspond to the horizontal rails 221 and then properly moved upward or downward by means of the hydraulic motor 241.

The traveler 23 comprises: a horizontal driving part 231 disposed below the cage 22 such that the horizontal driving part 231 can be moved horizontally along the horizontal rails 221; and holder parts 232 disposed vertically to the horizontal driving part 231 for engaging in or disengaging from holes H formed at the upper surface of the container C.

The horizontal driving part 231 comprises: a main body 231A disposed below the cage 22; a plurality of driving rollers 231B rotatably disposed at both sides of the main body 231A such that the driving rollers are placed on the horizontal rails 221 while being in rolling contact with the horizontal rails 221; and a driving motor 231C securely fixed to the main body 231A for driving the driving rollers 231B.

The traveler 23 is moved along the horizontal rails 221 and the horizontal rails 212 by means of the horizontal driving part 231 while the holder parts 232 of the traveler 23 are engaged into or disengaged from the holes H formed at the upper surface of the container C such that the container is connected to the traveler or the container is disconnected from the traveler. Consequently, the traveler 22 stacks the container C into the stacking chamber 211 while holding the container or removing the container C from the stacking chamber 211.

Each of the holder parts 232 comprises a hydraulic cylinder P and a hook A. The hook A is inserted into the corresponding hole H of the container C by means of the hydraulic cylinder P, and is then rotated so that the hook is caught in the hole H. Consequently, the container C is held. The reverse operation is also possible. In this case, the container C is released. The holder part, which is used to move the container C while holding the container C, is well known.

The locking parts 25 securely lock the cage 22 at a predetermined position, i.e., at the position where the height of the horizontal rails 212 of the stacking chamber 211 is equal to the height of the horizontal rails 221 of the cage 22.

Consequently, the cage 22 is locked at the predetermined position by means of the locking parts 25. In addition, the locking parts 25 adequately support the center of gravity of the container when the traveler 23 is moved along the horizontal rails 221 for effectively preventing collision of the container with the apparatus, which could occur when the container C is abruptly inclined due to the change of the center of gravity of the container.

Each of the locking parts 25 comprises a cylinder rod protruded outwardly from the cage 22 such that the cylinder rod is securely inserted in a corresponding hole formed at the steel-frame body 21, although each of the locking parts 25 may comprise one of other proper locking means.

Along the lifting channel 213 are vertically disposed a plurality of guide rails 214. To the outside of the cage 22 are rotatably attached a plurality of rollers 222 such that the rollers 222 are in contact with the guide rails 214. The rollers 222 are moved vertically along the guide rails 214 while being guided by means of the guide rails 214. As a result, the cage 22 is properly guided when the cage 22 is moved upward and downward.

As described above, the stacking facility has a simple structure with a small area while performing a precise operation. Consequently, a great number of containers C can be easily stacked onto the stacking facility.

Figure 17:
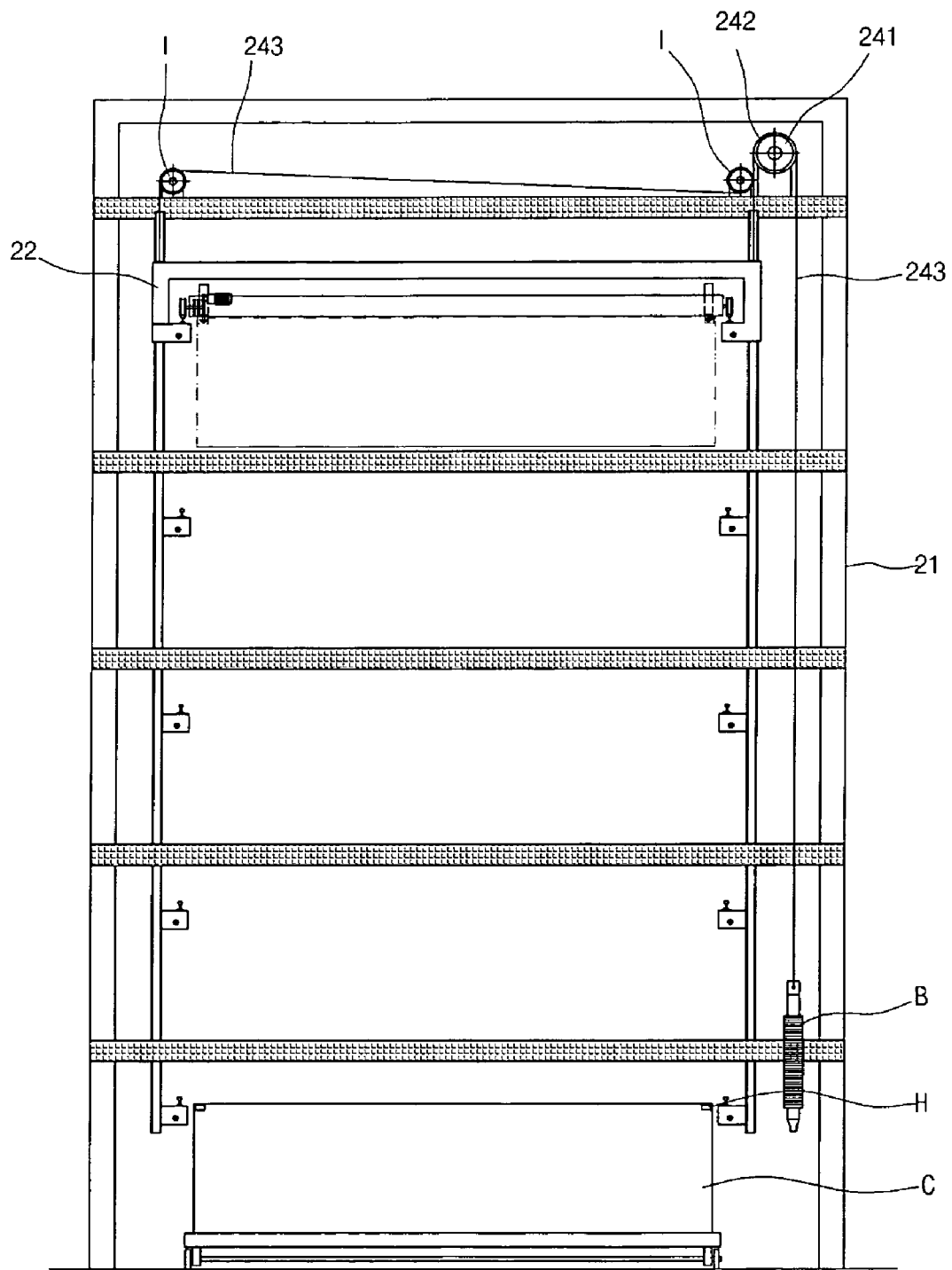
FIG. 17 is a side sectional view schematically showing the stacking unit of FIG. 15.
Figure 18:
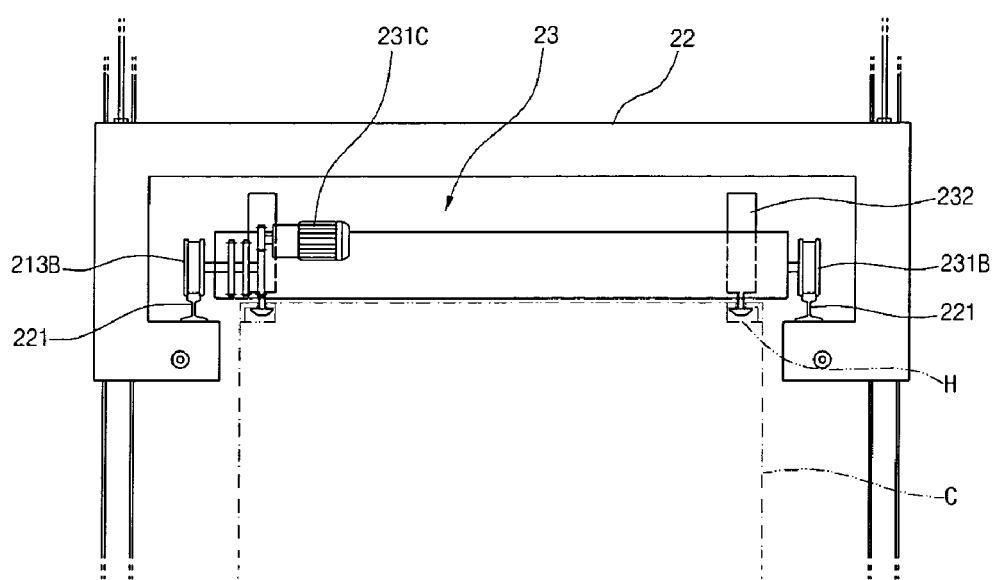
FIG. 18 is an enlarged view, in part, of the stacking unit shown in FIG. 17.

FIG. 17 is a side sectional view schematically showing the stacking unit of FIG. 15, and FIG. 18 is an enlarged view, in part, of the stacking unit shown in FIG. 17.

As shown in FIG. 17, the upward/downward movement of the cage 22 is achieved by means of the wire ropes 243. One end of each of the wire ropes 243 wound on the driving pulley 242, which is driven by means of the hydraulic motor 241, is connected to either side of the upper end of the cage 22 via an idle pulley I, and the other end of each of the wire ropes 243 is provided in the steel-frame body 21 while being connected to a balance weight B.

Specifically, the wire ropes 243 each having one end thereof connected to the cage 22 and the other end thereof connected to the balance weight B are wound or unwound as the driving pulley 242 is rotated by means of the hydraulic motor 241. As a result, the upward/downward movement of the cage 22 is achieved.

As shown in FIG. 18, the driving rollers 231B are connected to each other by means of a gear and a chain. The gear for the driving rollers 231B are engaged with the gear of the driving motor 231C such that the gear for the driving rollers 231B can rotated relative to the gear of the driving motor 231C.

The traveler 23 is disposed in the cage 22, and the driving rollers 231B are disposed on the horizontal rails 221 while being in rolling contact with the horizontal rails 221. Consequently, the cage 22 is moved according to the operation of the driving motor 231C.

Preferably, the container C held by means of the holder parts 232 provided at the traveler 23 while the container C is laterally disposed so that the container can be moved into the stacking chamber a short distance.

Figure 19:
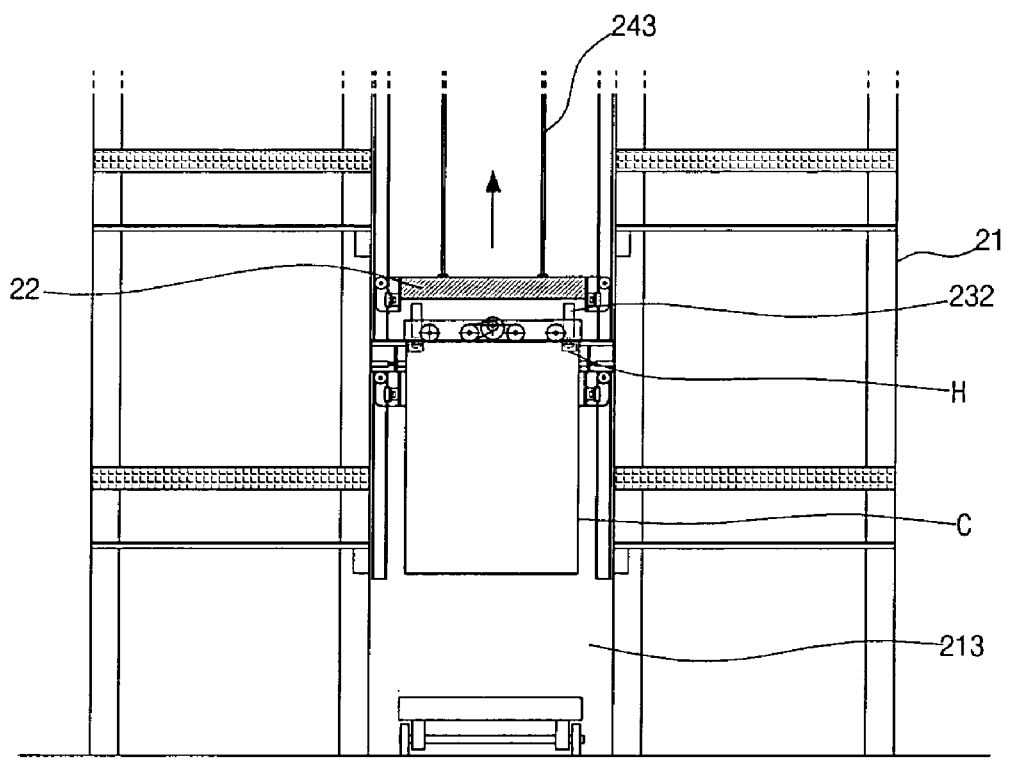
FIG. 19 is a front sectional view of a cage of the stacking unit according to the first preferred embodiment of the present invention showing that the cage is moved upward and downward.
Figure 20:
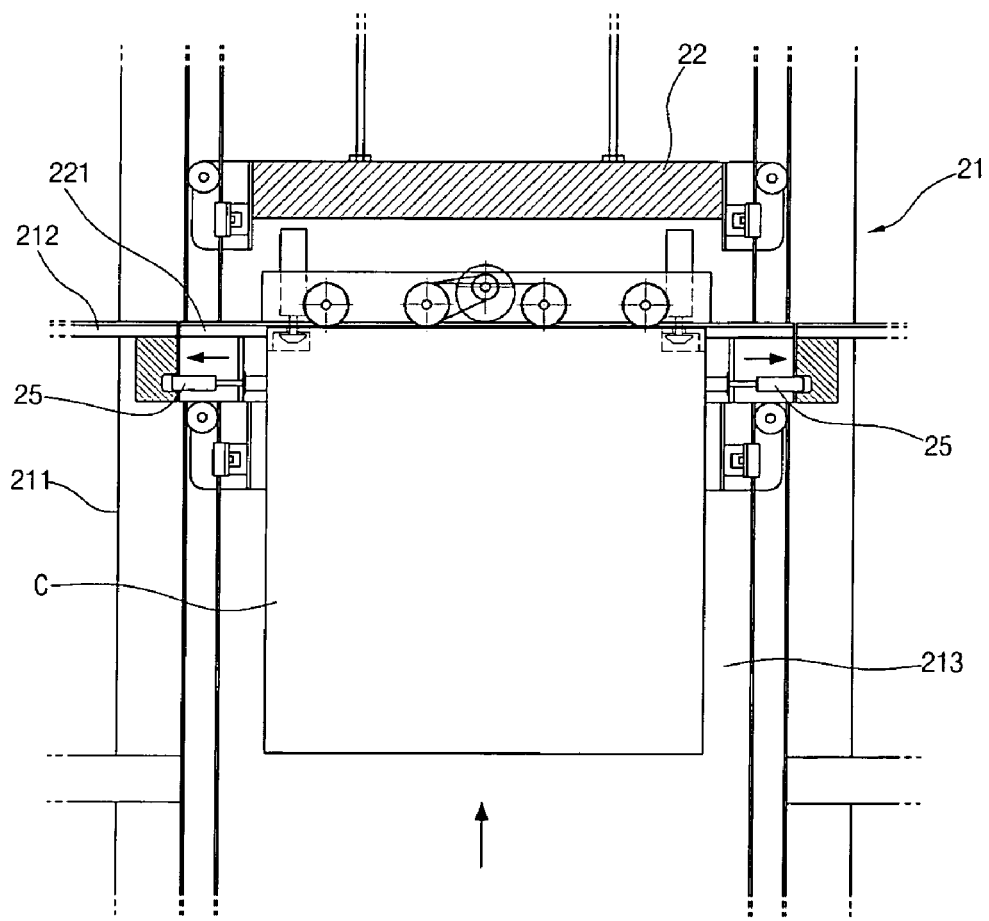
FIG. 20 is an enlarged view, in part, of the cage of the stacking unit according to the first preferred embodiment of the present invention showing that the cage is locked.
Figure 21:
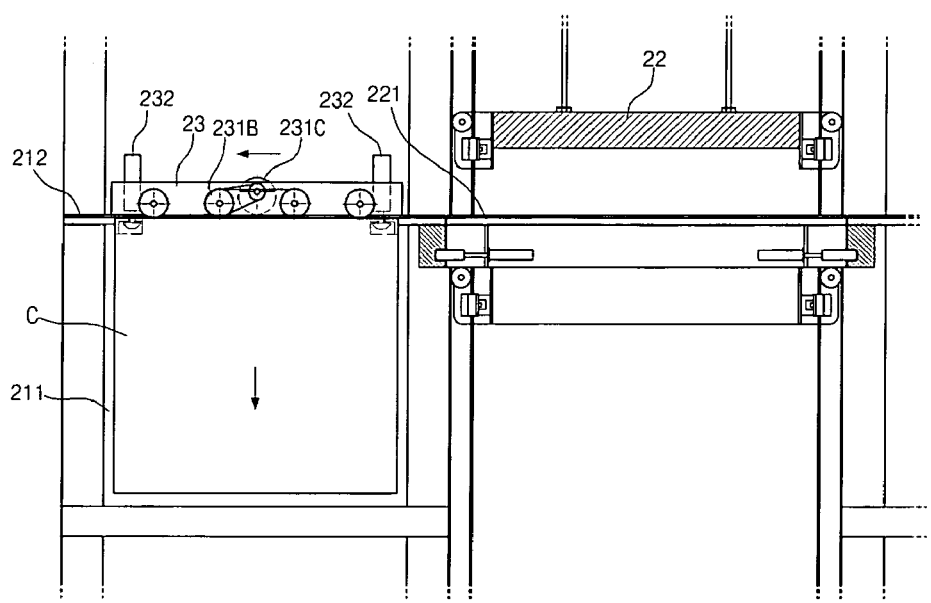
FIG. 21 is an enlarged view, in part, of a traveler of the stacking unit according to the first preferred embodiment of the present invention showing that the traveler is moved horizontally.
Figure 22:
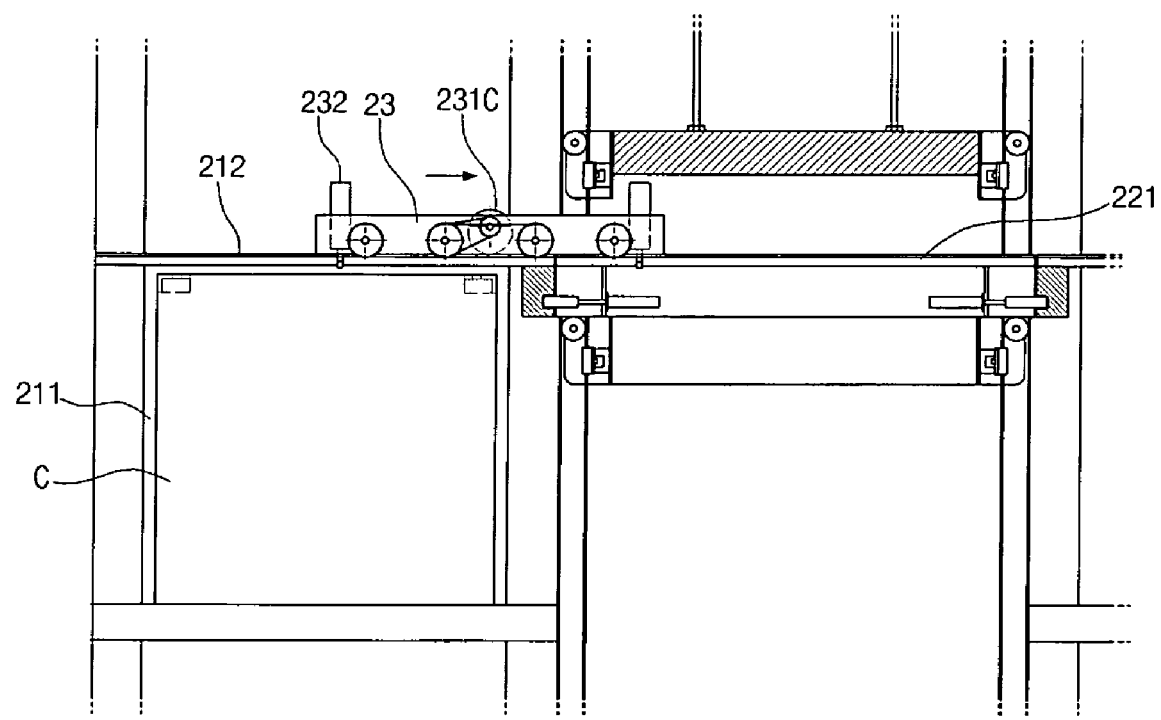
FIG. 22 is an enlarged view, in part, of the stacking unit according to the first preferred embodiment of the present invention showing that a container is stacked onto the stacking unit.

FIG. 19 is a front sectional view of a cage of the stacking unit according to the first preferred embodiment of the present invention showing that the cage is moved upward and downward, FIG. 20 is an enlarged view, in part, of the cage of the stacking unit according to the first preferred embodiment of the present invention showing that the cage is locked, FIG. 21 is an enlarged view, in part, of a traveler of the stacking unit according to the first preferred embodiment of the present invention showing that the traveler is moved horizontally, and FIG. 22 is an enlarged view, in part, of the stacking unit according to the first preferred embodiment of the present invention showing that a container is stacked onto the stacking unit.

When the container C is introduced into the inside of the steel-frame body 21, i.e., the lower part of the lifting channel 213 by means of the bogie, as shown in FIG. 19, the cage 22 is lowered, and then holds the container C while being placed above the container C through the insertion of the holder parts 232 of the cage 22 into the holes H of the container C.

At this time, the wire ropes 243 are pulled so that the cage 22 can be moved upward. Consequently, the container C is moved upward along the lifting channel 213 while being connected to the cage 22 by means of the holder parts 232.

In the course of the upward movement of the container C along the lifting channel 213 by means of the cage 22, as shown in FIG. 20, the cage 22 is stopped at one side of the stacking chamber 211 where the container C is to be stacked. At this time, the cage 22 is securely locked to the steel-frame body 21 by means of the locking part 25.

As a result, the horizontal rails 212 of the stacking chamber 211 are level with the horizontal rails 221 of the cage 22 such that horizontal rails 212 of the stacking chamber 211 correspond to the horizontal rails 221 of the cage 22.

As the driving rollers 231B are moved along the horizontal rails 221 and the horizontal rails 212 while the cage 22 is locked with the operation of the driving motor 231C, as shown in FIG. 21, the traveler 23 is moved horizontally along with the container C held by means of the holder parts 232, and is then positioned in the stacking chamber 211.

While the container C is positioned in the stacking chamber 211 as described above, the holder parts 232 are moved downward so that the container C is placed on the bottom of the stacking chamber 211. After that, the holder parts 232 are separated from the container C.

As shown in FIG. 22, the driving motor 231 is rotated reversely while the holder parts 232 are separated from the container C. As a result, the traveler 23 is moved to its original position along the horizontal rails 212 and the horizontal rails 221.

The above-described procedure is carried out to stack the container C in the stacking chamber 211. In order to remove the container C from the stacking chamber 211, the above-described procedure is carried out reversely.

Figure 23:
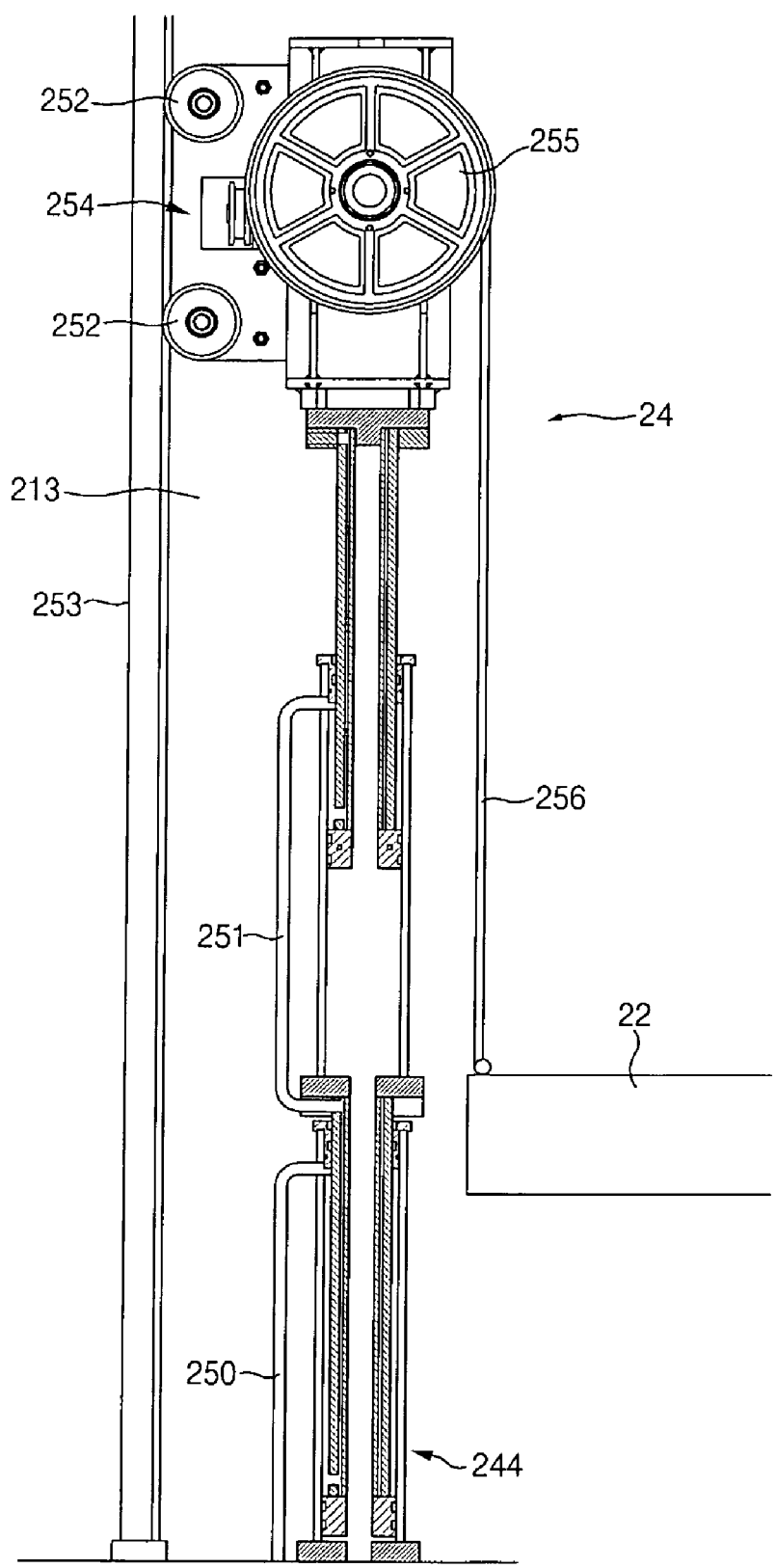
FIG. 23 is a front sectional view, in part, showing a stacking unit according to a second preferred embodiment of the present invention.
Figure 24:
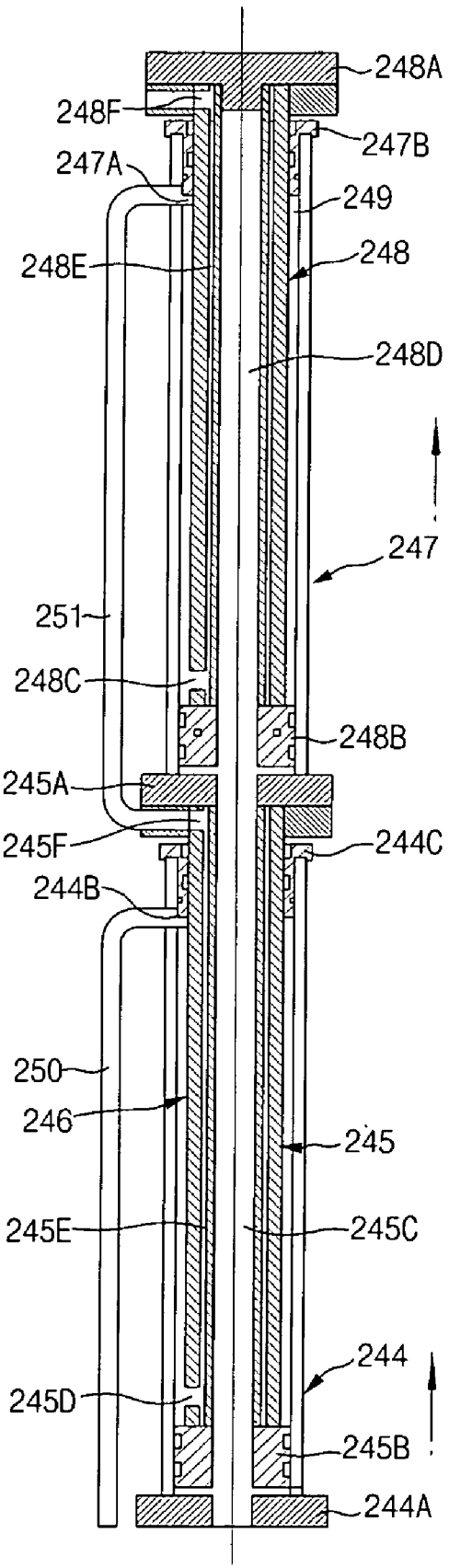
FIG. 24 is a front sectional view, enlarged in part, showing the stacking unit according to the second preferred embodiment of the present invention.

FIG. 23 is a front sectional view, in part, showing a stacking unit according to a second preferred embodiment of the present invention, and FIG. 24 is a front sectional view, enlarged in part, showing the stacking unit according to the second preferred embodiment of the present invention.

As shown in FIGS. 23 and 24, the stacking unit of the present invention has a lifting part 24 disposed along the lifting channel 213 for moving the cage 22 upward or downward.

The lifting part 24 comprises: a lower fixed cylinder 244 fixed to the lower end of the lifting part; a lower actuating rod 245 movable upward or downward in the lower fixed cylinder 244; an upper moving cylinder 247 formed integrally to the upper part of the lower actuating rod 245 such that the upper moving cylinder can be moved upward or downward along with the lower actuating rod 245; and an upper actuating rod 248 movable upward or downward in the upper moving cylinder 247. Between the lower fixed cylinder 244 and the lower actuating rod 245 is defined a first external channel 246, and between the upper moving cylinder 247 and the upper actuating rod 248 is defined a second external channel 249.

Through the center of the lower actuating rod 245 is defined a first central channel 245C, and through the center of the upper actuating rod 248 is defined a second central channel 248D. The first central channel 245C communicates with the first external channel 246 via a first internal channel 245E, and the second central channel 248D communicates with the second external channel 249 via a second internal channel 248E. At the lower part of the first internal channel 245E is formed a first lower inlet 245D, and at the lower part of the second internal channel 248E is formed a second lower inlet 248C. At the upper part of the first internal channel 245E is formed a first upper outlet 245F, and at the upper part of the second internal channel 248E is formed a second upper outlet 248F. The second upper outlet 248F is closed.

At the upper part of the lower fixed cylinder 244 is formed a first upper inlet 244B, which communicates with the first external channel 246, and at the upper part of the upper moving cylinder 247 is formed a second upper inlet 247A, which communicates with the second external channel 249. The first upper inlet 244B of the lower fixed cylinder 244 is connected to an external fluid tank (not shown) including a hydraulic pump via a first supply pipe 250. The first upper outlet 245F of the lower actuating rod 245 is connected to the second upper inlet 247A of the upper moving cylinder 247 via a second supply pipe 251 such that the first upper outlet 245F of the lower actuating rod 245 communicates with the second upper inlet 247A of the upper moving cylinder 247. The first central channel 245C of the lower actuating rod 245 communicates with the second central channel 248D of the upper actuating rod 248. The first and second central channels are connected to the external fluid tank (not shown) including the hydraulic pump.

The lower end of the lower fixed cylinder 244 is securely supported by means of a lower flange 244A, and the upper end of the lower fixed cylinder 244 is closed by means of a first upper stopper 244C. Similarly, the upper end of the upper moving cylinder 247 is closed by means of a second upper stopper 247B. The lower actuating rod 245 having a first upper flange 245A is inserted through the center of the lower fixed cylinder 244, and the upper actuating rod 248 having a second upper flange 248A is inserted through the center of the upper moving cylinder 247. At the lower end of the lower actuating rod 245 is formed a first piston 245B, and at the lower end of the upper actuating rod 248 is formed a second piston 248B.

The first supply pipe 250, the second supply pipe 251, the first internal channel 245E of the lower actuating rod 245, and the second internal channel 248E of the upper actuating rod 248 are constructed such that the amount of fluid supplied through the first supply pipe 250 and the second supply pipe 251 is equal to the amount of fluid supplied through the first internal channel 245E of the lower actuating rod 245 and the second internal channel 248E of the upper actuating rod 248.

The end of the first upper stopper 244C of the lower fixed cylinder 244 extends downward such that the end of the first upper stopper 244C of the lower fixed cylinder 244 blocks approximately the upper half of the first upper inlet 244B of the lower fixed cylinder 244. Similarly, the end of the second upper stopper 247B of the upper moving cylinder 247 extends downward such that the end of the second upper stopper 247B of the upper moving cylinder 247 blocks approximately the upper half of the second upper inlet 247A of the upper moving cylinder 247. The first piston 245B of the lower actuating rod 245 is spaced from the lower end of the lower fixed cylinder 244 by a distance corresponding to approximately the lower half of the first upper inlet 244B of the lower fixed cylinder 244. Similarly, the second piston 248B of the upper actuating rod 248 is spaced from the lower end of the upper moving cylinder 247 by a distance corresponding to approximately the lower half of the second upper inlet 247A of the upper moving cylinder 247.

To the second upper flange 248A of the upper actuating rod 248 is attached a driving pulley 255, which is rotatably supported by means of a bracket 254. To the cage 22 is connected a wire rope 256 via the driving pulley 255. To the bracket 254 of the driving pulley 255 are mounted guide rollers 252, which are moved along guide rails 253 while being in rolling contact with the guide rails 253. The guide rollers 252 are arranged in pairs in an upper and lower arrangement.

Figure 25:
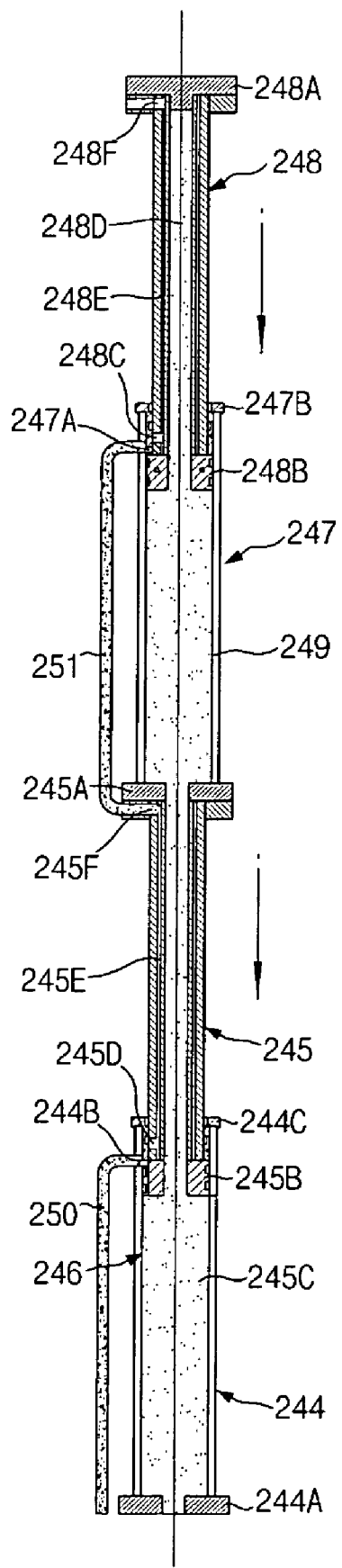
FIG. 25 is a front sectional view, in part, of the stacking unit according to the second preferred embodiment of the present invention showing that the stacking unit is moved upward.
Figure 26:
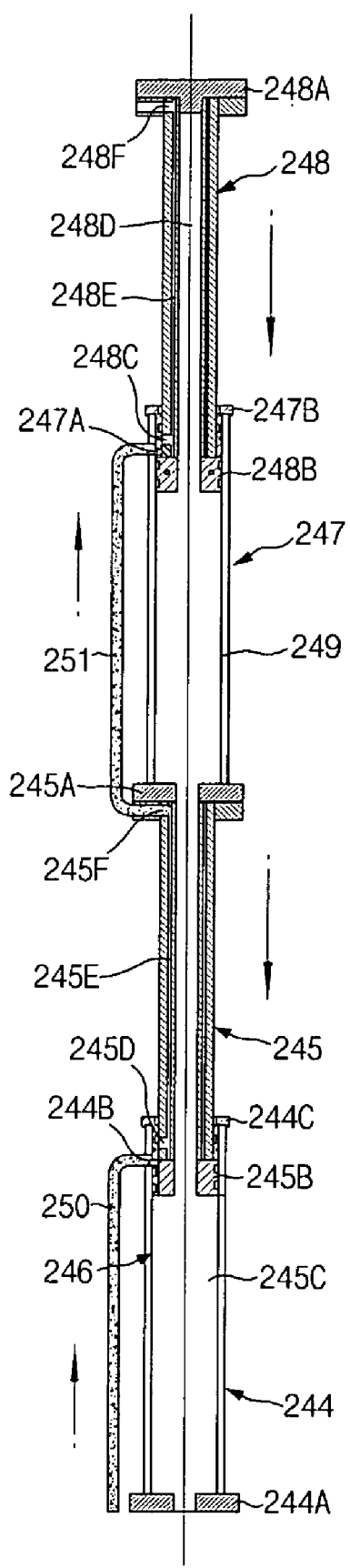
FIG. 26 is a front sectional view, in part, of the stacking unit according to the second preferred embodiment of the present invention showing that the stacking unit is moved downward.

FIG. 25 is a front sectional view, in part, of the stacking unit according to the second preferred embodiment of the present invention showing that the stacking unit is moved upward, and FIG. 26 is a front sectional view, in part, of the stacking unit according to the second preferred embodiment of the present invention showing that the stacking unit is moved downward.

As shown in FIG. 25, a fluid is supplied through the first central channel 245C of the lower actuating rod 245. The fluid supplied through the first central channel 245C of the lower actuating rod 245 is guided to the upper actuating rod 248 through the upper moving cylinder 247 so that hydraulic pressure is applied to the upper moving cylinder 247.

As a result, the upper actuating rod 248 is moved upward in the upper moving cylinder 247. When the second piston 248B of the upper actuating rod 248 is caught by the second upper stopper 247B of the upper moving cylinder 247, a pulling force is applied to the upper moving cylinder 247. Consequently, the upper moving cylinder 247 is moved upward. As the upper moving cylinder 247 is moved upward, the lower actuating rod 245 integrally connected to the upper moving cylinder 247 is also moved upward in the lower fixed cylinder 244. In this way, the lifting operation is carried out. At this time, the second supply pipe 251 disposed between the lower actuating rod 245 and the upper moving cylinder 247 is also moved upward.

When the fluid is discharged through the first central channel 245C of the lower actuating rod 245, as shown in FIG. 26, the lower actuating rod 245 is moved downward first. The lower end of the lower actuating rod 245 does not contact the lower end of the lower fixed cylinder 244, i.e., the lower end of the lower actuating rod 245 is spaced apart from the lower end of the lower fixed cylinder 244, and the fluid is filled in the gap between the lower end of the lower actuating rod 245 and the lower end of the lower fixed cylinder 244. Consequently, the lower actuating rod 245 is moved downward when the fluid is discharged.

The fluid is supplied to the first upper inlet 244B through the first supply pipe 250. The supplied fluid passes through the first external channel 246, and is then guided to the first internal channel 245E through the first lower inlet 245D of the lower actuating rod 245. After that, the fluid is guided to the second supply pipe 251 through the first upper outlet 245F connected to the second supply pipe 251.

The fluid guided to the second supply pipe 251 is guided to the second external channel 249 through the second upper inlet 247A of the upper moving cylinder 247. The fluid guided to the second external channel 249 is guided to the second internal channel 248E through the second lower inlet 248C of the upper actuating rod 248. The fluid is retained in the second internal channel 248E because the second upper outlet 248F of the upper actuating rod 248 is closed.

Consequently, a hydraulic force is applied to the first piston 245B of the lower actuating rod 245 first with the result that the lower actuating rod 245 is moved downward. As the lower actuating rod 245 is moved downward, the upper moving cylinder 247 integrally connected to the lower actuating rod 245 is also moved downward. At the same time, the upper actuating rod 248 is also moved downward by means of a hydraulic force applied to the second piston 248B of the upper actuating rod 248.

Figure 27:
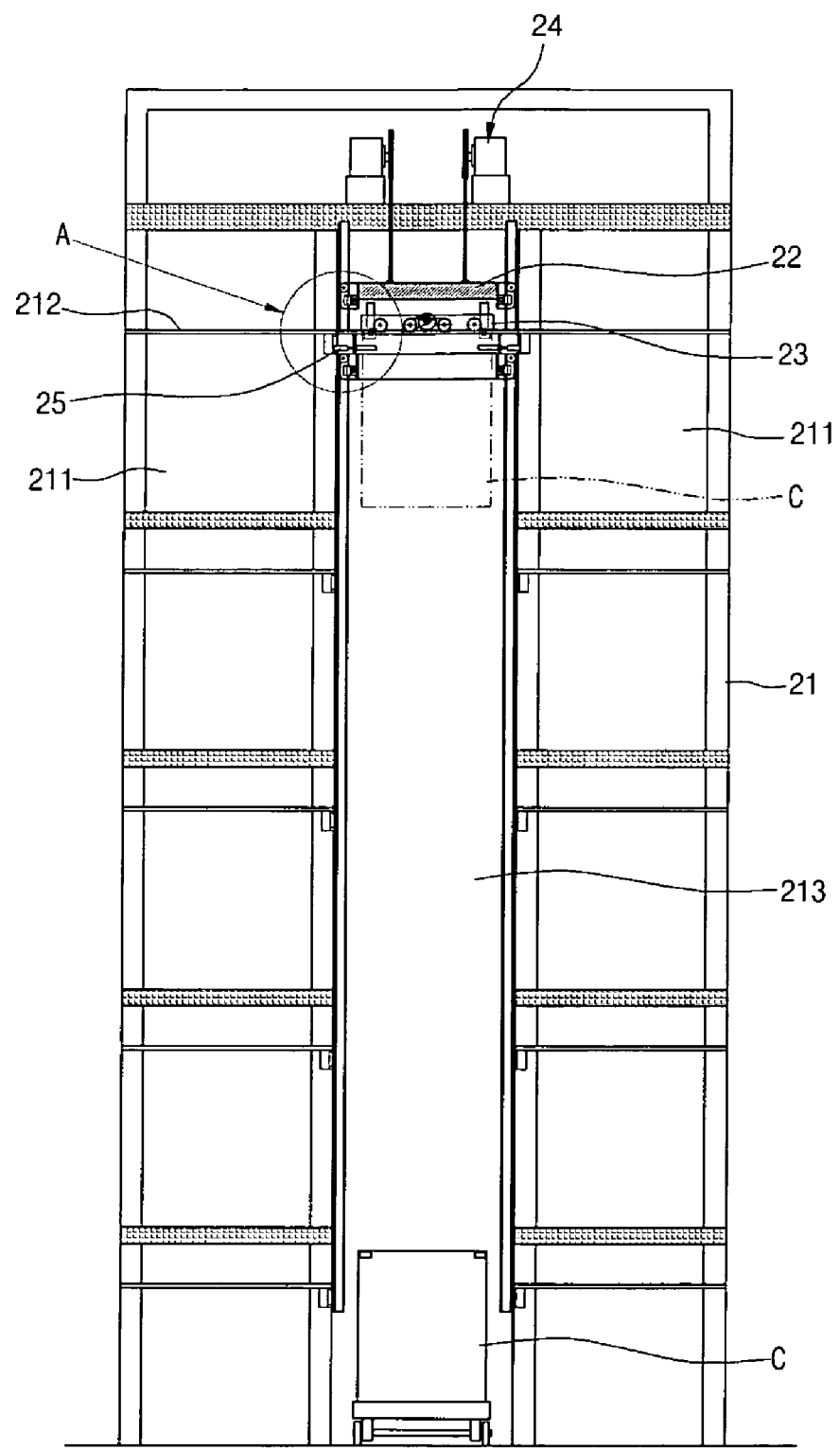
FIG. 27 is a front sectional view schematically showing a stacking unit according to a third preferred embodiment of the present invention.
Figure 28:
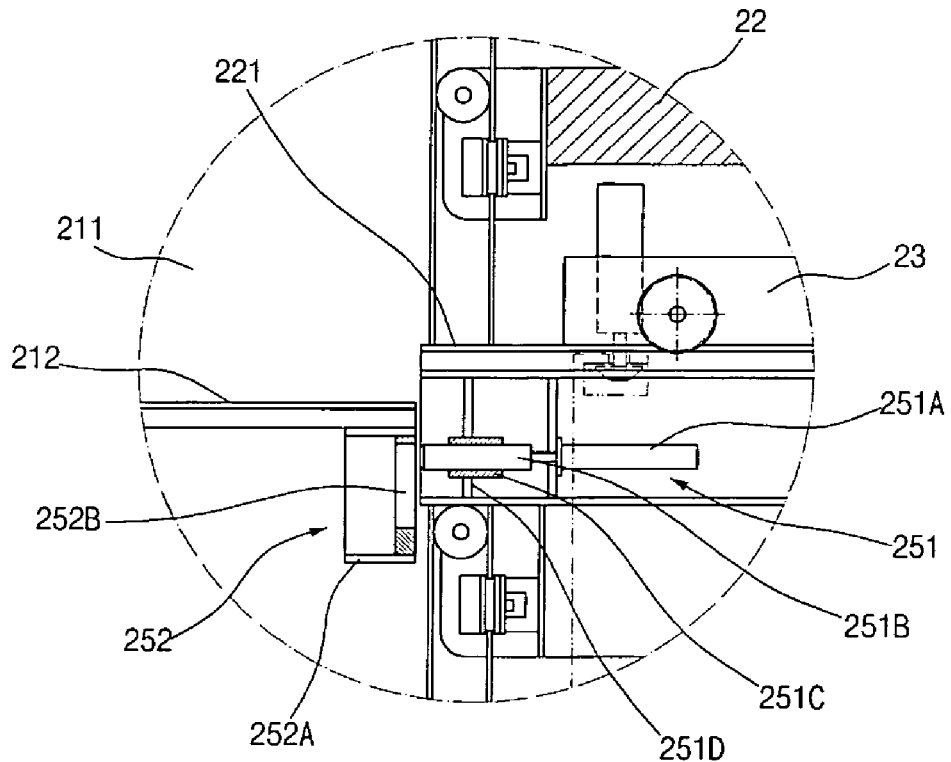
FIG. 28 is an enlarged view showing part A of FIG. 27.
Figure 29:
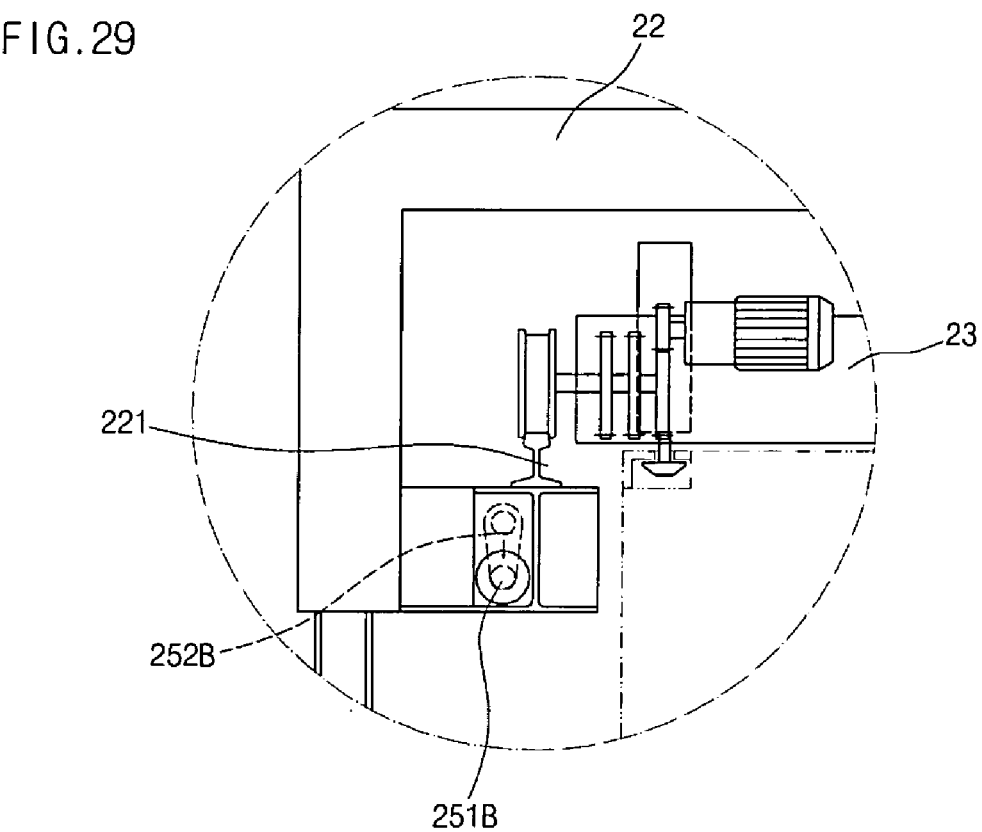
FIG. 29 is a longitudinal sectional view schematically showing the stacking unit of FIG. 29.

FIG. 27 is a front sectional view schematically showing a stacking unit according to a third preferred embodiment of the present invention, FIG. 28 is an enlarged view showing part A of FIG. 27, and FIG. 29 is a longitudinal sectional view schematically showing the stacking unit of FIG. 29.

As shown in FIGS. 27, 28 and 29, the stacking unit of the present invention comprises: a steel-frame body 21, constructed in a multi-storied structure, having a plurality of stacking chambers 211 disposed at both sides thereof; and a lifting channel 213 defined in the steel-frame body 21 while extending vertically between the stacking chambers 211.

The stacking unit further comprises: a cage 22 movable upward and downward along the lifting channel 213 by means of lifting parts 24, the cage 22 having a traveler 23 mounted therein; horizontal rails 221 mounted to the cage such that the traveler 23 can be moved horizontally along the horizontal rails 221; horizontal rails 212 disposed in the stacking chamber 211; and locking parts 25 for locking the cage 22 at a predetermined position, i.e., the position where the horizontal rails 221 are level with the horizontal rails 212.

Each of the locking parts 25 comprises: a movable locking part 251 movable outward from the cage 22 such that the end of the movable locking part 251 can be protruded; and a locking insertion part 252, in which the protruded end of the movable locking part 251 is securely inserted.

The movable locking part 251 comprises: an actuating cylinder 251A mounted to the cage 22; an insertion rod 251B attached to the end of a piston rod of the actuating cylinder 251A; a sliding tube 251C surrounding the insertion rod 251B such that the insertion rod 251B can be slid through the sliding tube 251C; and a supporting bar 251D attached between the sliding tube 251C and the cage 22.

The insertion rod 251B of the movable locking part 251 is moved forward or backward such that the insertion rod 251B can be moved from the inside to the outside of the cage 22 or from the outside to the inside of the cage 22 by means of the actuating cylinder 251A.

The sliding tube 251C guides the forward/backward movement of the insertion rod 251B while being securely fixed to the cage by means of the supporting bar 251D. When the container C is moved horizontally by means of the traveler 23 while the insertion rod 251B is fixed, the center of gravity of the container may be changed. At this time, the insertion rod 251B inserted in the sliding tube 251C is securely supported by means of the sliding tube 251C.

The locking insertion part 252 comprises: a locking member 252A attached to the upper end of the stacking chamber 211 corresponding to the lifting channel 213; and an insertion hole 252B formed at the locking member 252A for allowing the insertion rod 251B to be inserted therethrough.

The locking insertion part 252 is attached to a predetermined position of the corresponding stacking chamber. The insertion rod 251B moved forward by means of the actuating cylinder 251A is inserted into the insertion hole 252B. As a result, the cage 22 is securely locked to the steel-frame body 21 in the lifting channel 213 at the position corresponding to the stacking chamber 211.

The insertion hole 252B is an elongated hole that extends vertically. The insertion hole 252B is formed such that the width of the insertion hole is gradually increased from the lower end to the upper end of the insertion hole 252B, i.e., the width of the hole at the upper end of the insertion hole 252B is larger than the diameter of the insertion rod 251B. As a result, the cage 22 can be securely locked at the position where the horizontal rails 212 are level with the horizontal rails 221 although the cage 22 is stopped with a slight error.

Consequently, the cage 22 can be securely locked to the steel-frame body 21 by means of the locking parts 25 each having a simple structure, whereby smooth stacking of the containers C is achieved.

Figure 30:
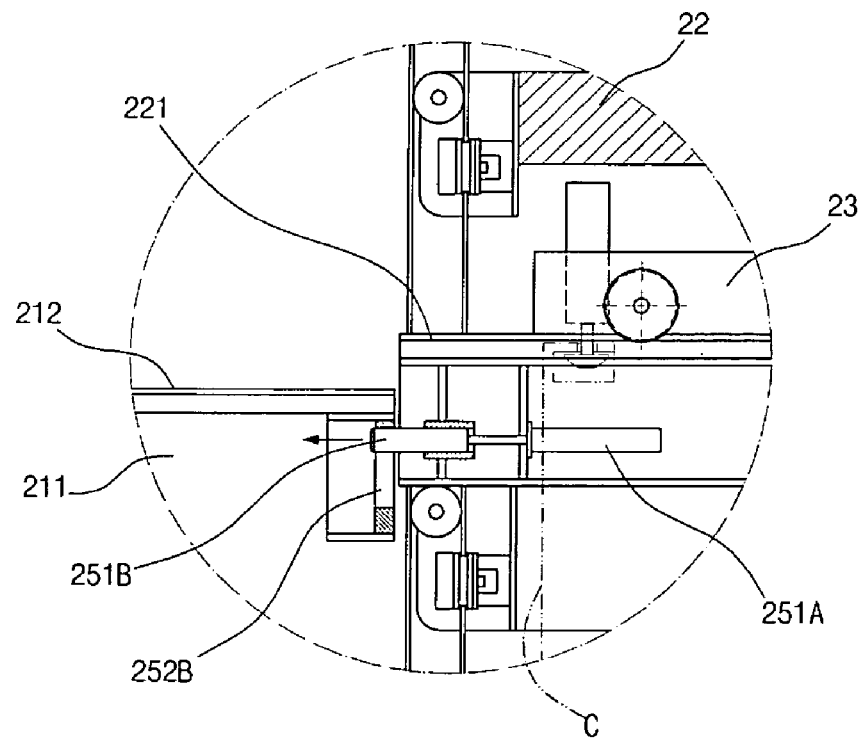
FIG. 30 is a sectional view, in part, of a locking part of the stacking unit according to the third preferred embodiment of the present invention showing that the locking part is operated.
Figure 31:
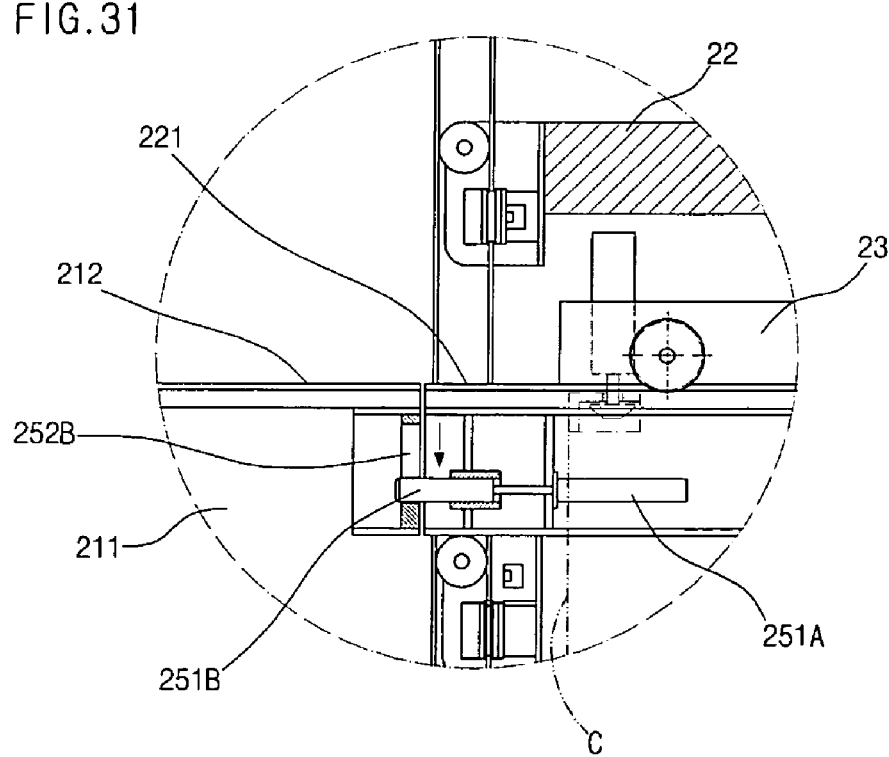
FIG. 31 is a sectional view, in part, of the locking part of the stacking unit according to the third preferred embodiment of the present invention showing that the operation of the locking part is completed.

FIG. 30 is a sectional view, in part, of a locking part of the stacking unit according to the third preferred embodiment of the present invention showing that the locking part is operated, and FIG. 31 is a sectional view, in part, of the locking part of the stacking unit according to the third preferred embodiment of the present invention showing that the operation of the locking part is completed.

As shown in FIG. 30, the cage 22 is moved upward to a predetermined position corresponding to the stacking chamber 211 where the container C is to be stacked, and is then stopped. When the cage 22 is stopped, the insertion rod 251B is moved forward by means of the actuating cylinder 251A so that the insertion rod 251B is inserted into the upper end of the insertion hole 252B.

As the cage 22 is moved downward, as shown in FIG. 31, the insertion rod 251B is moved downward to the lower end of the insertion hole 252B. As a result, the cage 22 is securely locked.

Consequently, when the cage 22 is stopped with a slight error, i.e., the cage 22 is stopped while the horizontal rails 212 and the corresponding horizontal rails 221, along which the traveler 23 is moved horizontally, are not level with each other, the cage 22 can be moved downward to the position where the horizontal rails 212 and the corresponding horizontal rails 221 are level with each other by the provision of the elongated insertion hole 252B, and thus securely locked.

Figure 32:
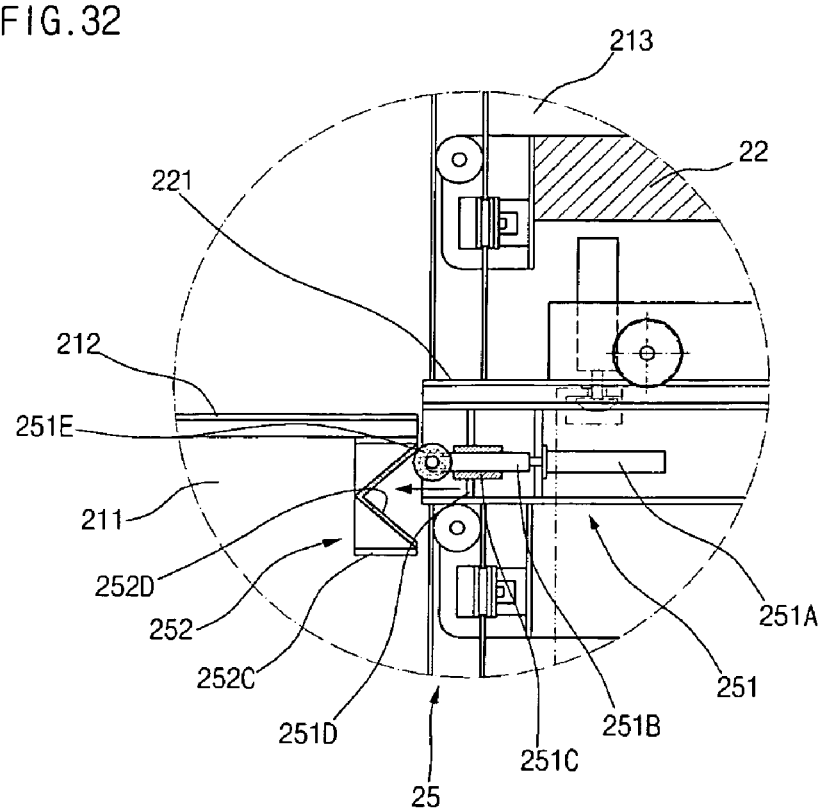
FIG. 32 is a front sectional view, in part, showing a stacking unit according to a fourth preferred embodiment of the present invention.
Figure 33:
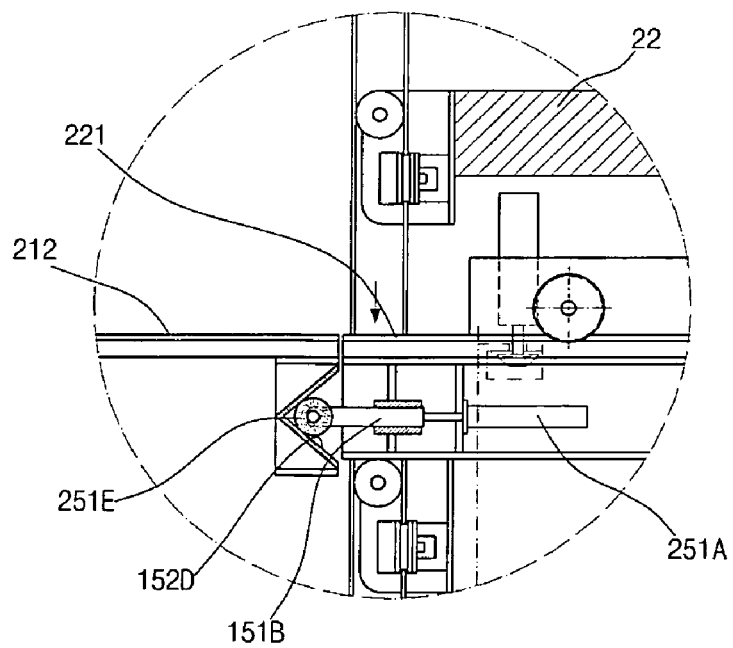
FIG. 33 is a front sectional view, in part, of a locking part of the stacking unit according to the fourth preferred embodiment of the present invention showing that the operation of the locking part is completed.

FIG. 32 is a front sectional view, in part, showing a stacking unit according to a fourth preferred embodiment of the present invention, and FIG. 33 is a front sectional view, in part, of a locking part of the stacking unit according to the fourth preferred embodiment of the present invention showing that the operation of the locking part is completed.

As shown in FIGS. 32 and 33, the locking part 25 of the stacking unit according to the present invention comprises: a movable locking part 251 movable outward from the cage 22 such that the end of the movable locking part 251 can be protruded; and a locking insertion part 252, in which the protruded end of the movable locking part 251 is securely inserted.

The movable locking part 251 comprises: an actuating cylinder 251A mounted to the cage 22; an insertion rod 251B attached to the end of a piston rod of the actuating cylinder 251A; a sliding tube 251C surrounding the insertion rod 251B such that the insertion rod 251B can be slid through the sliding tube 251C; a supporting bar 251D attached between the sliding tube 251C and the cage 22; and a roller 251E rotatably attached to the end of the insertion rod 251B.

The locking insertion part 252 comprises: a guide locking member 252C attached to the upper end of the stacking chamber 211 corresponding to the lifting channel 213; and a wedge-shaped groove 252D formed at the guide locking member 252C such that the insertion rod 251B is inserted into the wedge-shaped groove 252D.

The roller 251E smoothly contacts the inclined surface of the wedge-shaped groove 252 when the insertion rod 251B is inserted into the wedge-shaped groove 252D. As the roller 251E is rotated along the inclined surface of the wedge-shaped groove 252, the cage 22 is smoothly moved.

When the insertion rod 251B is inserted into the wedge-shaped groove 252D, the insertion rod 251B is securely locked to the guide locking member 252C while the insertion rod 251B is properly guided by means of the wedge-shaped groove 252D.

As shown in FIG. 32, the cage 22 is moved upward to a predetermined position corresponding to the stacking chamber 211 where the container C is to be stacked, and is then stopped. When the cage 22 is stopped, the horizontal rails 221 mounted in the cage 22 are not level with the horizontal rails 212 mounted in the stacking chamber 211

After the cage 22 is stopped while the horizontal rails 221 are not level with the horizontal rails 212, the insertion rod 251B is moved outward from the cage by means of the actuating cylinder 251A. As a result, the roller 251E contacts the inclined surface of the wedge-shaped groove 252D.

As the actuating cylinder is further operated, as shown in FIG. 33, the insertion rod 251B is smoothly moved to the deepest region of the wedge-shaped groove 252D through the rotation of the roller 251E. As the insertion rod 251B is moved downward as described above, the entirety of the cage 22 is moved downward. As a result, the cage 22 is securely locked while the horizontal rails 221 are level with the horizontal rails 212.

In other words, although the cage 22 is stopped with an error equivalent to the vertical length of the wedge-shaped groove 252D, the insertion rod 251B and the roller 251E are smoothly placed in the deepest region of the wedge-shaped groove 252D by means of the actuating cylinder 251A. Consequently, the cage 22 is securely locked at the position where the horizontal rails 221 are level with the horizontal rails 212.

Figure 34:
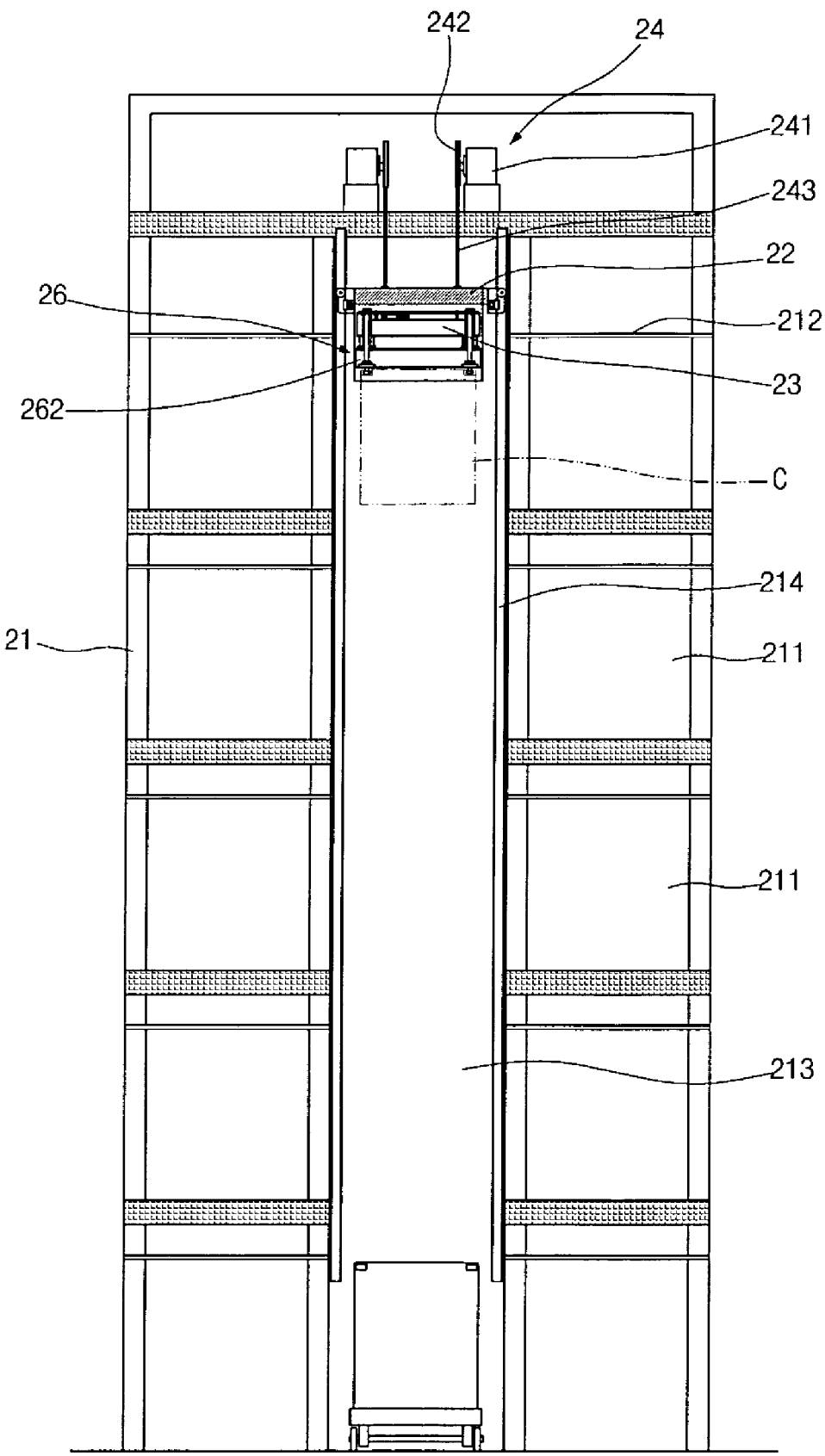
FIG. 34 is a front sectional view schematically showing a stacking unit according to a fifth preferred embodiment of the present invention.

FIG. 34 is a front sectional view schematically showing a stacking unit according to a fifth preferred embodiment of the present invention.

As shown in FIG. 34, the stacking unit of the present invention comprises: a tower-shaped steel-frame body 21 having a plurality of stacking chambers 211; a cage 22 movable upward and downward along a lifting channel 213 in the steel-frame body 21; a traveler 23 movable horizontally from the cage 22 into the corresponding stacking chambers of the steel-frame body 21; and height-adjusting parts 26 disposed below the traveler 23.

The cage 22 is moved upward or downward along the guide rails 214 mounted to the lifting channel 213 by means of lifting parts 24, each of which comprises: a driving pulley 242 operated by a hydraulic motor 241 mounted to the upper end of the steel-frame body 21 and a wire rope 243. The traveler 23 attached to the cage 22 is moved horizontally along the horizontal rails 212 mounted at both sides of the inner bottom surface of the stacking chamber 211 by means of a driving motor mounted to the traveler 23.

The container C is moved along the lifting channel 213 by means of the stacking unit constructed as described above with the result that the container C is stacked into the stacking chamber 211.

In the case that another container having a height different from the height of the above-mentioned container C is to be stacked in the stacking chamber, a spreader 262 is moved downward by means of the height-adjusting part 26 so that the container C can be held. Consequently, various containers C having different heights can be easily stacked in the stacking chambers.

Figure 35:
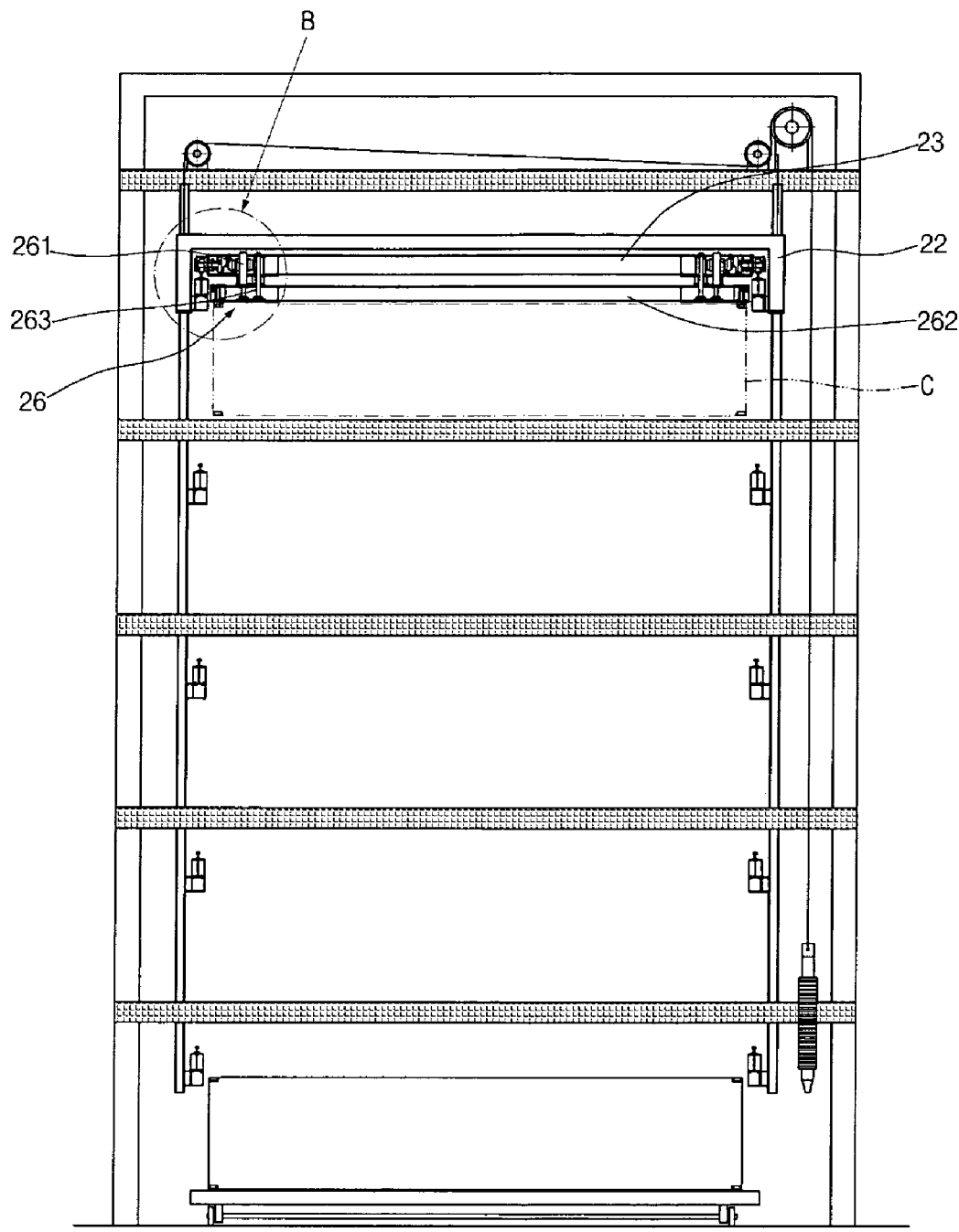
FIG. 35 is a longitudinal sectional view schematically showing the stacking unit of FIG. 34.
Figure 36:
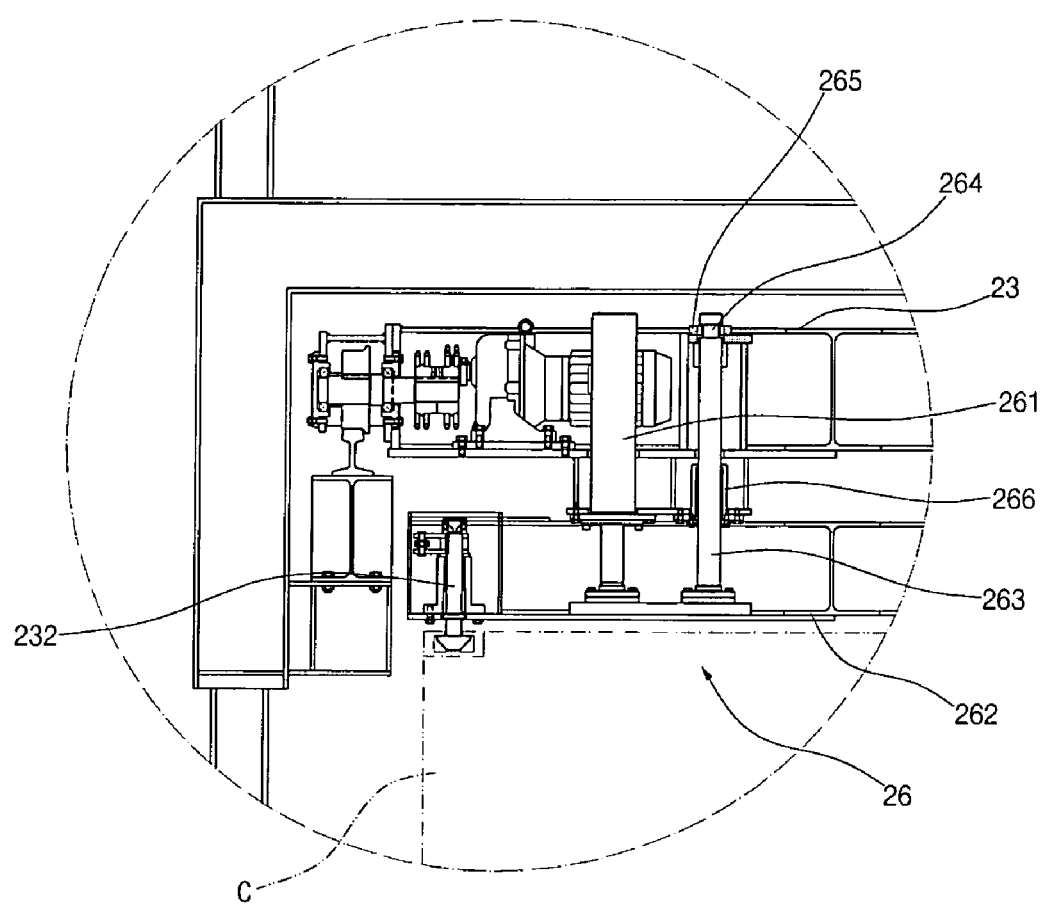
FIG. 36 is an enlarged view, in part, showing part B of FIG. 35.

FIG. 35 is a longitudinal sectional view schematically showing the stacking unit of FIG. 34, and FIG. 36 is an enlarged view, in part, showing part B of FIG. 35.

As shown in FIGS. 35 and 36, each of the height-adjusting parts 26 comprises: a hydraulic cylinder 261 mounted at a corresponding corner of the traveler 23; a spreader 262 mounted to the lower end of a piston rod of the hydraulic cylinder 261, the spreader 262 having a holder part 232; a guide rod 263 disposed at one side of the hydraulic cylinder 261, the guide rod 263 being attached to the spreader 262 through the traveler 23, the guide rod 263 having a guide tube 266 surrounding the guide rod 263; and a stopper 265 caught in a catching groove 264 formed at the upper end of the guide rod 263 for holding the guide rod 263.

When the hydraulic cylinder 261 of the height-adjusting part 26 is operated, the spreader 262 is moved upward or downward while being guided by means of the guide rod 263. Consequently, various containers C having different heights can be held by means of the holding part 232.

Specifically, when a container C having a relatively small height is held, the spreader 262 is moved downward by means of the hydraulic cylinder 261, and then the container C is held by means of the holder part 232 mounted to the spreader 262. Consequently, various containers C having different heights can be easily held.

The guide rod 263 serves to guide the upward and downward movement of the spreader 262 while supporting the operation of the hydraulic cylinder 261. In addition, the guide rod 263 prevents the piston rod and packing of the hydraulic cylinder 261 from being damaged.

The guide tube 266 serves to support the guide rod 263 so that the guide rod 263 can be more precisely slid.

The stopper 265 is caught in the catching groove 264 of the guide rod 263, which is disposed at the upper end of the traveler 23, for securely holding the guide rod 263.

Figure 37:
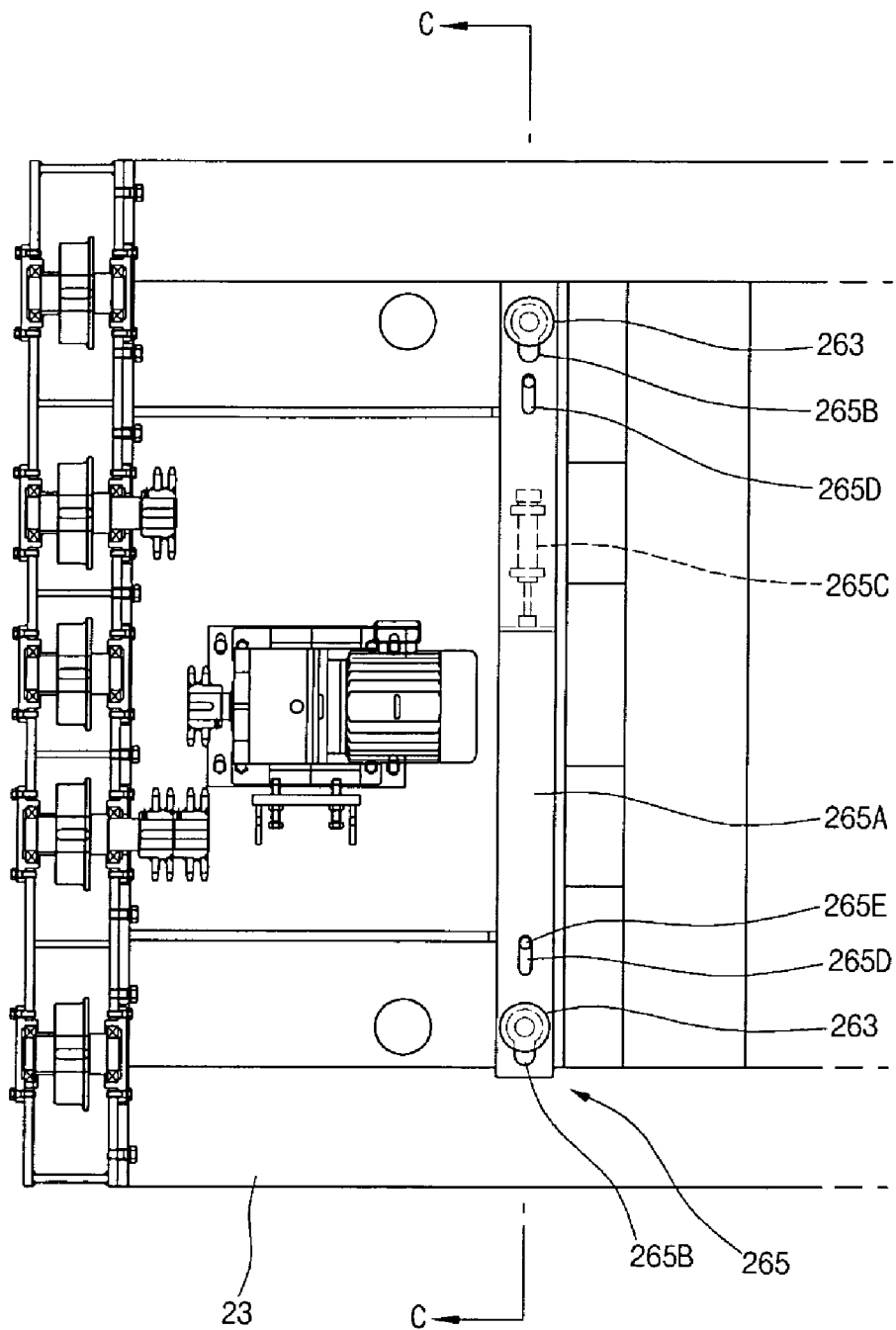
FIG. 37 is a plan sectional view schematically showing the stacking unit of FIG. 36.
Figure 38:
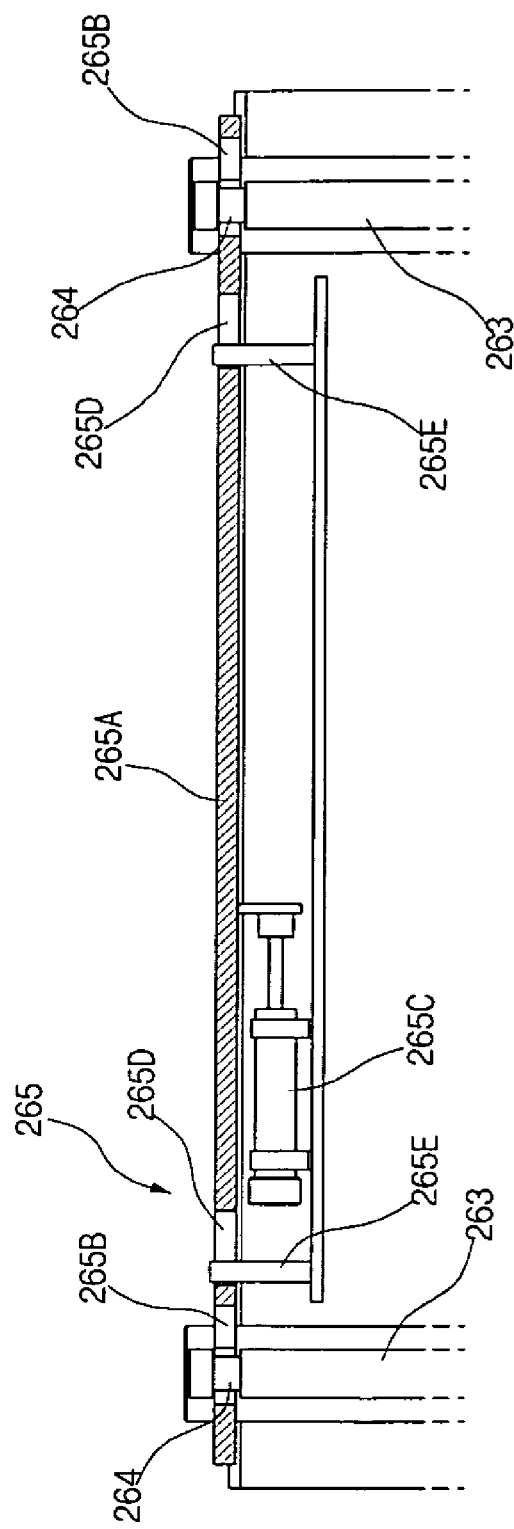
FIG. 38 is a schematic cross-sectional view taken along line C-C of FIG. 37.

FIG. 37 is a plan sectional view schematically showing the stacking unit of FIG. 36, and FIG. 38 is a schematic cross-sectional view taken along line C-C of FIG. 37.

As shown in FIGS. 37 and 38, the stopper 265 comprises: a stopper plate 265A having engaging grooves 265B formed at both ends thereof such that the engaging grooves 265B can be simultaneously engaged with the catching grooves 264 of the pair of guide rods 263 disposed at both ends of the traveler 23 while being spaced apart from each other; a stopper hydraulic cylinder 265C mounted to the upper surface of the traveler 23 for moving horizontally the stopper plate 265A; a pair of distance-adjusting holes 265D formed at the stopper plate 265A; and a pair of adjusting bars 265E mounted to the upper surface of the traveler 23 such that the adjusting bars 265E are inserted in the distance-adjusting holes 265D, respectively.

As the stopper hydraulic cylinder 265C of the stopper 265 is operated, the stopper plate 265A is moved to one side. As a result, the engaging grooves 265B are simultaneously engaged with the corresponding catching grooves 264 so that the guide rods 263 can be securely fixed.

The distance-adjusting holes 265D are caught to the corresponding adjusting rods 265E when the stopper plate 265A is moved. Consequently, the movable distance of the stopper plate 265A is limited.

Figure 39:
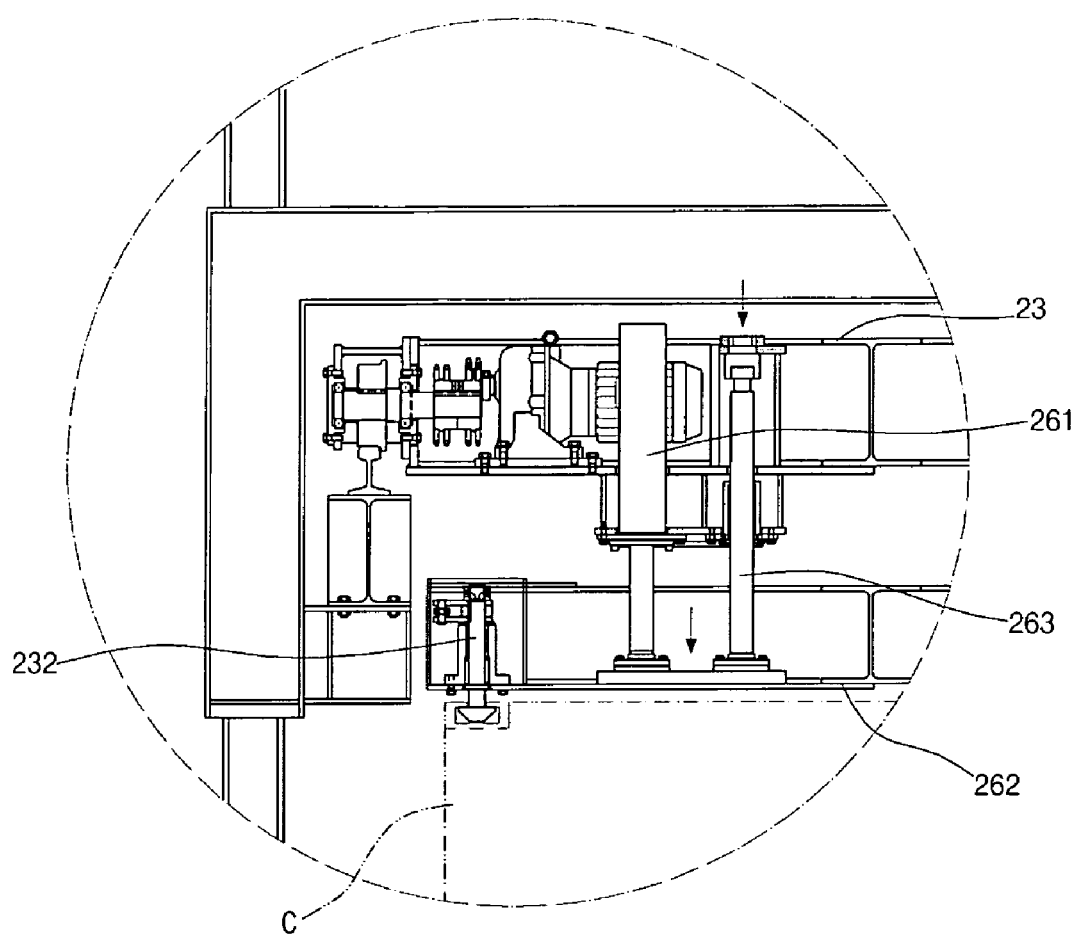
FIG. 39 is a front sectional view, in part, of a spreader of the stacking unit according to the fifth preferred embodiment of the present invention showing that the spreader is operated.

FIG. 39 is a front sectional view, in part, of a spreader of the stacking unit according to the fifth preferred embodiment of the present invention showing that the spreader is operated.

As the hydraulic cylinder 261 mounted to the traveler 23 is operated, the piston rod of the hydraulic cylinder 261 is moved downward, as shown in FIG. 39. Consequently, a container C having a relatively small height can be held by means of the holder part 232 of the spreader 262, and then transferred.

When a container C having a relatively large height is to be transferred, the hydraulic cylinder 261 is operated such that the piston rod of the hydraulic cylinder 261 can be moved upward. Consequently, the spreader 262 is moved to the bottom surface of the traveler 23 with the result that the guide rods 263 are protruded above the upper surface of the traveler 23.

Now, the container C can be held by means of the holder parts while the spreader 262 is raised.

The spreader 262 is raised by means of the hydraulic pressure of the hydraulic cylinder 261 during holding the container C. At this time, the guide rod 263 protruded above the upper surface of the traveler 23 is fixed by means of the stopper 265 so as to ensure that the spreader 262 is raised.

Figure 40:
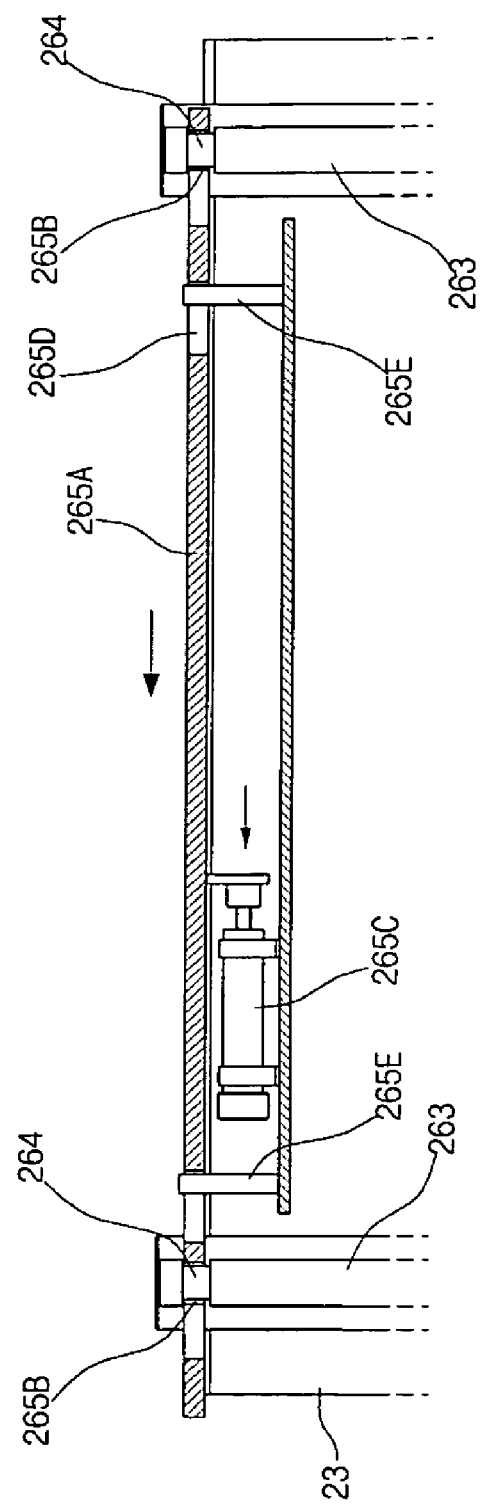
FIG. 40 is a sectional view, in part, of a stopper of the stacking unit according to the fifth preferred embodiment of the present invention showing that the stopper is operated.

FIG. 40 is a sectional view, in part, of a stopper of the stacking unit according to the fifth preferred embodiment of the present invention showing that the stopper is operated.

As shown in FIG. 40, the stopper plate 265A is moved to one side as the stopper hydraulic cylinder 265C is operated. As a result, the catching grooves 264 formed at the upper ends of the guide rods 263 are securely engaged with the engaging grooves 265B. Consequently, the guide rods 263 protruded above the upper surface of the traveler 23 are securely fixed.

At this time, the movable distance of the stopper plate 265A is properly adjusted through the contact of the distance-adjusting holes 265D and the corresponding adjusting rods 265E.

The guide rods 263 are released as follows. The stopper hydraulic cylinder 265C is operated to move the stopper plate 265A in the opposite direction. As the stopper plate 265A is moved, the catching grooves 264 are disengaged from the engaging grooves 265B. Consequently, the guide rods 263 are released.

Figure 41:
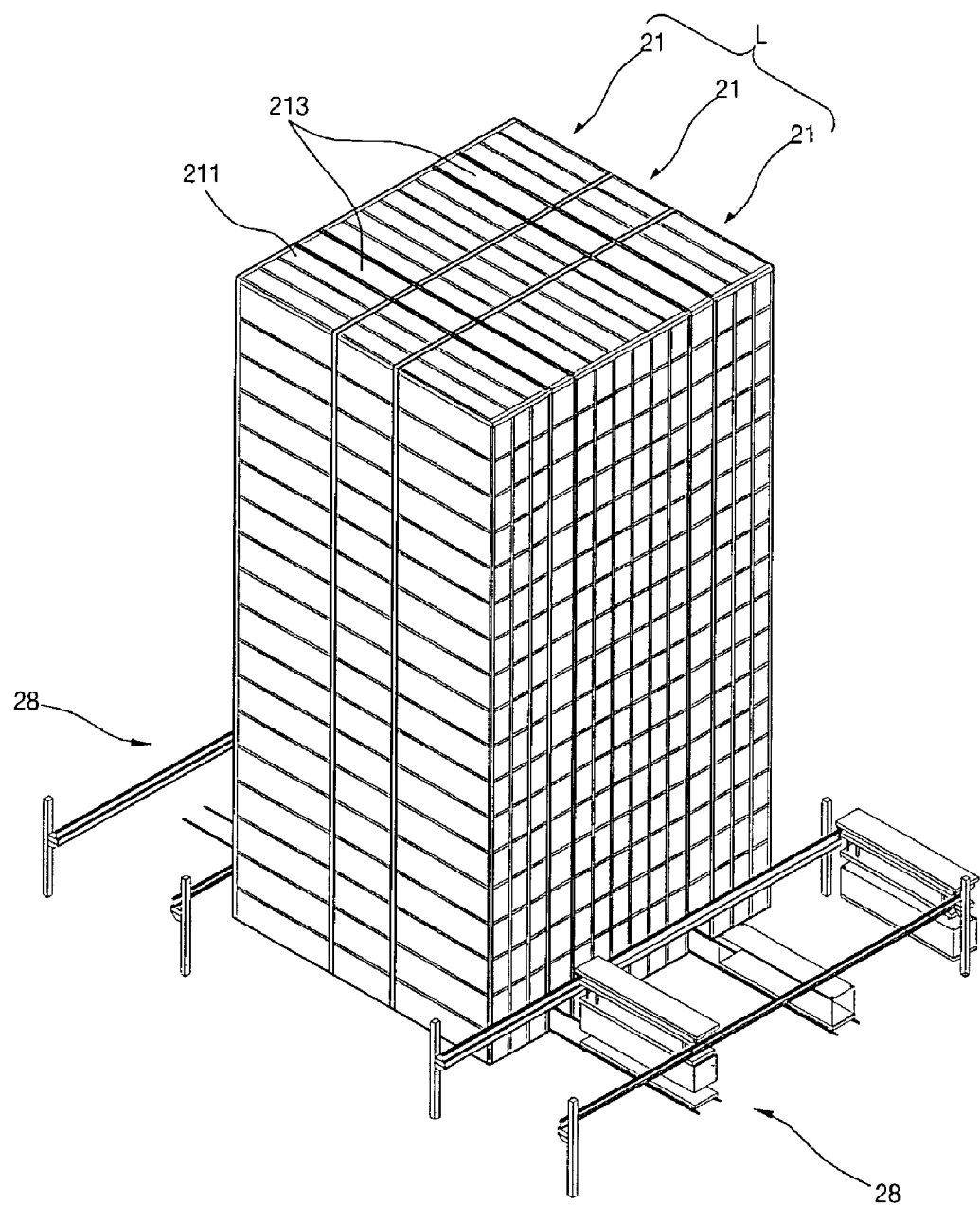
FIG. 41 is a perspective view schematically showing a stacking unit according to a sixth preferred embodiment of the present invention.
Figure 42:
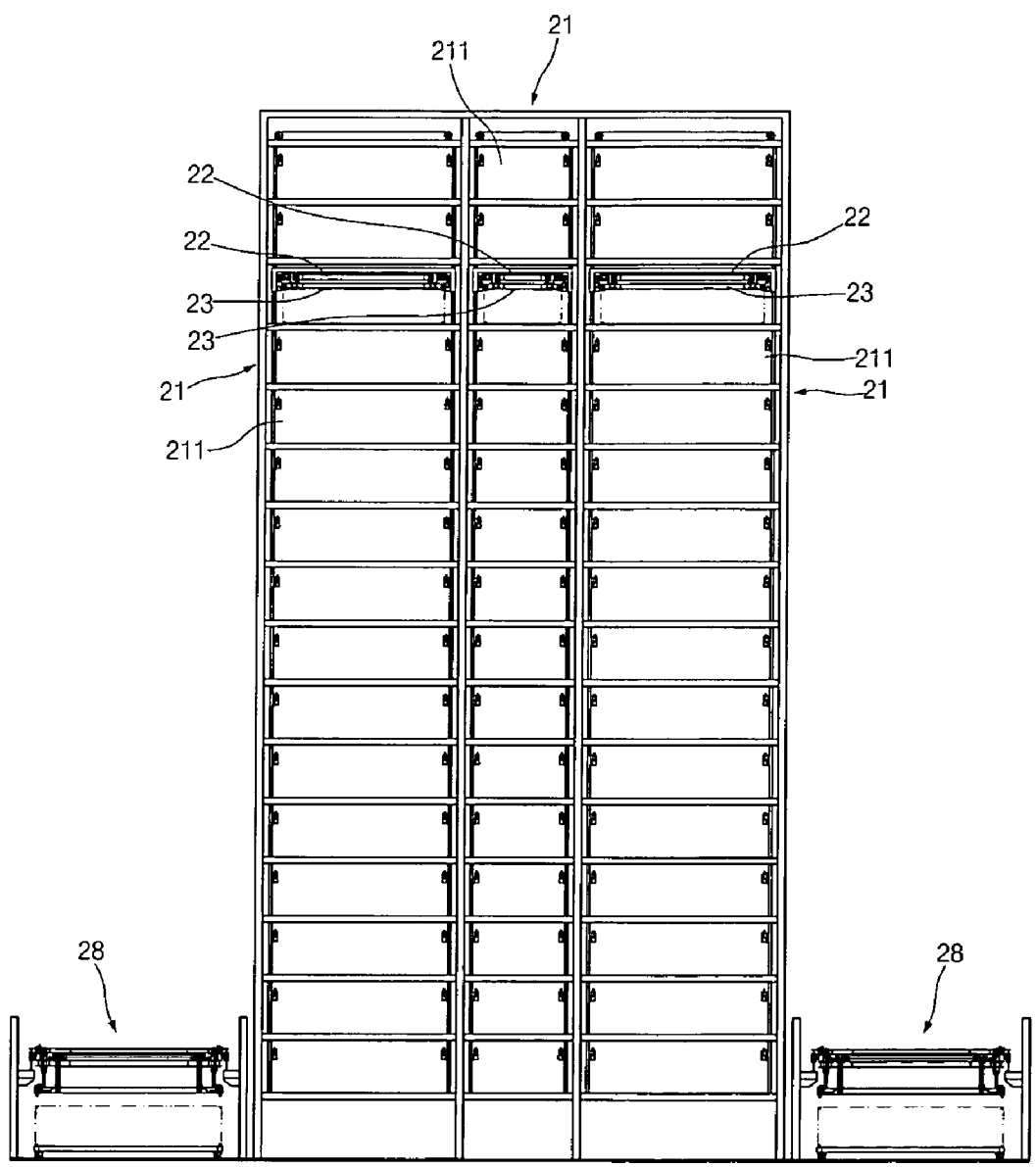
FIG. 42 is a front sectional view of the stacking unit shown in FIG. 41.

FIG. 41 is a perspective view schematically showing a stacking unit according to a sixth preferred embodiment of the present invention, and FIG. 42 is a front sectional view of the stacking unit shown in FIG. 41.

As shown in FIGS. 41 and 42, the stacking unit of the present invention comprises: a steel-frame stacking facility L including a plurality of steel-frame bodies 21, each of steel-frame bodies having a plurality of stacking chambers 211 defined therein; cages 22 movable upward and downward in the steel-frame bodies 21, respectively; and travelers 23 movable horizontally from the cages 22 into the corresponding stacking chambers of the steel-frame bodies 21, respectively.

At both sides of the steel-frame stacking facility L are disposed container-introducing parts 28 for introducing containers transferred from the outside into the steel-frame bodies 21.

The steel-frame stacking facility L includes various steel-frame bodies 21 having different sizes so that various containers having different sizes and heights can be stacked. Consequently, more efficient stacking of the containers is achieved.

The containers introduced into the steel-frame bodies 21 by means of the container-introducing parts 28 are moved upward to the positions where the containers are to be stacked along with the travelers 23 by means of the cages 22 while being held by means of the travelers 23. After that, the travelers 23 are moved horizontally into the stacking chambers 211 corresponding to the positions where the containers are to be stacked. In this way, the containers are stacked in the stacking chambers 211.

Figure 43:
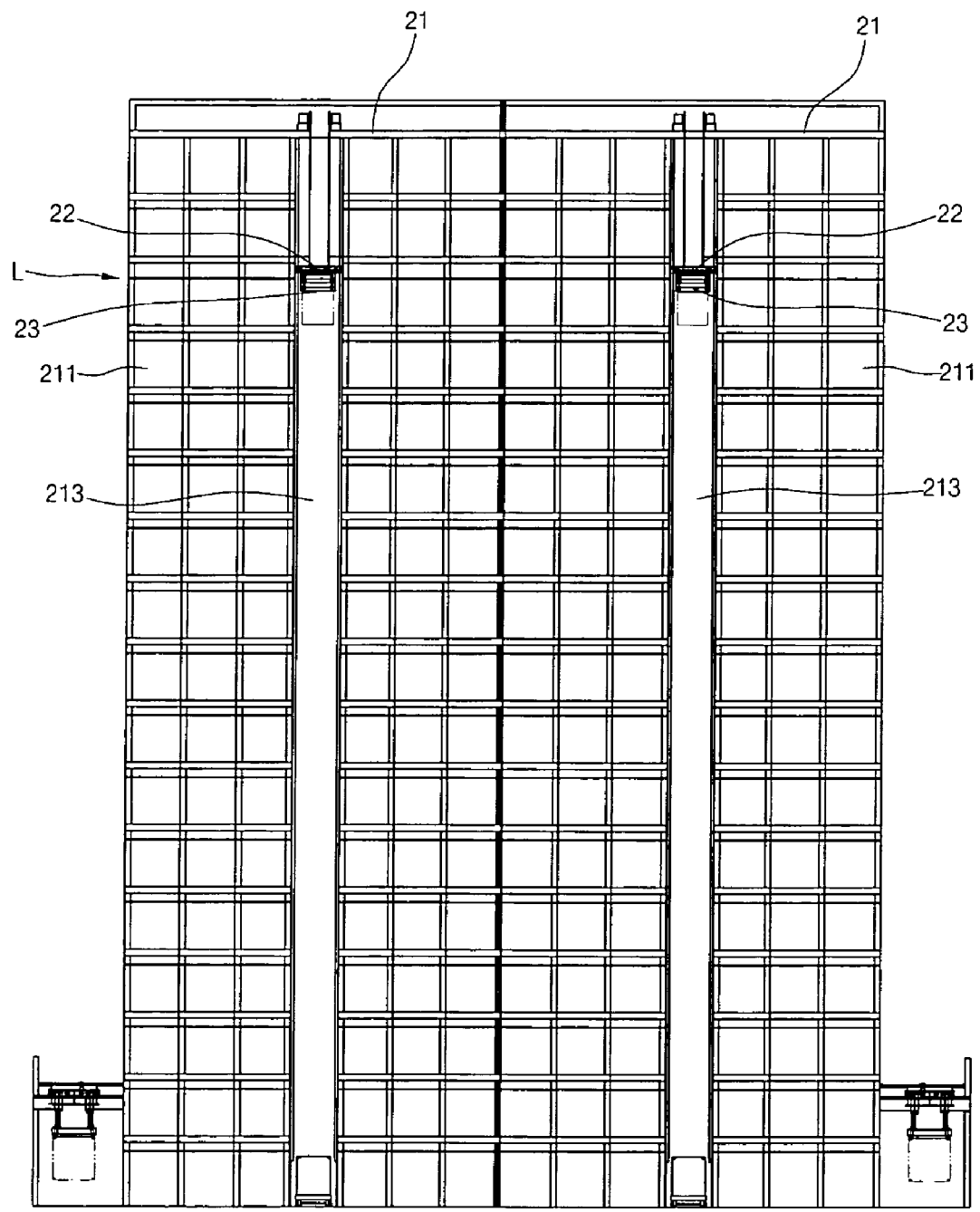
FIG. 43 is a schematic side sectional view of the stacking unit shown in FIG. 41.
Figure 44:
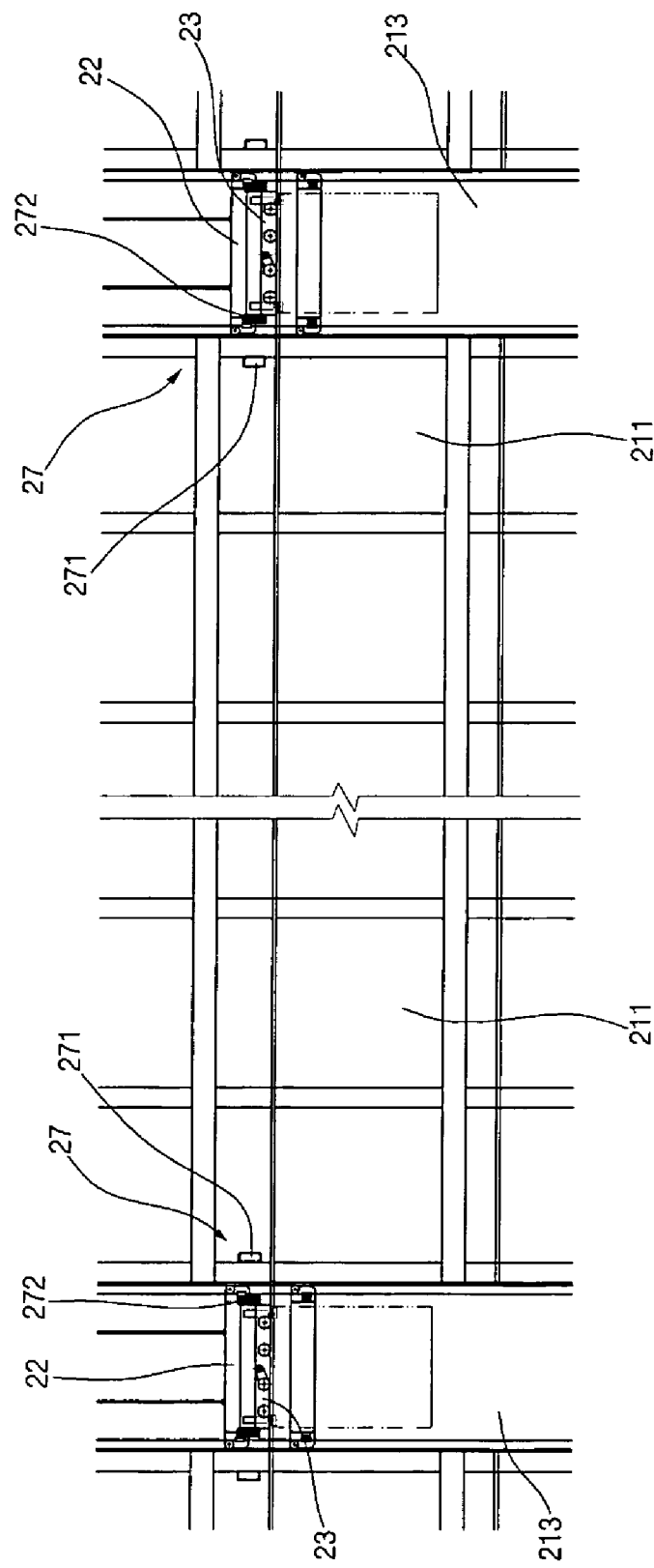
FIG. 44 is an enlarged view, in part, showing the stacking unit of FIG. 43.

FIG. 43 is a schematic side sectional view of the stacking unit shown in FIG. 41, and FIG. 44 is an enlarged view, in part, showing the stacking unit of FIG. 43.

As shown in FIGS. 43 and 44, the steel-frame stacking facility L according to the present invention includes a plurality of steel-frame bodies 21, each of which is constructed in a multi-storied structure. The steel-frame bodies 21 are connected to each other horizontally such that the floors of one of the steel-frame bodies 21 communicate with the floors of another steel-frame body 21.

In the center of each of the steel-frame bodies 21 is defined a vertically extending lifting channel 213. Along both sides of the lifting channel 213 are disposed at least two stacking chambers 211. The cage 22 is moved upward and downward along the lifting channel 213. The traveler 23 is attached to the cage 22 such that the traveler 23 can be moved horizontally.

At the traveler 23 and each stacking chamber 211 are provided an introduction-preventing part 27.

The traveler 23 is moved horizontally from one of the lifting channels 213 to the other lifting channel 213 through the stacking chambers 211. Consequently, when one of the travelers 23 is out of order or is far away, the containers can be quickly and reasonably stacked by means of the other traveler 23.

The introduction-preventing part 27 comprises: stop brackets 272 attached to the traveler 23; and safety protrusions 271 attached to the insides of the opposite stacking chambers 211. As the stop brackets 272 of the traveler 23 contact the safety protrusions 271 of the stacking chamber 211, the movement of the traveler 23 is stopped. Consequently, the traveler 23 provided at one of the lifting channels 213 is prevented from passing through stacking chambers and thus being introduced into the other lifting channel 213.

Preferably, each of the safety protrusions 271 is made of rubber so that shocks can be absorbed by means of the safety protrusions 271 when the stop brackets 272 collide against the safety protrusions 271.

Figure 45:
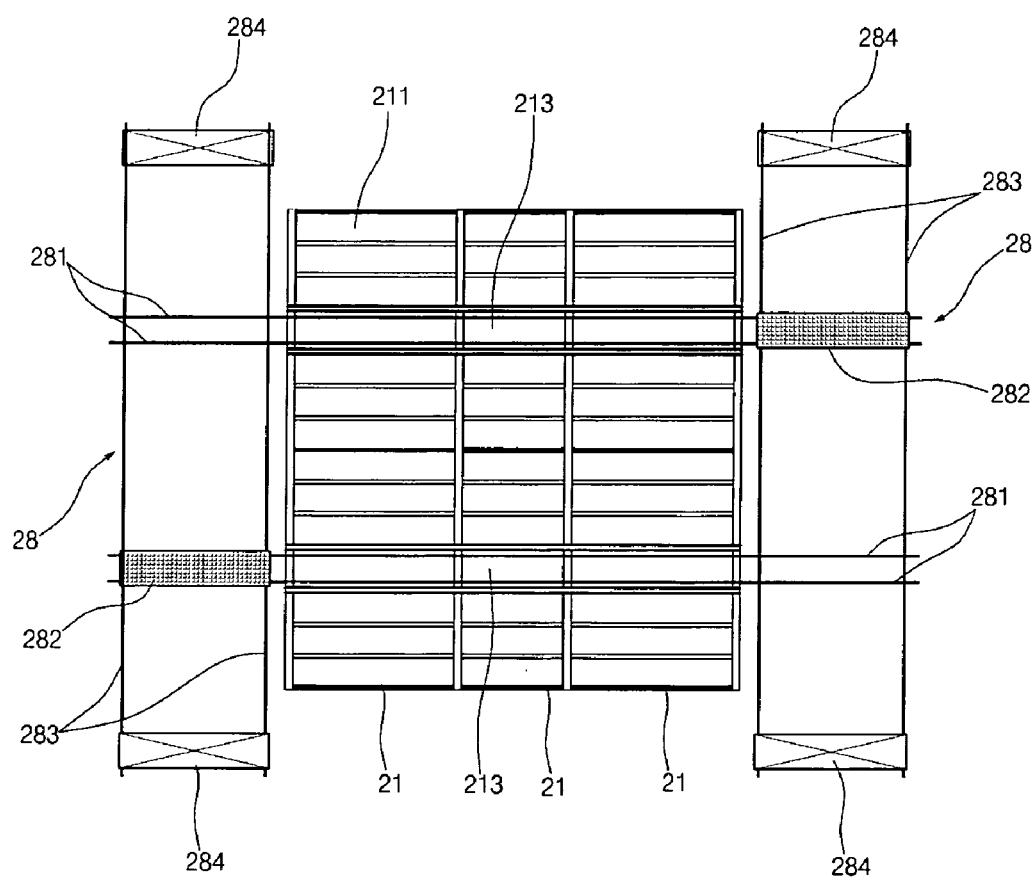
FIG. 45 is a schematic plan sectional view of the stacking unit shown in FIG. 41.
Figure 46:
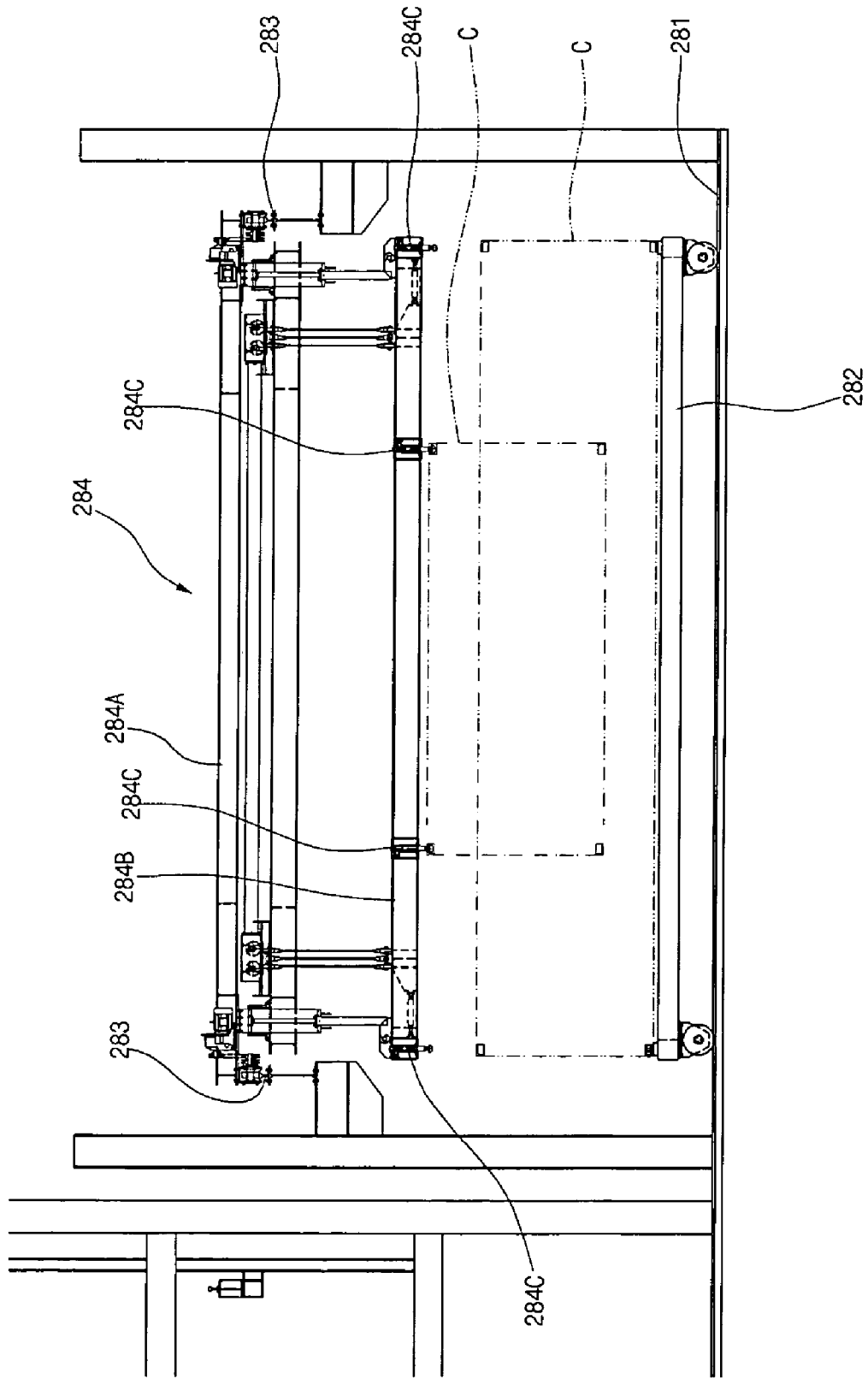
FIG. 46 is an enlarged view, in part, showing the stacking unit of FIG. 42.

FIG. 45 is a schematic plan sectional view of the stacking unit shown in FIG. 41, and FIG. 46 is an enlarged view, in part, showing the stacking unit of FIG. 42.

As shown in FIGS. 45 and 46, each of the container-introducing parts 28 comprises: introducing rails 281 mounted such that the introducing rails communicate with the lifting channels 213; bogies 282 disposed on the introducing rails 281 such that the bogies 282 can be moved along the introducing rails 281 by means of motors; upper rails 283 disposed above the introducing rails 281 while being perpendicular to the introducing rails 281; and stacking loaders 284 disposed on the upper rails 283 such that the stacking loaders 284 can be moved along the upper rails 283.

Each of the stacking loaders 284 comprises: a moving bogie 284A disposed on the upper rails 283; a fixing frame 284B disposed below the moving bogie 284A such that the fixing frame 284B can be moved upward and downward; and a plurality of holder parts 284C attached to the fixing frame 284B, the number of which is selected on the basis of the length of the container C.

The moving bogie 284A is moved to the outside along the upper rails 283, and the container C entering below the upper rails 283 while being loaded on a vehicle is held by means of holder parts 284C of the fixing frame 284B, and is then raised. After that, the moving bogie 284A is moved to the introducing rails 281 along the upper rails 283 so that the container C can be placed onto the bogie 282 disposed on the introducing rails 281.

The container C placed on the bogie 282 is moved into the steel-frame body 21 along the introducing rails 281 by means of the bogie 282, and is then stopped at the lower part of the lifting channel 213. The container C stopped at the lower part of the lifting channel 213 is moved upward along the lifting channel so that the container can be stacked into the stacking chamber 211.

Figure 47:
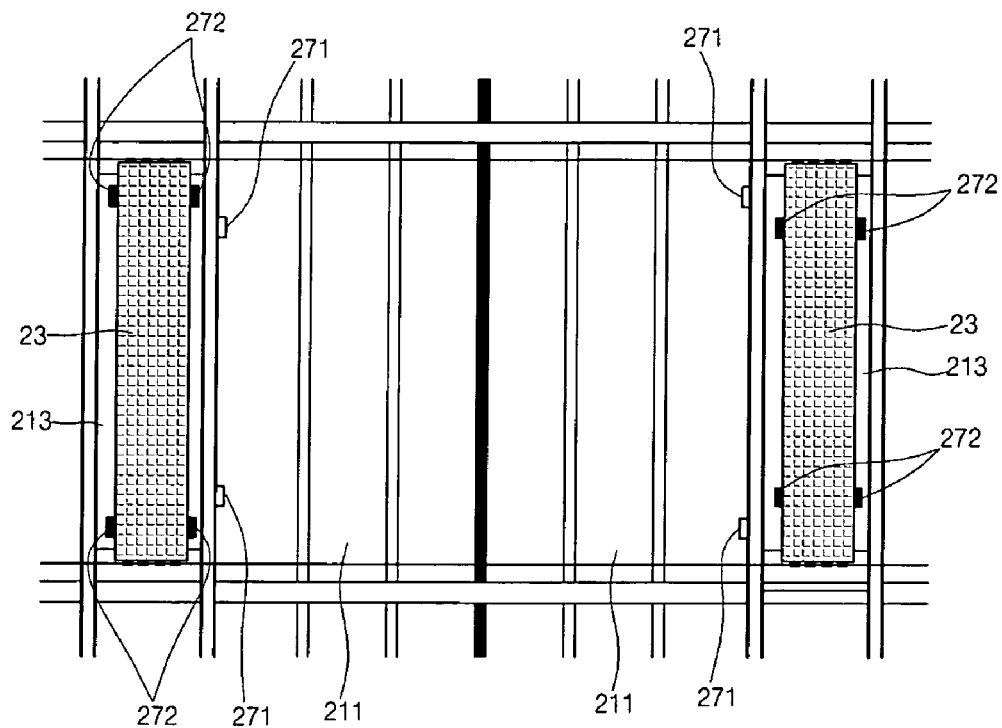
FIG. 47 is a schematic plan sectional view showing the interior of the stacking unit according to the sixth preferred embodiment of the present invention.
Figure 48:
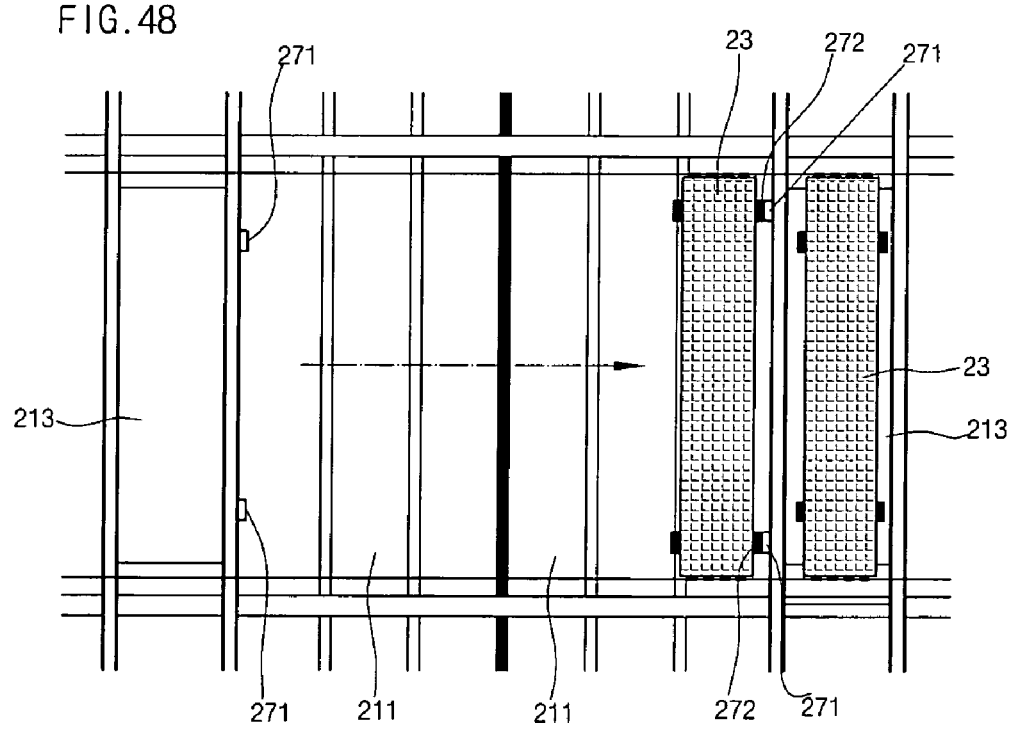
FIG. 48 is a view of the loading unit of FIG. 47 showing that the stacking unit is operated.
Figure 49:
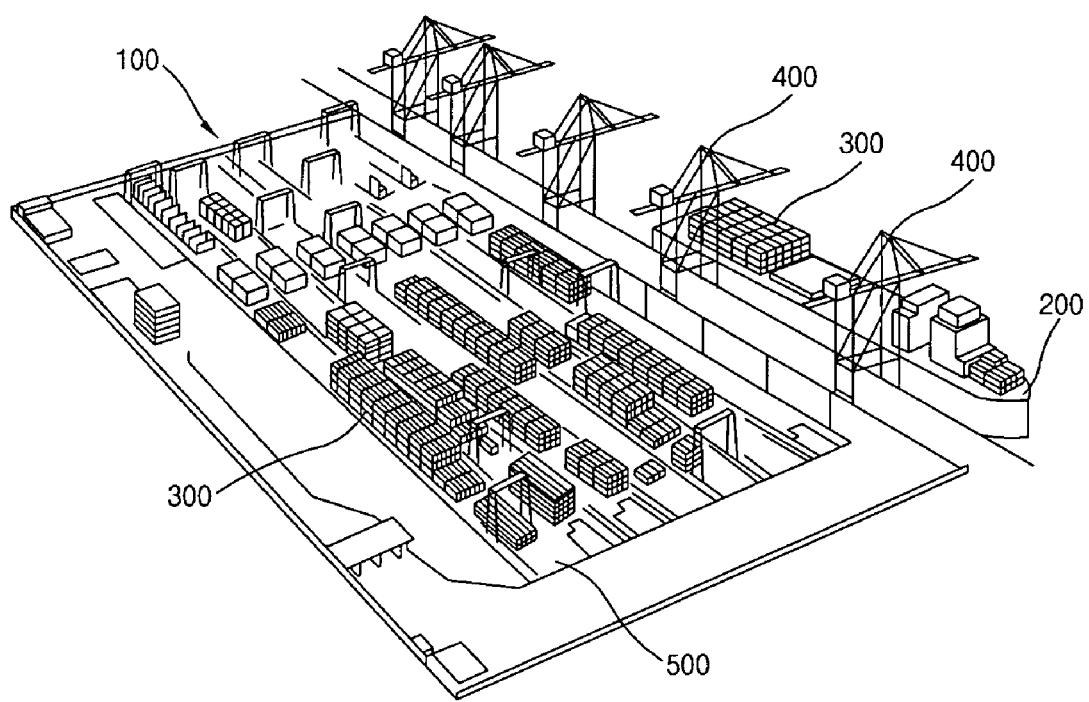
FIG. 49 is a perspective view schematically showing a conventional container terminal.

FIG. 47 is a schematic plan sectional view showing the interior of the stacking unit according to the sixth preferred embodiment of the present invention, and FIG. 48 is a view of the loading unit of FIG. 47 showing that the stacking unit is operated.

As shown in FIGS. 47 and 48, the stop brackets 272, which are mounted, in pairs, at both sides of the traveler 23, contact a pair of safety protrusions 271, which are kept away from the stop brackets 272, in the safety protrusions 271 mounted, in pairs, to both ends of the stacking chamber 211. As a result, the movement of the traveler 23 is stopped. Consequently, the traveler 23 provided at one of the lifting channels 213 is prevented from being introduced into the other lifting channel 213.

Specifically, the traveler 23 may be moved from one of the lifting channels 213 to the other lifting channel 213 through the stacking chamber 211. When the traveler 23 is introduced into the other lifting channel 213, however, the traveler 23 falls. To this end, the safety protrusions 271 are provided at the stacking chamber.

Consequently, the stop brackets 272 of the traveler 23 provided at one of the lifting channels 213 pass by the safety protrusions 271, which are near the lifting channel 213 where the traveler 23 is provided, collide against the other pair of safety protrusions 271, which are attached to the upper part of the stacking chamber 211 near the other lifting channel 213, whereby the movement of the traveler 23 is stopped.

As described above, the safety protrusions 271 and the stop brackets 272 are attached to the two opposite travelers 23 and both ends of the stacking chamber 211 such that the stop brackets 272 do not contact the safety protrusions 271 disposed near the stop brackets 272 but contact the safety protrusions 271 disposed away from the stop brackets 272. Consequently, the traveler 23 provided at one of the lifting channels 213 is prevented from passing through stacking chambers 211 and thus being introduced into the other lifting channel 213.

INDUSTRIAL APPLICABILITY

As apparent from the above description, the present invention provides a method and apparatus for storing and transferring containers that allows quick handling of containers unloaded from a container ship. Consequently, the present invention has the effect of more smoothly storing and transferring containers, and quickly, accurately and reasonably handling a great number of containers.

Also, the present invention provides a method and apparatus for reasonable handling of containers on the basis of the lengths of the containers and variance in time elapsed until containers are removed from the container terminal. Consequently, the present invention has the effect of smoothly achieving storage and removal of the containers.

Also, the present invention provides a method and apparatus for storing and transferring containers that allows smooth control of a container-transferring unit. Consequently, the present invention has the effect of quickly transferring the containers.

Also, the present invention provides a method and apparatus for storing and transferring containers that allows stable and smooth transfer of containers. Consequently, the present invention has the effect that the containers are easily brought into a container terminal for loading onto a container ship, and unloaded from a container ship and removed from the container terminal.

Also, the present invention provides a method and apparatus for storing and transferring containers that allows smooth loading of containers having different lengths onto automatic bogies and easy supply of electric energy to the automatic bogies. Consequently, the present invention has the effect of stably operating the automatic bogies.

Also, the present invention provides a method and apparatus for storing and transferring containers that allows simple and easy stacking of a great number of containers on a small area and easy manufacturing, installation and operation of a stacking unit. Consequently, the present invention has the effect of efficiently stacking the containers.

Also, the present invention provides a method and apparatus for storing and transferring containers that prevents inclination and unsteadiness caused according to the change of the center of gravity of containers when the containers are moved horizontally. Consequently, the present invention has the effect of smoothly achieving locking/unlocking and transferring the containers with a simple structure and stably stacking the containers.

Also, the present invention provides a method and apparatus for storing and transferring containers that allows moving of piping for supplying fluid to hydraulics which move containers upward and downward, along with hydraulic cylinders in a double-acting fashion. Consequently, the present invention has the effect that leakage of oil due to repetitive use is prevented, necessity of an additional installation space for the piping is eliminated, the apparatus can be easily manufactured, expansion and contraction of the apparatus is accurately achieved, and thus performance and reliability of the apparatus is improved.

Also, the present invention provides a method and apparatus for storing and transferring containers that allows precise fixing of a cage for moving containers upward and downward at a predetermined position with a simple structure. Consequently, the present invention has the effect of stably and precisely stacking the containers, effectively preventing collision of the container with the apparatus due to the change of the center of gravity of the containers during stacking the containers, and thus preventing damage to the apparatus.

Also, the present invention provides a method and apparatus for storing and transferring containers that allows adjustment of the height of a holder part for holding containers, whereby various containers having different heights can be easily held. Consequently, the present invention has the effect that various containers can be stacked irrespective of their heights, and thus the scopes of application and utilization are considerably enlarged.

Also, the present invention provides a method and apparatus for storing and transferring containers that allows quick stacking and discharging of containers onto and from a stacking unit, thereby preventing stacking chambers of the stacking unit from being empty. Consequently, the present invention has the effect that the stacking efficiency of the containers is considerably improved, and a great number of containers can be stored and removed in a short period of time.

Also, the present invention provides a method and apparatus for storing and transferring containers that prevents a traveler provided at one of lifting channels from passing through stacking chambers and thus being introduced into the other lifting channel. Consequently, the present invention has the effect of preventing the traveler from falling along the other lifting channel.

Also, the present invention provides a method and apparatus for storing and transferring containers that allows smooth stacking of containers having difference sizes, thereby efficiently stacking the containers. Consequently, the present invention has the effect that space efficiency is considerably improved, and applicable scope is enlarged.

The invention claimed is:

1. An apparatus for storing and transferring containers, comprising:

a loading/unloading unit for loading or unloading containers onto or from a container ship;

a stacking unit for stacking the containers unloaded from the container ship by means of the loading/unloading unit and containers taken to a container terminal;

a transferring unit for transferring the containers between the loading/unloading unit and the stacking unit; and a central controlling unit for receiving information of the containers to be loaded onto or unloaded from the container ship from the loading/unloading unit to determine whether the containers are stacked or not and to identify the position of the containers and controlling the movement of the transferring unit so that the containers can be handled, wherein the stacking unit comprises:

a steel frame body constructed in a vertical multi-storied structure such that the steel-frame body has a plurality of stacking chambers defined therein, the steel-frame body having horizontal rails disposed at both sides in each stacking chamber and a lifting channel defined vertically in the steel-frame body;

a cage disposed in the lifting channel, the cage having horizontal rails corresponding to the horizontal rails of the stacking chamber;

a traveler mounted in the cage such that the traveler can be attached to or detached from the upper part of the container, the traveler being movable horizontally along the horizontal rails of the stacking chamber and the horizontal rails of the cage;

lifting parts attached to the upper end of the steel-frame body for moving the cage upward or downward along the lifting channel; and height-adjusting parts, and wherein each of the height-adjusting parts comprises:

a hydraulic cylinder mounted downward at a corresponding corner of the traveler;

a spreader, having a corresponding holder part, mounted to the end of the piston rod of the hydraulic cylinder such that the spreader is moved upward or downward by means of the hydraulic cylinder and the height of the holder part is adjusted according to the movement of the spreader;

a guide rod disposed at one side of the hydraulic cylinder, the guide rod being attached to the spreader through the traveler; and a stopper attached to the traveler such that the stopper can be caught in a catching groove formed at the upper end of the guide rod for holding the guide rod.

2. The apparatus as set forth in claim 1, further comprising:

a taking-in/taking-out unit for taking the containers to the container terminal or removing the container out of the container terminal, and wherein the transferring unit is moved to the taking-in/taking-out unit through the stacking unit.

3. The apparatus as set forth in claim 1, wherein the transferring unit comprises:

a railroad line connected between the lower part of the loading/unloading unit and the taking-in/taking-out unit via the stacking unit; and a plurality of automatic bogies movable automatically along the railroad line.

4. The apparatus as set forth in claim 3, wherein the railroad line comprises:

a plurality of transverse railroad line parts disposed at the lower part of the loading/unloading unit while being perpendicular to the loading/unloading unit;

cross railroad line parts crossing each other, the cross railroad line parts being connected to the transverse railroad line parts in pairs and arranged from the transverse railroad line parts to the stacking unit; and convergent railroad parts extending from the ends of the cross railroad line parts such that the convergent railroad parts are convergent to at least one position through the stacking unit.

5. The apparatus as set forth in claim 4, further comprising:

railroad line-rotating parts disposed at the section where the cross railroad line parts cross each other and at the section where the convergent railroad parts are convergent.

6. The apparatus as set forth in claim 5, wherein each of the railroad line-rotating parts comprises:

a circular table disposed at the section where the cross railroad line parts cross each other and at the section where the convergent railroad parts are convergent, the circular table having connection railroad line parts disposed on the upper surface thereof, the connection railroad line parts being connected to the cross railroad line parts and the convergent railroad parts;

a rotary shaft mounted to the center of the lower surface of the circular table;

a base for rotatably supporting the lower end of the rotary shaft; and a rotary driving part electrically connected to the central controlling unit for rotating the circular table.

7. The apparatus as set forth in claim 6, wherein an annular supporting protrusion is attached to the lower surface of the circular table such that the supporting protrusion is disposed around the rotary shaft while being spaced apart from the rotary shaft, and wherein a plurality of supporting rollers are rotatably attached to the lower surface of the supporting protrusions.

8. The apparatus as set forth in claim 4, wherein the taking-in/taking-out unit comprises:

a loader for loading the container moved by means of the automatic bogie above the section where the convergent railroad parts are convergent according to the control of the central controlling unit onto a trailer.

9. The apparatus as set forth in claim 8, wherein the loader comprises:

a loader frame mounted above the convergent ends of the convergent railroad parts;

a first moving bogie movable along the loader frame;

a plurality of holder parts attached to the first moving bogie for holding the container; and a loader driving part electrically connected to the central controlling unit for driving the first moving bogie.

10. The apparatus as set forth in claim 4, wherein the automatic bogie comprises:

a rectangular frame-shaped bogie body;

a plurality of bogie shafts rotatably mounted to the lower part of the bogie body;

bogie wheels securely fixed to both ends of each of the bogie shafts;

bogie driving parts for driving the bogie shafts;

a bogie control part for controlling one of the bogie driving parts; and a wireless transceiver electrically connected to the bogie control part for performing a wireless transmitting and receiving operation with the central controlling unit.

11. The apparatus as set forth in claim 10, wherein the bogie body is provided at the upper surface thereof with a plurality of fixing protrusions such that the fixing protrusions can be securely inserted into the corner areas of a large-sized container placed on the upper surface of the automatic bogie.

12. The apparatus as set forth in claim 10, wherein the bogie body is provided with rechargeable batteries for supplying electric current to the bogie driving parts, respectively.

13. The apparatus as set forth in claim 1, wherein the traveler comprises:

a horizontal driving part including a main body disposed at the cage, and a plurality of driving rollers rotatably disposed at both sides of the main body such that the driving rollers are moved along the horizontal rails of the cage while being in rolling contact with the horizontal rails of the cage by means of a driving motor fixed to the main body; and holder parts formed at the lower surface of the main body such that the holder parts can be engaged in or disengaged from holes formed at the upper surface of the container.

14. The apparatus as set forth in claim 1, wherein the stacking unit further comprises:

locking parts for locking the cage to the steel-frame body at the position where the horizontal rails of the stacking chamber are level with the horizontal rails of the cage.

15. The apparatus as set forth in claim 14, wherein each of the lifting parts comprises:

a hydraulic motor mounted to the upper end of the steel-frame body;

a driving pulley that can be operated by means of the hydraulic motor; and wire ropes connected to the cage such that the wire ropes can be wound by means of the driving pulley.

16. The apparatus as set forth in claim 15, wherein a plurality of guide rails are vertically disposed along the lifting channel, and a plurality of rollers are rotatably attached to the outside of the cage such that the rollers can be in contact with the guide rails.

17. The apparatus as set forth in claim 14, wherein each of the lifting parts comprises:

a lower fixed cylinder having an open lower end, the lower fixed cylinder being provided at the upper part thereof with a first upper inlet;

a lower actuating rod inserted in the lower fixed cylinder through the upper part of the lower fixed cylinder, the lower actuating rod having a first central channel and a first internal channel defined therein, the first central channel having open upper and lower ends and the first internal channel having upper and lower ends closed by means of a first upper flange and a first piston, the lower actuating rod having a first lower inlet and a first upper outlet formed at the upper and lower parts of the first internal channel, respectively;

a first external channel defined between the lower actuating rod and the lower fixed cylinder for communicating with the first upper inlet of the lower fixed cylinder and the first lower inlet of the lower actuating rod;

an upper moving cylinder formed integrally to the upper part of the first upper flange, the upper moving cylinder having an open lower end for communicating with the lower actuating rod, the upper moving cylinder having a second upper inlet formed at the upper part thereof;

an upper actuating rod inserted in the upper moving cylinder through the upper part of the upper moving cylinder, the upper actuating rod having a second central channel and a second internal channel defined therein, the second central channel having an open lower end and an upper end closed by means of a second upper flange and the second internal channel having upper and lower ends closed by means of the second upper flange and a second piston, the upper actuating rod having a second lower inlet and a second closed upper outlet formed at the upper and lower parts of the second internal channel, respectively, the upper actuating rod being connected to the cage;

a second external channel defined between the upper actuating rod and the upper moving cylinder for communicating with the second upper inlet of the upper moving cylinder and the second lower inlet of the upper actuating rod;

a first supply pipe having one end connected to the first upper inlet of the lower fixed cylinder and the other end connected to an external fluid tank including a hydraulic pump; and a second supply pipe having one end connected to the first upper outlet of the lower actuating rod and the other end connected to the second upper inlet of the upper moving cylinder.

18. The apparatus as set forth in claim 17, wherein the first supply pipe, the second supply pipe, the first internal channel of the lower actuating rod, and the second internal channel of the upper actuating rod are constructed such that the amount of fluid supplied through the first supply pipe and the second supply pipe is equal to the amount of fluid supplied through the first internal channel of the lower actuating rod and the second internal channel of the upper actuating rod.

19. The apparatus as set forth in claim 17, wherein the end of a first upper stopper of the lower fixed cylinder extends downward such that the end of the first upper stopper of the lower fixed cylinder blocks approximately the upper half of the first upper inlet of the lower fixed cylinder, the end of a second upper stopper of the upper moving cylinder extends downward such that the end of the second upper stopper of the upper moving cylinder blocks approximately the upper half of the second upper inlet of the upper moving cylinder, the first piston of the lower actuating rod is spaced from the lower end of the lower fixed cylinder by a distance corresponding to approximately the lower half of the first upper inlet of the lower fixed cylinder, and the second piston of the upper actuating rod is spaced from the lower end of the upper moving cylinder by a distance corresponding to approximately the lower half of the second upper inlet of the upper moving cylinder.

20. The apparatus as set forth in claim 17, wherein a driving pulley is attached to the upper surface of the second upper flange, a wire rope wound on the driving pulley is connected to the cage, and guide rollers are mounted to one side of the driving pulley such that the guide rollers can be moved along the guide rails vertically disposed at the lifting channel while being in rolling contact with the guide rails, the guide rollers being arranged in pairs in an upper and lower arrangement.

21. The apparatus as set forth in claim 14, wherein each of the locking parts comprises:

a movable locking part including an actuating cylinder mounted to the cage and an insertion rod integrally attached to the end of a piston rod of the actuating cylinder such that the insertion rod can be moved forward from or backward to the cage by means of the actuating cylinder; and a locking insertion part formed at the steel-frame body corresponding to the stacking chamber for securely locking the insertion rod.

22. The apparatus as set forth in claim 21, wherein the locking insertion part comprises:

a locking member attached to the upper end of the stacking chamber corresponding to the lifting channel; and an insertion hole formed at the locking member for allowing the insertion rod to be inserted therethrough.

23. The apparatus as set forth in claim 21, wherein the locking insertion part comprises:
a guide locking member attached to the upper end of the stacking chamber corresponding to the lifting channel; and
a wedge-shaped groove formed at the guide locking member such that the insertion rod can be inserted into the wedge-shaped groove while being guided along the wedge-shaped groove.

24. The apparatus as set forth in claim 22, wherein the insertion hole is a vertically extending elongated hole.

25. The apparatus as set forth in claim 23, wherein a roller is rotatably attached to the end of the insertion rod such that the insertion rod can be smoothly guided along the wedge-shaped groove while being in rolling contact with the wedge-shaped groove by means of the roller.

26. The apparatus as set forth in claim 22, wherein the movable locking part further comprises:
a sliding tube surrounding the insertion rod such that the insertion rod can be slid through the sliding tube; and
a supporting bar attached between the sliding tube and the cage.

27. The apparatus as set forth in claim 1, wherein the stopper comprises:
a stopper plate disposed at the upper surface of the traveler, the stopper plate having engaging grooves formed at both ends thereof such that the engaging grooves can be simultaneously engaged with the corresponding catching grooves of a pair of guide rods; and
a stopper hydraulic cylinder disposed below the stopper plate for moving the stopper plate to one side.

28. The apparatus as set forth in claim 27, wherein the stopper further comprises:
a pair of distance-adjusting holes formed at the stopper plate while being spaced apart from each other; and
a pair of adjusting bars mounted to the upper surface of the traveler such that the adjusting bars are inserted in the distance-adjusting holes, respectively, for adjusting the movable distance of the stopper plate.

29. The apparatus as set forth in claim 28, wherein the traveler is provided with a guide tube surrounding the guide rod.

30. The apparatus as set forth in claim 1,
wherein the stacking unit comprises: a steel-frame stacking facility including a plurality of steel-frame bodies connected to each other such that floors of one of the steel-frame bodies communicate with floors of the other steel-frame body, respectively, each of steel-frame bodies having at least two stacking chambers disposed along both sides of the lifting channel, and
wherein the traveler is moved horizontally from one of the lifting channels to the other lifting channel in the steel-frame stacking facility.

31. The apparatus as set forth in claim 30, wherein the stacking unit further comprises:
an introduction-preventing part for preventing the traveler provided at one of the lifting channels from being introduced into the other lifting channel.

32. The apparatus as set forth in claim 30, wherein the steel-frame stacking facility includes various steel-frame bodies having different sizes so that various containers having different sizes and heights can be stacked.

33. The apparatus as set forth in claim 31, wherein the introduction-preventing part comprises:
safety protrusions attached, in pairs, to the insides of the opposite stacking chambers communicating with each other; and
stop brackets attached, in pairs, to the traveler such that the stop brackets pass by one pair of safety protrusions placed near the traveler and collide against the other pair of safety protrusions placed away from the traveler.

34. The apparatus as set forth in claim 33, wherein each of the safety protrusions is made of rubber so that shocks can be absorbed by means of the safety protrusions.

35. The apparatus as set forth in claim 33, further comprising:
container-introducing parts disposed at both sides of the steel-frame stacking facility for introducing containers into the lifting channels.

36. The apparatus as set forth in claim 35, wherein each of the container-introducing parts comprises:
introducing rails mounted at the outside of the lower end of each lifting channel;
second moving bogies disposed on the introducing rails such that the second moving bogies can be moved along the introducing rails;
upper rails disposed above the introducing rails while being perpendicular to the introducing rails; and
stacking loaders disposed on the upper rails such that the stacking loaders can be moved along the upper rails for loading containers onto the second moving bogies.

37. The apparatus as set forth in claim 36, wherein each of the stacking loaders comprises:
a third moving bogie movable along the upper rails;
a fixing frame disposed below the third moving bogie; and
a plurality of holder parts attached to the fixing frame for holding containers having different sizes.

38. The apparatus as set forth in claim 13, wherein the stacking unit further comprises:
locking parts for locking the cage to the steel-frame body at the position where the horizontal rails of the stacking chamber are level with the horizontal rails of the cage.

39. The apparatus as set forth in claim 23, wherein the movable locking part further comprises:
a sliding tube surrounding the insertion rod such that the insertion rod can be slid through the sliding tube; and
a supporting bar attached between the sliding tube and the cage.

40. The apparatus as set forth in claim 13, wherein the stacking unit further comprises:
height-adjusting parts, each of the height-adjusting parts comprising:
a hydraulic cylinder mounted downward at a corresponding corner of the traveler; and
a spreader, having a corresponding holder part, mounted to the end of the piston rod of the hydraulic cylinder such that the spreader is moved upward or downward by means of the hydraulic cylinder and the height of the holder part is adjusted according to the movement of the spreader.

41. The apparatus as set forth in claim 13,
wherein the stacking unit comprises: a steel-frame stacking facility including a plurality of steel-frame bodies connected to each other such that floors of one of the steel-frame bodies communicate with floors of the other steel-frame body, respectively, each of steel-frame bodies having at least two stacking chambers disposed along both sides of the lifting channel, and
wherein the traveler is moved horizontally from one of the lifting channels to the other lifting channel in the steel-frame stacking facility.

42. The apparatus as set forth in claim 31, wherein the steel-frame stacking facility includes various steel-frame bodies having different sizes so that various containers having different sizes and heights can be stacked.

* * * * *